US009543849B2

(12) United States Patent
Mizutani et al.

(10) Patent No.: US 9,543,849 B2
(45) Date of Patent: *Jan. 10, 2017

(54) POWER CONVERSION APPARATUS, POWER CONVERSION METHOD, MOTOR SYSTEM, AND THREE-PHASE MOTOR

(71) Applicant: Panasonic Intellectual Property Management Co., Ltd., Osaka (JP)

(72) Inventors: Kenji Mizutani, Kyoto (JP); Yuji Kudoh, Kyoto (JP); Nobuyuki Otsuka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/783,311

(22) PCT Filed: Mar. 28, 2014

(86) PCT No.: PCT/JP2014/001856
§ 371 (c)(1),
(2) Date: Oct. 8, 2015

(87) PCT Pub. No.: WO2014/171084
PCT Pub. Date: Oct. 23, 2014

(65) Prior Publication Data
US 2016/0065083 A1    Mar. 3, 2016

(30) Foreign Application Priority Data

Apr. 16, 2013 (JP) .................................. 2013-085401

(51) Int. Cl.
*H02M 5/04* (2006.01)
*H02P 27/16* (2006.01)
(Continued)

(52) U.S. Cl.
CPC ................ *H02M 5/04* (2013.01); *H02M 5/297* (2013.01); *H02P 27/16* (2013.01); *H02M 2005/2932* (2013.01)

(58) Field of Classification Search
CPC .......... H02P 27/16; H02M 5/297; H02M 5/04; H02M 2005/2932
See application file for complete search history.

(56) References Cited

U.S. PATENT DOCUMENTS 8,941,350 B2 * 1/2015 Otsuka .................. H02M 5/293
                                                    318/685
2002/0079706 A1 * 6/2002 Rebsdorf ................ F03D 9/003
                                                    290/55
(Continued)

FOREIGN PATENT DOCUMENTS

JP         61-150698        7/1986
JP         1-311892        12/1989
(Continued)

OTHER PUBLICATIONS

International Search Report issued Jul. 1, 2014 in International Application No. PCT/JP2014/001856.

*Primary Examiner* — Jue Zhang
(74) *Attorney, Agent, or Firm* — Wenderoth, Lind & Ponack, L.L.P.

(57) ABSTRACT

A power conversion method including: receiving, by a pair of input terminals, an input voltage in which is a single-phase AC voltage; designating a first target voltage ref1, a second target voltage ref2, and a third target voltage ref3 respectively representing consecutive target values of first-phase, second-phase, and third-phase output voltages forming a three-phase AC voltage; and cyclically connecting and disconnecting (i) the input terminals and first output terminals at a duty cycle corresponding to |ref1/in| when an instantaneous value of |in| is greater than an instantaneous (Continued)

value of |ref1|, (ii) the input terminals and second output terminals at a duty cycle corresponding to |ref2/in| when the instantaneous value of |in| is greater than an instantaneous value of |ref2|, and (iii) the input terminals and third output terminals at a duty cycle corresponding to |ref3/in| when the instantaneous value of |in| is greater than an instantaneous value of |ref3|.

14 Claims, 39 Drawing Sheets

(51) Int. Cl.
  *H02M 5/297* (2006.01)
  *H02M 5/293* (2006.01)

(56) References Cited

U.S. PATENT DOCUMENTS

| | | | | |
|---|---|---|---|---|
| 2004/0022081 | A1* | 2/2004 | Erickson | H02M 5/297 363/159 |
| 2007/0035265 | A1* | 2/2007 | Balog, Jr. | H02P 27/16 318/400.35 |
| 2007/0274109 | A1* | 11/2007 | Oyobe | B60K 6/26 363/37 |

FOREIGN PATENT DOCUMENTS

| | | |
|---|---|---|
| JP | 6-245511 | 9/1994 |
| JP | 2010-154714 | 7/2010 |
| JP | 2011-4449 | 1/2011 |

* cited by examiner

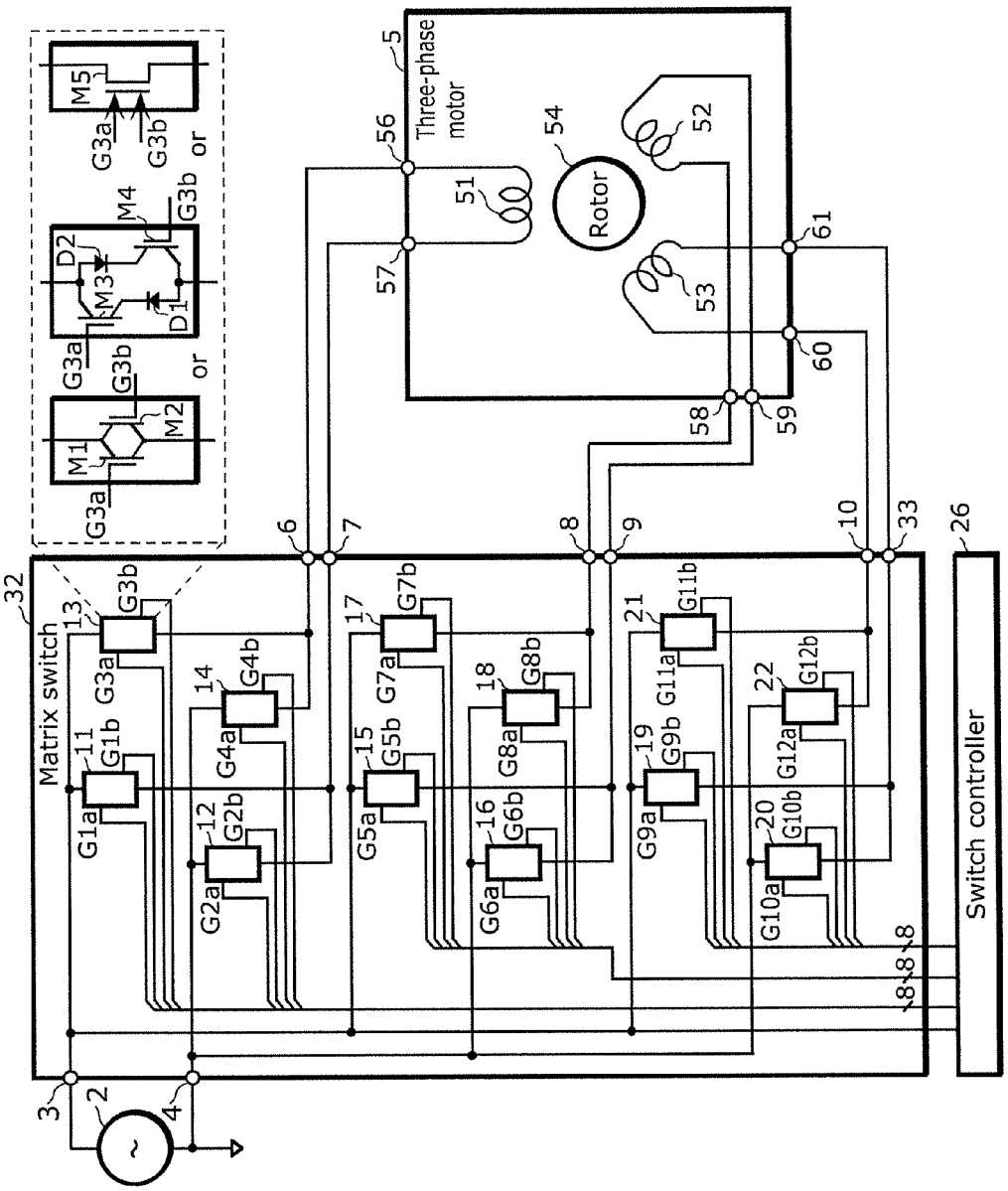

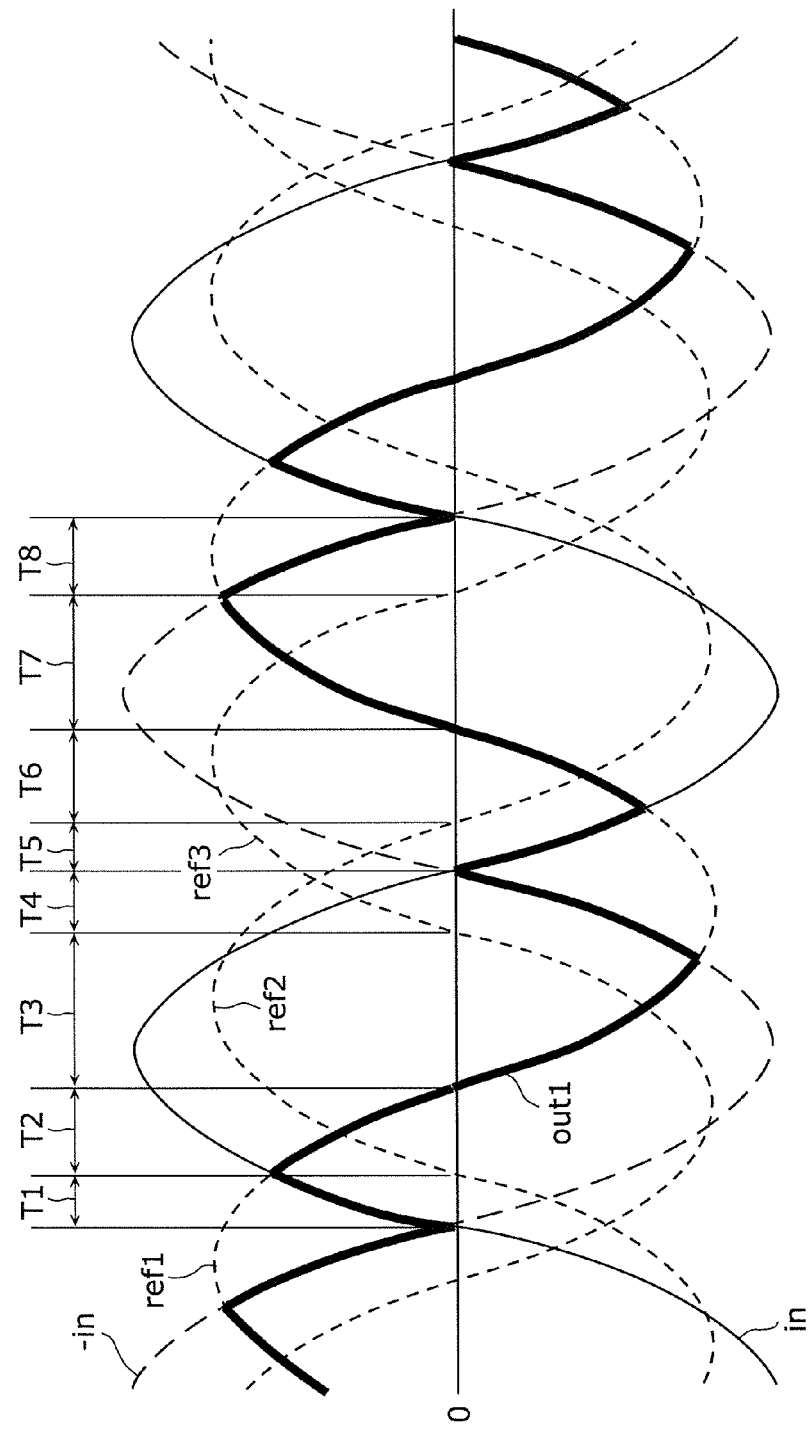

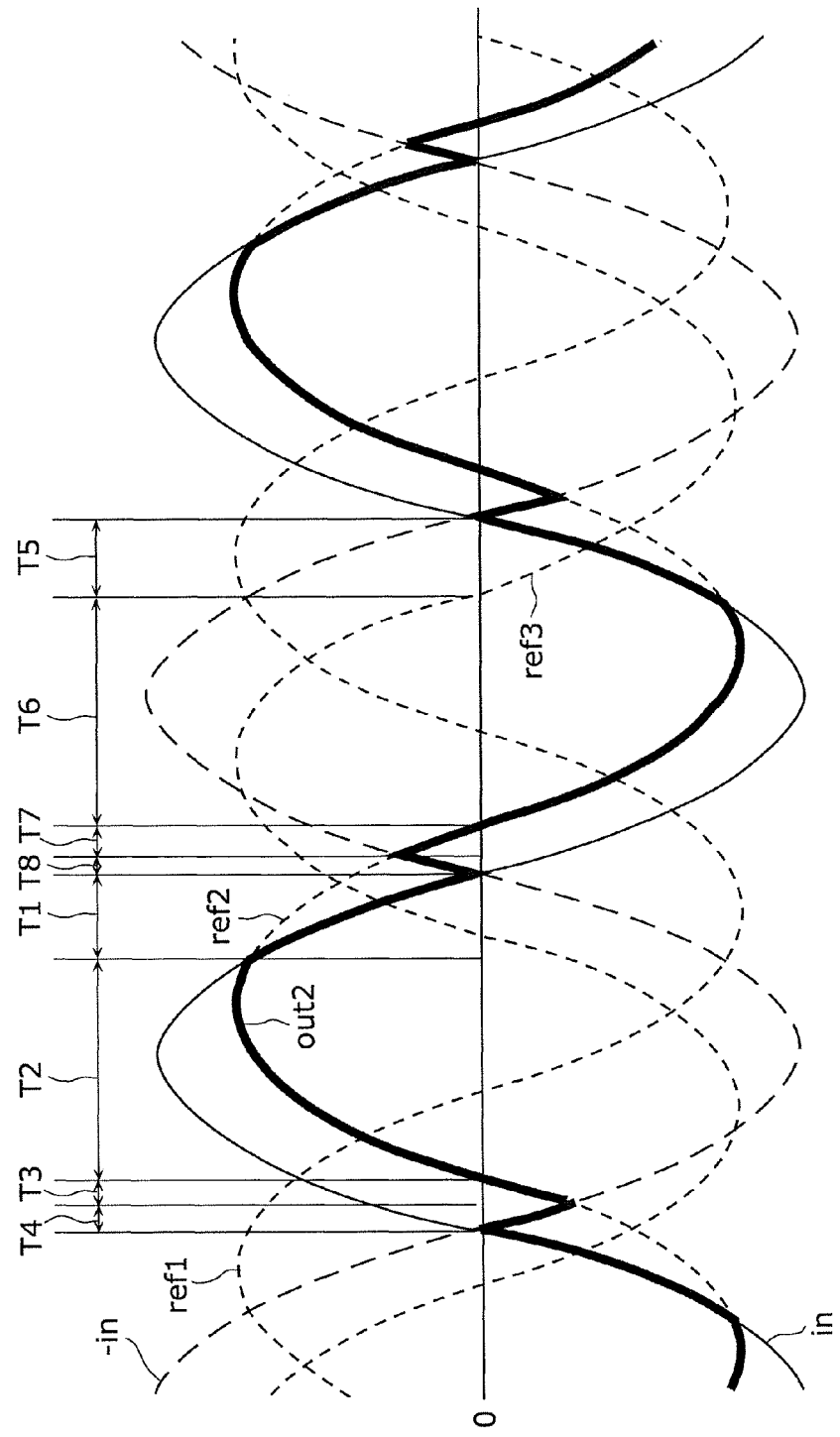

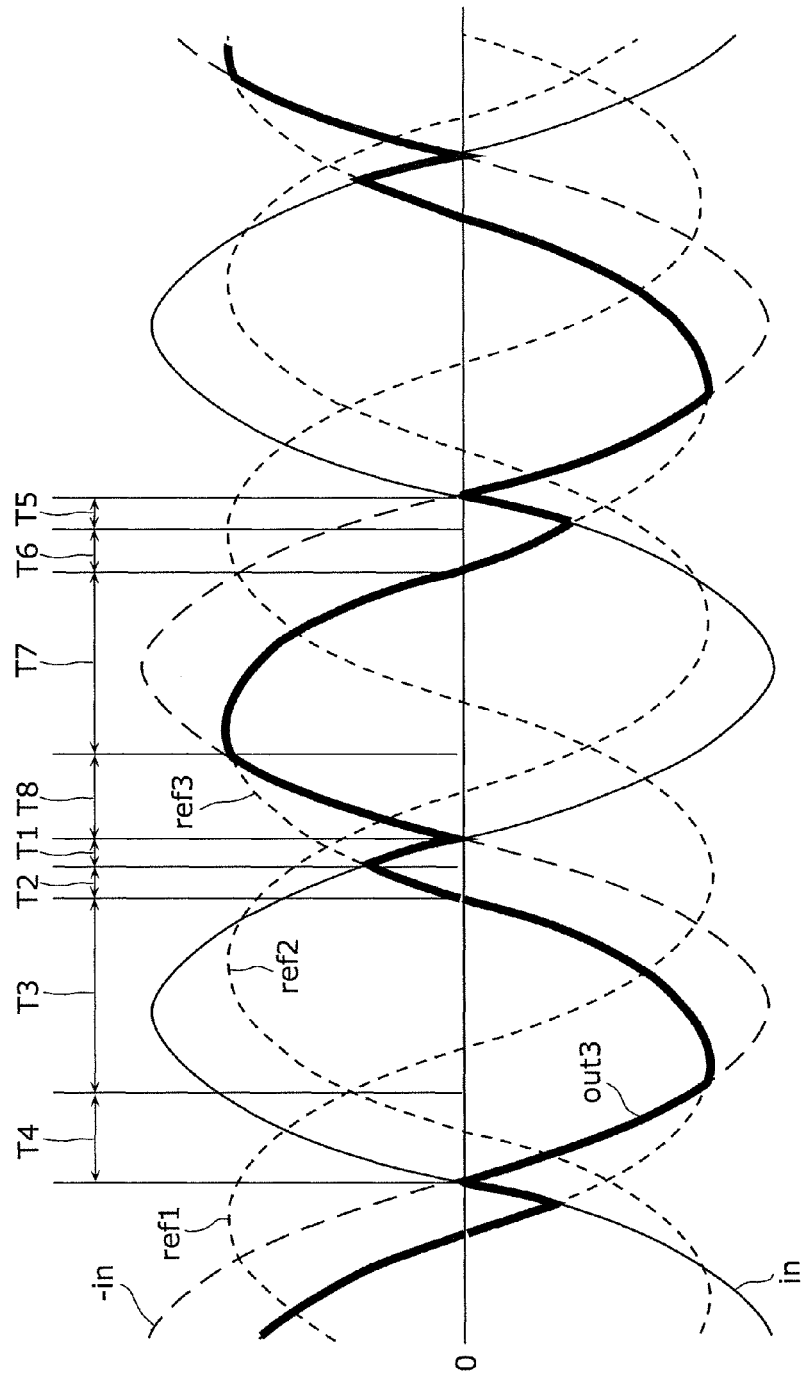

Time periods T1, T2a

Time period T2b

Time periods T3a, T4

Time period T3b

Time periods T5, T6a

Time period T6b

Time periods T7a, T8

Time period T7b

Time periods T1, T2a

Time period T2b

Time periods T3a, T4

Time period T3b

Time periods T5, T6a

Time period T6b

Time periods T7a, T8

Time period T7b

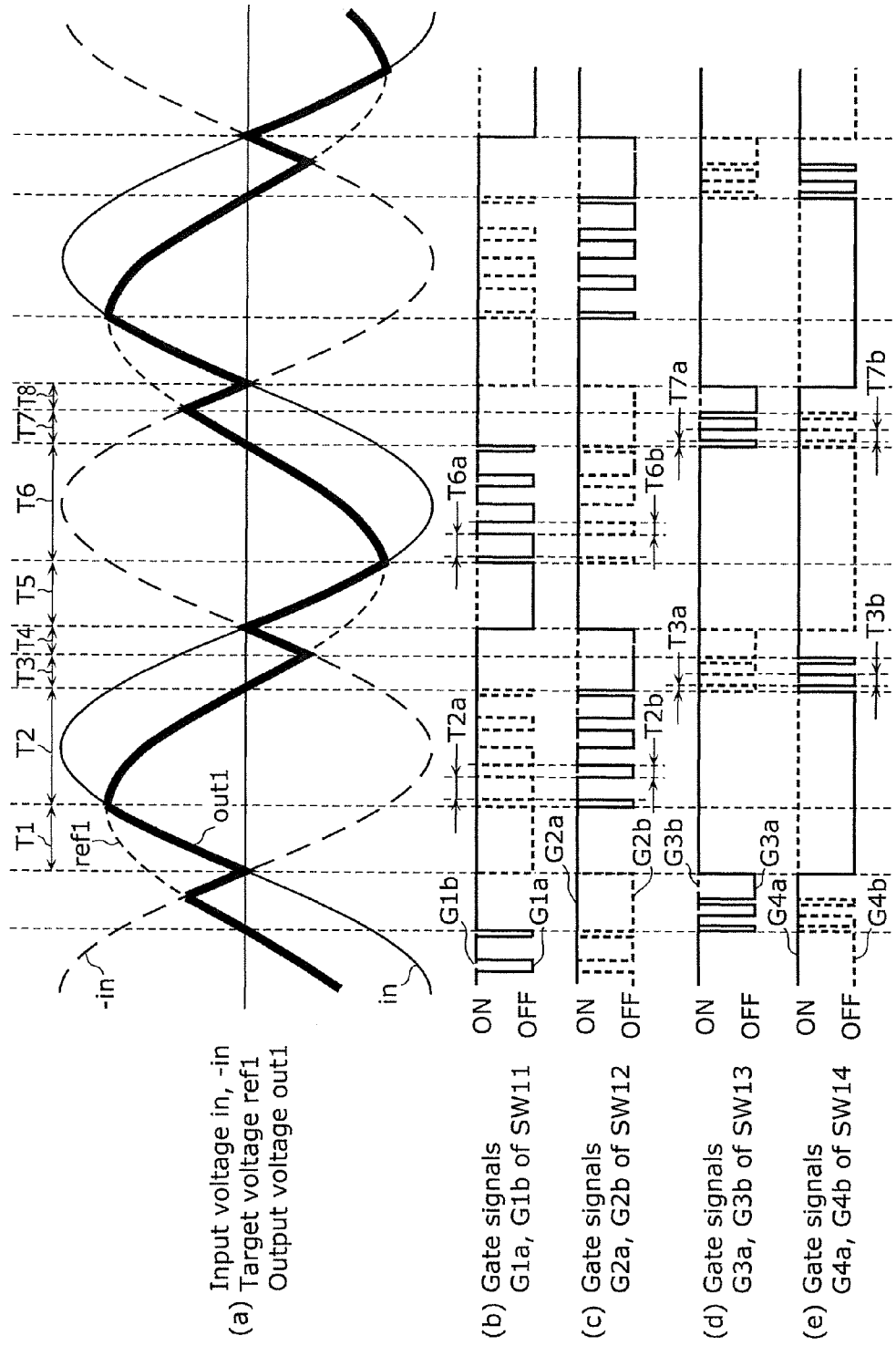

Time periods T1, T2a

Time period T2b

Time periods T3a, T4

Time period T3b

Time periods T5, T6a

Time period T6b

Time periods T7a, T8

Time period T7b

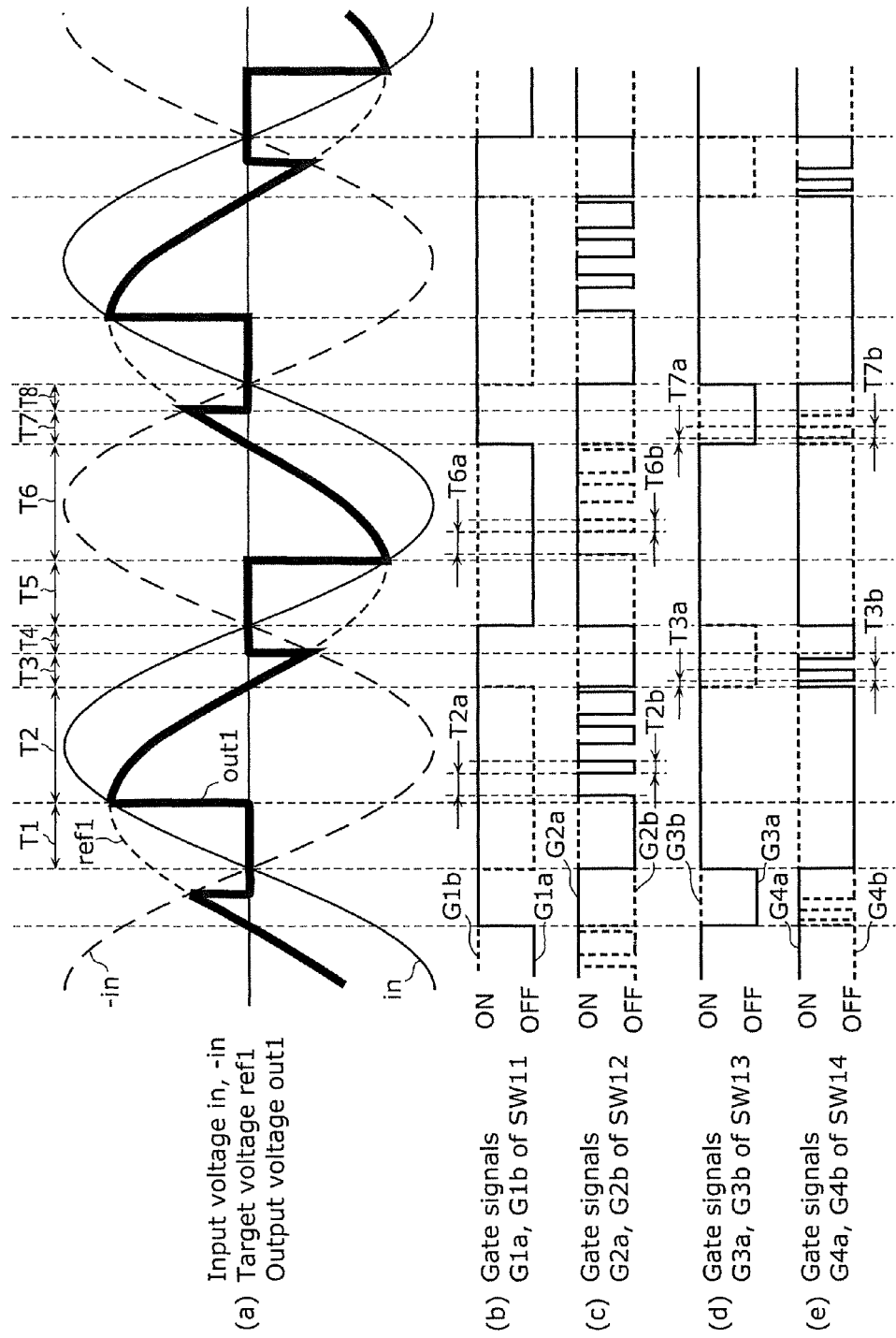

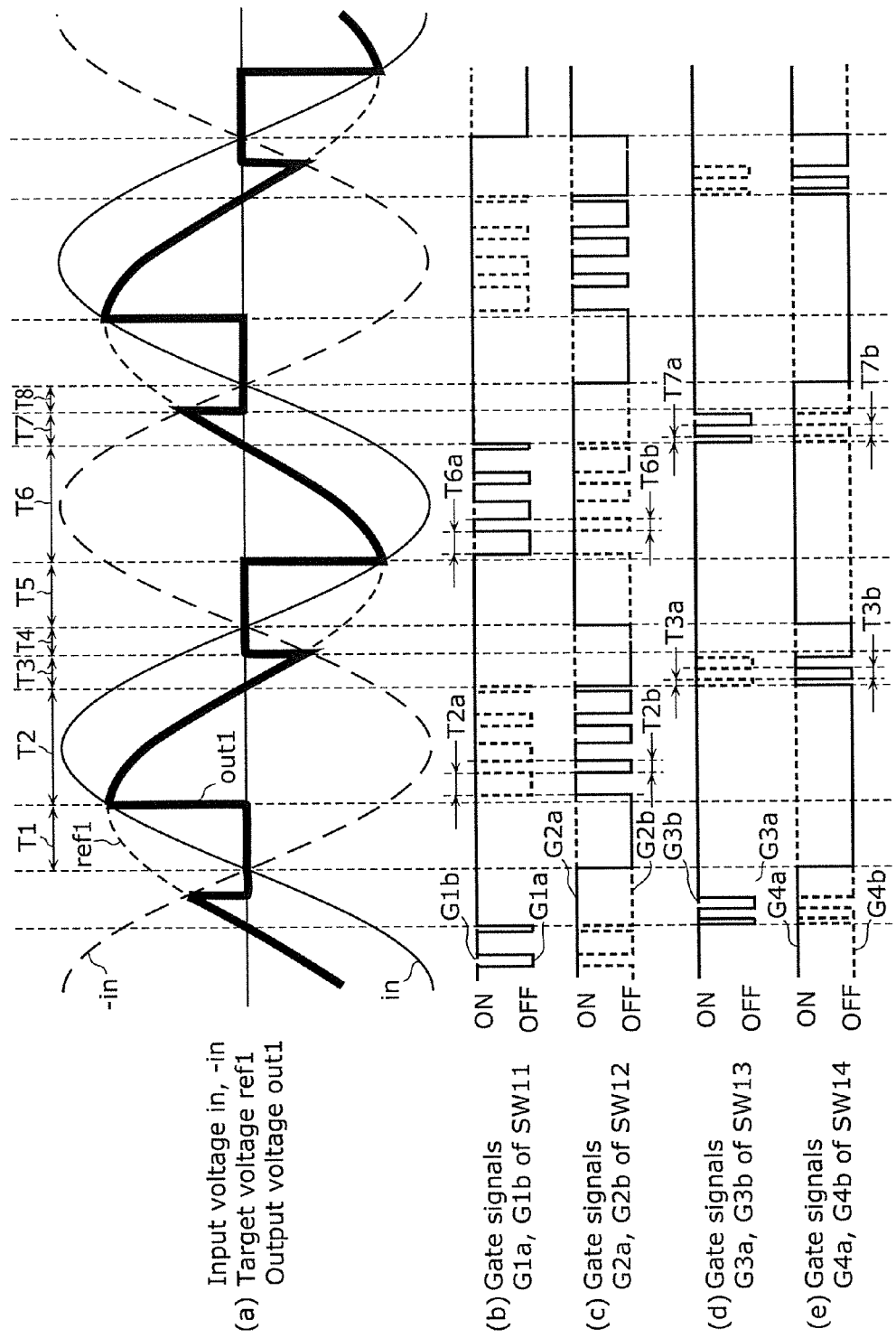

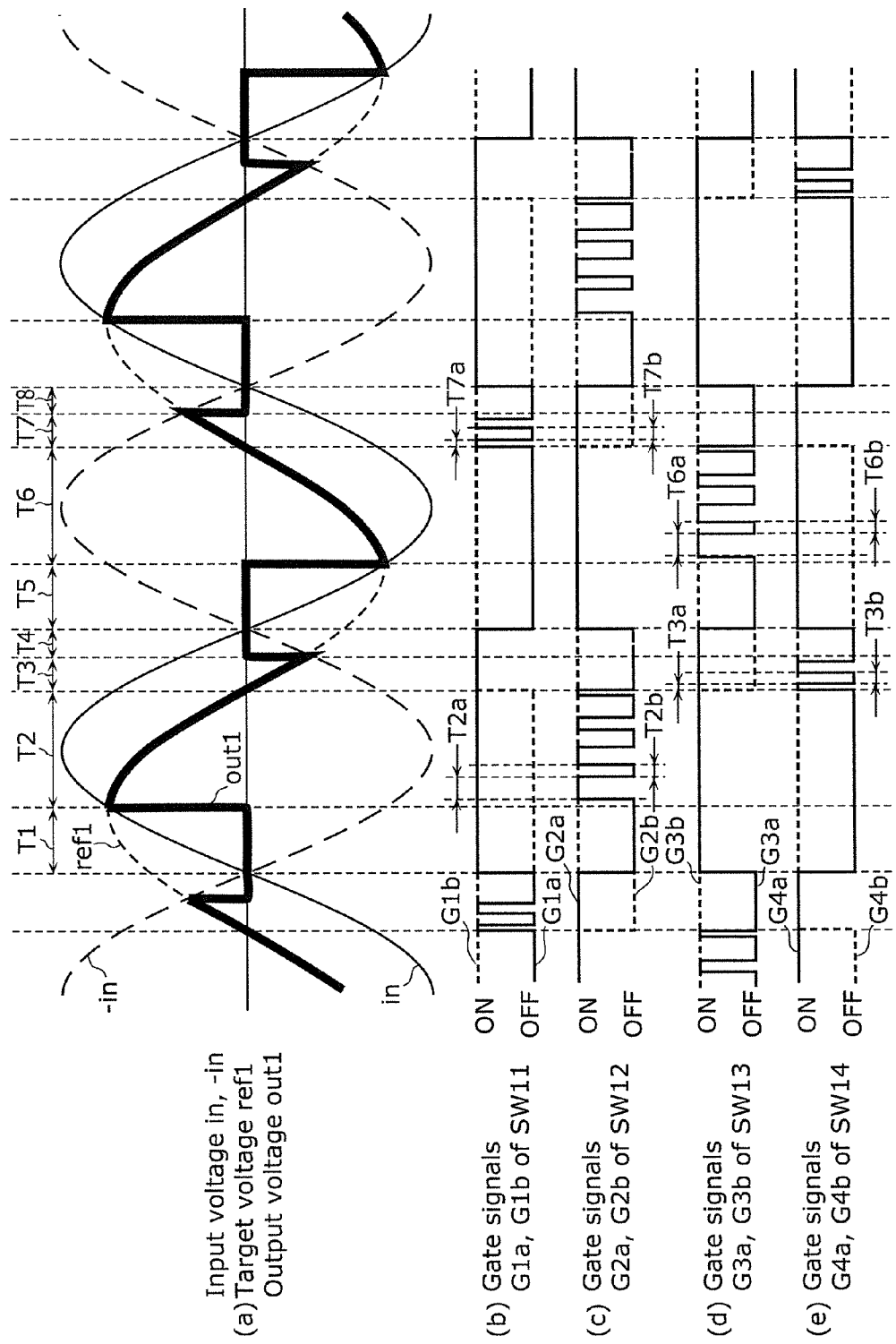

Time period T6a

Time periods T5, T6b

Time period T7a

Time periods T7b, T8

Time period T2a

Time periods T1, T2b

Time period T3a

Time periods T3b, T4

Time period T6a

Time periods T5, T6b

Time period T7a

Time periods T7b, T8

US 9,543,849 B2

POWER CONVERSION APPARATUS, POWER CONVERSION METHOD, MOTOR SYSTEM, AND THREE-PHASE MOTOR

TECHNICAL FIELD

The present invention relates generally to a power conversion apparatus and a power conversion method, and particularly to a technique of converting single-phase AC power into three-phase AC power and a three-phase motor driven by three-phase AC power obtained by converting single-phase AC power using such a technique.

BACKGROUND ART

Conventionally, power conversion apparatuses including a matrix converter have been in practical use (see Patent Literature (PTL) 1 and PTL 2, for example).

FIG. 20 is a circuit diagram of a matrix converter 200 disclosed in PTL 1. To drive a three-phase motor 203 using a single-phase AC power supply 201, the matrix converter 200 directly converts an input AC voltage supplied from the single-phase AC power supply 201 into a three-phase output AC voltage using bidirectional switches 202a to 202f, and supplies the output AC voltage of each phase to a winding of a corresponding phase of the three-phase motor 203.

Each of the bidirectional switches 202a to 202f includes two switching elements connected in inverse parallel, each capable of changing between a unidirectional conducting state and a non-conducting state. A magnitude determining unit 204 determines the magnitude relationship between the voltages at the terminals of the single-phase AC power supply 201. According to the magnitude relationship determined by the magnitude determining unit 204, a control unit 205 supplies a current to the windings of the three-phase motor 203 from the single-phase AC power supply 201, and controls the conduction of each of the bidirectional switches 202a to 202f to allow circulation of a regenerative current from the windings of the three-phase motor 203.

According to PTL 1, the matrix converter 200 having the above configuration allows the motor driving current to be stable, highly efficient, and highly reliable without a short circuit.

PTL 2 discloses a similar technique for driving a three-phase motor with a single-phase AC power supply, using a matrix converter.

CITATION LIST

Patent Literature

[PTL 1] Japanese Unexamined Patent Application Publication No. 2011-4449
[PTL 2] Japanese Unexamined Patent Application Publication No. 2010-154714

SUMMARY OF INVENTION

Technical Problem

However, with conventional matrix converters that convert a single-phase AC voltage into a three-phase AC voltage, the voltage of each phase of the motor is half the single-phase AC voltage. Consequently, the output of the motor decreases, and thus it is necessary to add, for example, a booster circuit between the single-phase AC power supply and the matrix converter. This causes such problems as: a shortened lifespan of the product due to an electrolytic capacitor of the booster circuit; power loss in the booster circuit; and an increased size resulting from the addition of the booster circuit.

It is an object of the present invention to provide: a power conversion apparatus and a power conversion method for converting a single-phase AC voltage into a three-phase AC voltage to make the voltage of each phase of the motor equal to the single-phase AC voltage; a motor system which includes such a power conversion apparatus; and a three-phase motor suitable for being driven by such a power conversion apparatus.

Solution to Problem

In order to solve the above-described problems, a power conversion apparatus according to an aspect of the present invention is a power conversion apparatus which converts an input voltage which is a single-phase AC voltage into output voltages forming a three-phase AC voltage, the power conversion apparatus including: a pair of input terminals to which the input voltage is applied; a pair of first output terminals which output a first one of the output voltages as a first-phase output voltage; a pair of second output terminals which output a second one of the output voltages as a second-phase output voltage; a pair of third output terminals which output a third one of the output voltages as a third-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; four third bidirectional switches each corresponding to a different combination of one of the paired input terminals and one of the paired third output terminals to switch connection and disconnection between the corresponding input terminal and third output terminal according to a corresponding one of third control signals; a target voltage designating unit configured to designate (i) a first target voltage representing, using a first one of AC voltages forming a three-phase AC voltage, consecutive target values of the first-phase output voltage, (ii) a second target voltage representing, using a second one of the AC voltages forming the three-phase AC voltage, consecutive target values of the second-phase output voltage, and (iii) a third target voltage representing, using a third one of the AC voltages forming the three-phase AC voltage, consecutive target values of the third-phase output voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage, and (iii) generate the third control signals to cyclically connect and disconnect the pair of the input terminals and the pair of the third output terminals via the third bidirectional switches at a duty cycle corresponding to a ratio of an instantaneous absolute value of the third target voltage to the instantaneous absolute value of the input voltage during a time period in which the instantaneous absolute value of the input voltage is greater than the instantaneous absolute value of the third target voltage; and a driver which supplies the generated first control signals to the first bidirectional switches, the generated second control signals to the second bidirectional switches, and the generated third control signals to the third bidirectional switches.

Advantageous Effects of Invention

The power conversion apparatus having the above configuration can convert a single-phase AC voltage into a three-phase AC voltage by the switching operation of the bidirectional switches. As a result, the three-phase AC voltage can be generated from the single-phase AC voltage with high efficiency without using a capacitor having a possibility of undermining the long-term reliability of the apparatus and without reducing the output of the motor.

A three-phase AC voltage generated from commercial power supply for households using the power conversion apparatus may be supplied independently to the winding of each phase of a three-phase induction motor or the winding of each phase of a three-phase synchronous motor. By doing so, it is possible to provide a broad range of home appliances with a highly reliable and long-life motor system which does not include a capacitor.

BRIEF DESCRIPTION OF DRAWINGS

FIG. 2 is a block diagram illustrating an example of a detailed configuration of a matrix switch and a three-phase motor according to Embodiment 1.

FIG. 3A is a graph illustrating an example of waveforms of main voltages used in a power conversion method according to Embodiment 1.

FIG. 3B is a graph illustrating an example of waveforms of main voltages used in a power conversion method according to Embodiment 1.

FIG. 3C is a graph illustrating an example of waveforms of main voltages used in a power conversion method according to Embodiment 1.

FIG. 12 is a timing chart illustrating an example of gate signals according to Variation 2 of Embodiment 1.

FIG. 14 is a timing chart illustrating an example of gate signals according to Embodiment 2.

FIG. 15 is a timing chart illustrating another example of gate signals according to Embodiment 2.

FIG. 16 is a timing chart illustrating another example of gate signals according to Embodiment 2.

DESCRIPTION OF EMBODIMENTS

Figure 1A:
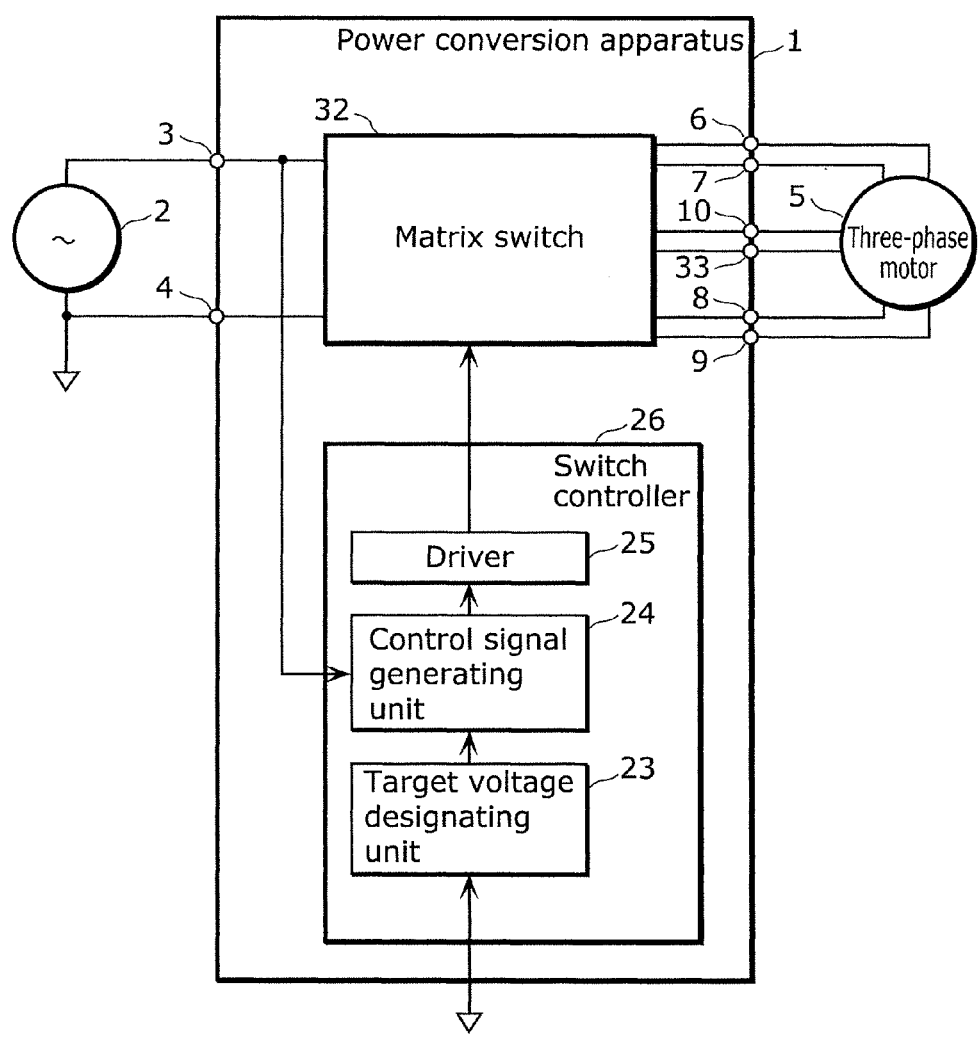
FIG. 1A is a block diagram illustrating an example of a functional configuration of a motor system including a power conversion apparatus according to Embodiment 1.

A power conversion apparatus according to an aspect of the present invention is a power conversion apparatus which converts an input voltage which is a single-phase AC voltage into output voltages forming a three-phase AC voltage, the power conversion apparatus including: a pair of input terminals to which the input voltage is applied; a pair of first output terminals which output a first one of the output voltages as a first-phase output voltage; a pair of second output terminals which output a second one of the output voltages as a second-phase output voltage; a pair of third output terminals which output a third one of the output voltages as a third-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; four third bidirectional switches each corresponding to a different combination of one of the paired input terminals and one of the paired third output terminals to switch connection and disconnection between the corresponding input terminal and third output terminal according to a corresponding one of third control signals; a target voltage designating unit configured to designate (i) a first target voltage representing, using a first one of AC voltages forming a three-phase AC voltage, consecutive target values of the first-phase output voltage, (ii) a second target voltage representing, using a second one of the AC voltages forming the three-phase AC voltage, consecutive target values of the second-phase output voltage, and (iii) a third target voltage representing, using a third one of the AC voltages forming the three-phase AC voltage, consecutive target values of the third-phase output voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage, and (iii) generate the third control signals to cyclically connect and disconnect the pair of the input terminals and the pair of the third output terminals via the third bidirectional switches at a duty cycle corresponding to a ratio of an instantaneous absolute value of the third target voltage to the instantaneous absolute value of the input voltage during a time period in which the instantaneous absolute value of the input voltage is greater than the instantaneous absolute value of the third target voltage; and a driver which supplies the generated first control signals to the first bidirectional switches, the generated second control signals to the second bidirectional switches, and the generated third control signals to the third bidirectional switches.

With such a configuration, the single-phase AC voltage can be converted into the three-phase AC voltage through the switching control by the bidirectional switches. As a result, the three-phase AC voltage can be generated from the single-phase AC voltage with high efficiency without using a booster circuit which includes a capacitor having a possibility of undermining the long-term reliability of the apparatus.

The target voltage designating unit may be configured to designate the first target voltage, the second target voltage, and the third target voltage using AC voltages forming a three-phase AC voltage which have: an amplitude $1/\sqrt{3}$ times smaller than an amplitude of the input voltage; a frequency identical to a frequency of the input voltage; and phase differences relative to the input voltage.

With such a configuration, a total duty cycle of 100% can be obtained from the output voltages of the three phases, and thus the input voltage can be effectively and stably converted into the output voltage of each phase.

The control signal generating unit may be configured to (i) generate the first control signals to (a) make a straight connection between the pair of the input terminals and the pair of the first output terminals during a time period in which the input voltage and the first target voltage have a same polarity and (b) make a cross connection between the pair of the input terminals and the pair of the first output terminals during a time period in which the input voltage and the first target voltage have different polarities, (ii) generate the second control signals to (a) make a straight connection between the pair of the input terminals and the pair of the second output terminals during a time period in which the input voltage and the second target voltage have a same polarity and (b) make a cross connection between the pair of the input terminals and the pair of the second output terminals during a time period in which the input voltage and the second target voltage have different polarities, and (iii) generate the third control signals to (a) make a straight connection between the pair of the input terminals and the pair of the third output terminals during a time period in which the input voltage and the third target voltage have a same polarity and (b) make a cross connection between the pair of the input terminals and the pair of the third output terminals during a time period in which the input voltage and the third target voltage have different polarities.

With such a configuration, it is possible to obtain a large output voltage having an amplitude twice larger than the amplitude of the input voltage at maximum.

The control signal generating unit may be configured to (i) generate the first control signals to constantly connect the pair of the input terminals and the pair of the first output terminals during a time period in which the instantaneous absolute value of the input voltage is less than or equal to the instantaneous absolute value of the first target voltage, (ii) generate the second control signals to constantly connect the pair of the input terminals and the pair of the second output terminals during a time period in which the instantaneous absolute value of the input voltage is less than or equal to the instantaneous absolute value of the second target voltage, and (iii) generate the second control signals to constantly connect the pair of the input terminals and the pair of the third output terminals during a time period in which the instantaneous absolute value of the input voltage is less than or equal to the instantaneous absolute value of the third target voltage.

With such a configuration, the effective use of the input voltage is possible because the first-phase output voltage, the second-phase output voltage, or the three-phase output voltage is regulated to have the largest generable value when the input voltage is insufficient relative to the first target voltage, the second target voltage, or the third target voltage.

The control signal generating unit may be configured to (i) generate the first control signals to constantly disconnect the pair of the input terminals and the pair of the first output terminals during a time period in which the instantaneous absolute value of the input voltage is less than or equal to the instantaneous absolute value of the first target voltage, (ii) generate the second control signals to constantly disconnect the pair of the input terminals and the pair of the second output terminals during a time period in which the instantaneous absolute value of the input voltage is less than or equal to the instantaneous absolute value of the second target voltage, and (iii) generate the third control signals to constantly disconnect the pair of the input terminals and the pair of the third output terminals during a time period in which the instantaneous absolute value of the input voltage is less than or equal to the instantaneous absolute value of the third target voltage.

With such a configuration, fluctuations of the input voltage can be reduced because the voltage supply is cut off when the input voltage is insufficient relative to the first target voltage, the second target voltage, or the third target voltage. In addition, the combination of switches which form a part of the path of a circulating current can be changed while the voltage supply is cut off, and thus there is no need to accurately change the switches when the input voltage becomes 0 V. As a result, misoperation can be prevented.

The control signal generating unit may be configured to (i) generate the first control signals to short-circuit the pair of the first output terminals when the pair of the input terminals and the pair of the first output terminals are disconnected, (ii) generate the second control signals to short-circuit the pair of the second output terminals when the pair of the input terminals and the pair of the second output terminals are disconnected, and (iii) generate the third control signals to short-circuit the pair of the third output terminals when the pair of the input terminals and the pair of the third output terminals are disconnected.

With such a configuration, the power efficiency increases because it is possible to allow the regenerative current from the load to circulate within the power conversion apparatus.

Each of the first bidirectional switches, each of the second bidirectional switches, and each of the third bidirectional switches may include two unidirectional switches connected in inverse parallel, each of the unidirectional switches may change between a forward-directional conducting state and a non-conducting state according to either a corresponding one of the first control signals, a corresponding one of the second control signals, or a corresponding one of the third control signals and not conduct in an opposite direction, and the control signal generating unit may be configured to (i)

generate, for short-circuiting the pair of the first output terminals, the first control signals to place, in the conducting state, all the unidirectional switches included in plural ones of the first bidirectional switches which are used for short-circuiting the pair of the first output terminals, (ii) generate, for short-circuiting the pair of the second output terminals, the second control signals to place, in the conducting state, all the unidirectional switches included in plural ones of the second bidirectional switches which are used for short-circuiting the pair of the second output terminals, and (iii) generate, for short-circuiting the pair of the third output terminals, the third control signals to place, in the conducting state, all the unidirectional switches included in plural ones of the third bidirectional switches which are used for short-circuiting the pair of the third output terminals.

With such a configuration, it is possible to allow the regenerative current from the load to circulate within the power conversion apparatus irrespective of the direction of the regenerative current.

Each of the first bidirectional switches, each of the second bidirectional switches, and each of the third bidirectional switches may include two unidirectional switches connected in inverse parallel, each of the unidirectional switches may change between a forward-directional conducting state and a non-conducting state according to either a corresponding one of the first control signals, a corresponding one of the second control signals, or a corresponding one of the third control signals and not conduct in an opposite direction, and the control signal generating unit may be configured to generate the first control signals, the second control signals, and the third control signals to (i) change between the conducting state and the non-conducting state of one of the two unidirectional switches to which the input voltage is applied in a forward direction and (ii) constantly place, in the conducting state, the other of the two unidirectional switches to which the input voltage is applied in the opposite direction.

With such a configuration, the power consumption required for the switching operations can be decreased by reducing the number of switching operations performed for changing the states of the unidirectional switches.

The control signal generating unit may be configured to (i) generate the first control signals to place, in a conducting state, plural ones of the first bidirectional switches which are determined depending on a polarity of the input voltage, when the pair of the input terminals and the pair of the first output terminals are connected, (ii) generate the second control signals to place, in a conducting state, plural ones of the second bidirectional switches which are determined depending on the polarity of the input voltage, when the pair of the input terminals and the pair of the second output terminals are connected, and (iii) generate the third control signals to place, in a conducting state, plural ones of the third bidirectional switches which are determined depending on the polarity of the input voltage, when the pair of the input terminals and the pair of the third output terminals are connected.

With such a configuration, the heat generated by each bidirectional switch is leveled out by leveling out the number of switching operations among the bidirectional switches. Thus, it is possible to reduce the disadvantages of decreased power and lower reliability caused by local overheating.

The control signal generating unit may be configured to generate the first control signals, the second control signals, and the third control signals to avoid overlap of a time period in which the pair of the input terminals and the pair of the first output terminals are connected, a time period in which the pair of the input terminals and the pair of the second output terminals are connected, and a time period in which the pair of the input terminals and the pair of the third output terminals are connected.

With such a configuration, the power feeding of the three phases can be performed in time periods which do not overlap each other in each cycle, as long as the total duty cycle for the three phases does not exceed 100%.

A power conversion method according to an aspect of the present invention is a power conversion method for converting an input voltage which is a single-phase AC voltage into output voltages forming a three-phase AC voltage, the power conversion method including: receiving the input voltage at a pair of input terminals; designating (i) a first target voltage representing, using a first one of AC voltages forming a three-phase AC voltage, consecutive target values of a first-phase output voltage that is a first one of the output voltages, (ii) a second target voltage representing, using a second one of the AC voltages forming the three-phase AC voltage, consecutive target values of a second-phase output voltage that is a second one of the output voltages, and (iii) a third target voltage representing, using a third one of the AC voltages forming the three-phase AC voltage, consecutive target values of a third-phase output voltage that is a third one of the output voltages; cyclically connecting and disconnecting the pair of the input terminals and a pair of first output terminals via first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage; cyclically connecting and disconnecting the pair of the input terminals and a pair of second output terminals via second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and cyclically connecting and disconnecting the pair of the input terminals and a pair of third output terminals via third bidirectional switches at a duty cycle corresponding to a ratio of an instantaneous absolute value of the third target voltage to the instantaneous absolute value of the input voltage during a time period in which the instantaneous absolute value of the input voltage is greater than the instantaneous absolute value of the third target voltage.

With such a configuration, it is possible to obtain a highly efficient and reliable power conversion method for converting a single-phase AC voltage into a three-phase AC voltage.

A motor system according to an aspect of the present invention is a motor system including: the above-described power conversion apparatus; a three-phase motor including: a first axis winding; a second axis winding; a third axis winding; a rotor; a pair of first power receiving terminals connected to the first axis winding; a pair of second power receiving terminals connected to the second axis winding; and a pair of third power receiving terminals connected to the third axis winding, the first axis winding, the second axis winding, and the third axis winding being not electrically connected within the three-phase motor; first feed lines connecting the pair of the first output terminals of the power conversion apparatus and the pair of the first power receiving terminals of the three-phase motor; and second feed lines connecting the pair of the second output terminals of the power conversion apparatus and the pair of the second power receiving terminals of the three-phase motor; and third feed lines connecting the pair of the third output terminals of the power conversion apparatus and the pair of the third power receiving terminals of the three-phase motor.

With such a configuration, a long-life three-phase motor which does not include a capacitor can be driven using the three-phase AC voltage converted from the single-phase AC voltage by the power conversion apparatus.

In the motor system, the three-phase motor may include a rotation angle sensor which outputs a rotation angle signal indicating consecutive rotation amounts of the rotor, the power conversion apparatus may further include a rotation angle obtaining unit configured to obtain the rotation angle signal, and the target voltage designating unit may be configured to perform vector control to change at least one of amplitude, frequency, and phase of the first target voltage, the second target voltage, and the third target voltage based on a difference between a rotation speed of the rotor determined from the obtained rotation angle signal and a speed command value.

In the motor system, the power conversion apparatus may further include: a current sensor which outputs current amount signals each indicating consecutive current amounts flowing in either the pair of the first output terminals, the pair of the second output terminals, or the pair of the third output terminals; and a current amount obtaining unit configured to obtain the current amount signals, and the target voltage designating unit may be configured to perform speed sensorless vector control to estimate a rotation speed of the rotor using the obtained consecutive current amounts, and change at least one of amplitude, frequency, and phase of the first target voltage, the second target voltage, and the third target voltage based on a difference between the estimated rotation speed and a speed command value.

With such a configuration, a motor system having a high controllability can be obtained.

A three-phase motor according to an aspect of the present invention is a three-phase motor including: a first axis winding; a second axis winding; a third axis winding; a rotor; a pair of first power receiving terminals connected to the first axis winding; a pair of second power receiving terminals connected to the second axis winding; and a pair of third power receiving terminals connected to the third axis winding, wherein the first axis winding, the second axis winding, and the third axis winding are not electrically connected within the three-phase motor.

With such a configuration, it is possible to obtain a long-life three-phase motor which does not include a capacitor and is suitable for being driven by the power conversion apparatus described above.

Hereinafter, a power conversion apparatus, a power conversion method, a motor system which includes such a power conversion apparatus, and a three-phase motor suitable for being driven by such a power conversion apparatus according to an aspect of the present invention will be described with reference to the accompanying drawings.

Each of the embodiments described below illustrates a specific example of the present invention. The numerical values, shapes, materials, structural elements, the arrangement and connection of the structural elements etc., shown in the following embodiments are mere examples, and are therefore not intended to limit the present invention. Among the structural elements in the following embodiments, structural elements not recited in any one of the independent claims are described as arbitrary structural elements.

Embodiment 1

FIG. 1A is a block diagram illustrating an example of a functional configuration of a motor system including a power conversion apparatus according to Embodiment 1. The motor system illustrated in FIG. 1A includes a power conversion apparatus 1, a three-phase motor 5, and feed lines connecting the power conversion apparatus 1 and the three-phase motor 5.

A single-phase AC power supply 2 supplies a single-phase AC voltage to the motor system. The single-phase AC power supply 2 may be a commercial power supply for households, for example.

The power conversion apparatus 1 converts an input voltage which is a single-phase AC voltage into output voltages forming a three-phase AC voltage. The power conversion apparatus 1 includes: a pair of input terminals 3 and 4 to which the single-phase AC power supply 2 applies the input voltage; a pair of first output terminals 6 and 7 which output a first one of the output voltages as a first-phase output voltage; a pair of second output terminals 8 and 9 which output a second one of the output voltages as a second-phase output voltage; a pair of third output terminals 10 and 33 which output a third one of the output voltages as a third-phase output voltage; a matrix switch 32; and a switch controller 26.

FIG. 2 is a block diagram illustrating an example of a detailed configuration of the three-phase motor 5 and the matrix switch 32.

The three-phase motor 5 is a three-phase induction motor or a three-phase synchronous motor, for example, and includes a first axis winding 51, a second axis winding 52, a third axis winding 53, a rotor 54, a pair of first power receiving terminals 56 and 57 connected to the first axis winding 51, a pair of second power receiving terminals 58 and 59 connected to the second axis winding 52, and a pair of third power receiving terminals 60 and 61 connected to the third axis winding 53.

The first axis winding 51, the second axis winding 52, and the third axis winding 53 are not electrically connected within the three-phase motor 5. The first axis winding 51, the second axis winding 52, and the third axis winding 53 may have the same electrical characteristics. The first power receiving terminals 56 and 57 are connected to the first output terminals 6 and 7 of the power conversion apparatus 1 via first feed lines, the second power receiving terminals 58 and 59 are connected to the second output terminals 8 and 9 of the power conversion apparatus 1 via second feed lines, and the third power receiving terminals 60 and 61 are connected to the third output terminals 10 and 33 of the power conversion apparatus 1 via third feed lines. It is to be noted that the number of the first axis winding 51, the second axis winding 52, and the third axis winding 53 need not be one each. It is also possible to form a multipolar motor using two or more first axis windings 51, second axis windings 52, and third axis windings 53, given that the number is the same for the first, second, and third axis windings 51, 52, and 53.

The matrix switch 32 includes first bidirectional switches 11 to 14, second bidirectional switches 15 to 18, and third bidirectional switches 19 to 22.

The first bidirectional switches 11 to 14 each correspond to a different combination of the input terminal 3 or 4 and the first output terminal 6 or 7, and switch between connection and disconnection between the corresponding one of the input terminals 3 and 4 and the corresponding one of the first output terminals 6 and 7 according to a corresponding one of first control signals G1a to G4b supplied by the switch controller 26.

The second bidirectional switches 15 to 18 each correspond to a different combination of the input terminal 3 or 4 and the second output terminal 8 or 9, and switch between connection and disconnection between the corresponding one of the input terminals 3 and 4 and the corresponding one of the second output terminals 8 and 9 according to a corresponding one of second control signals G5a to G8b supplied by the switch controller 26.

The third bidirectional switches 19 to 22 each correspond to a different combination of the input terminal 3 or 4 and the third output terminal 10 or 33, and switch between connection and disconnection between the corresponding one of the input terminals 3 and 4 and the corresponding one of the third output terminals 10 and 33 according to a corresponding one of third control signals G9a to G12b supplied by the switch controller 26.

As illustrated with the representative first bidirectional switch 13, each of the first bidirectional switches 11 to 14, each of the second bidirectional switches 15 to 18, and each of the third bidirectional switches 19 to 22 may include, for example, two unidirectional switches connected in inverse parallel.

For example, a single unidirectional switch may be a reverse-blocking Isolated Gate Bipolar Transistor (IGBT) M1 or M2, or may be formed as a circuit in which an IGBT M3 and a diode D1 are connected in series or a circuit in which an IGBT M4 and a diode D2 are connected in series.

Each unidirectional switch changes its state between a unidirectional conducting state and a non-conducting state according to one of the first control signals G1a to G4b, the second control signals G5a to G8b, and the third control signals G9a to G12b, and does not conduct in the opposite direction.

Each bidirectional switch can be formed with a single element by using a bidirectional, gallium nitride (GaN)-based Hetero Field Effect Transistor (HFET) M5. In the case of using the bidirectional, GaN-based HFET, a bidirectional switch can be formed by providing, between the source and drain, two gates to which control signals independent of each other can be applied.

Forming each bidirectional switch with a single element reduces the circuit area. Additionally, the two gates being adjacent to each other in the element allow the two gate signal lines to be formed with substantially the same length, thereby reducing delay between the gate signals. As a result, the control over the dead time and the commutation circuit increases, and thus misoperation can be prevented.

The state of each bidirectional switch described above can be changed to any of the following states: a conducting state in which a current flows bidirectionally; a conducting state in which a current flows only in the upward direction or the downward direction of the drawing; and a non-conducting state.

The matrix switch 32 can connect, by straight connection or cross connection, and disconnect the pair of the input terminals 3 and 4 and the pair of the first output terminals 6 and 7 via the first bidirectional switches 11 to 14 according to the first control signals G1a to G4b.

Here, the straight connection between the pair of the input terminals 3 and 4 and the pair of the first output terminals 6 and 7 is defined as connection between the input terminals 3 and 4 and the first output terminals 6 and 7 in such combinations that the input voltage applied to the input terminals 3 and 4 is supplied to the first output terminals 6 and 7 with the same polarity (also referred to as non-inverting voltage supply).

The cross connection between the pair of the input terminals 3 and 4 and the pair of the first output terminals 6 and 7 is defined as connection between the input terminals 3 and 4 and the first output terminals 6 and 7 in such combinations that the input voltage applied to the input terminals 3 and 4 is supplied to the first output terminals 6 and 7 with the opposite polarity (also referred to as inverting voltage supply).

The disconnection between the pair of the input terminals 3 and 4 and the pair of the first output terminals 6 and 7 is defined as disconnection of at least one of the input terminals 3 and 4 from both of the first output terminals 6 and 7 to cut off the supply of the input voltage applied to the pair of the input terminals 3 and 4, to the pair of the first output terminals 6 and 7.

Similarly, the matrix switch 32 can connect, by straight connection or cross connection, and disconnect the pair of the input terminals 3 and 4 and the pair of the second output terminals 8 and 9 via the second bidirectional switches 15 to 18 according to the second control signals G5a to G8b. The definitions of the straight connection, cross connection, and disconnection between the pair of the input terminals 3 and 4 and the pair of the second output terminals 8 and 9 are the same as those described above.

Similarly, the matrix switch 32 can connect, by straight connection or cross connection, and disconnect the pair of the input terminals 3 and 4 and the pair of the third output terminals 10 and 33 via the third bidirectional switches 19 to 22 according to the third control signals G9a to G12b. The definitions of the straight connection, cross connection, and disconnection between the pair of the input terminals 3 and 4 and the pair of the third output terminals 10 and 33 are the same as those described above.

The switch controller 26 is a controller of the matrix switch 32. The switch controller 26 generates the first control signals G1a to G4b, the second control signals G5a to G8b, and the third control signals G9a to G12b, and supplies them to the matrix switch 32 so that the input voltage that is a single-phase AC voltage is converted into the output voltages forming a three-phase AC voltage via the matrix switch 32.

The switch controller 26 may be implemented as an analog circuit including an oscillator, a comparator, a multiplier, and so on. The switch controller 26 may also be implemented as a software function performed by a processor executing a certain program.

As illustrated in FIG. 1A, the switch controller 26 includes a target voltage designating unit 23, a control signal generating unit 24, and a driver 25.

The target voltage designating unit 23 designates (i) a first target voltage representing, using a first one of AC voltages forming a three-phase AC voltage, consecutive target values of the first-phase output voltage, (ii) a second target voltage representing, using a second one of the AC voltages forming the three-phase AC voltage, consecutive target values of the second-phase output voltage, and (iii) a third target voltage representing, using a third one of AC voltages forming the three-phase AC voltage, consecutive target values of the third-phase output voltage.

The control signal generating unit 24 generates the first control signals G1a to G4b, the second control signals G5a to G8b, and the third control signals G9a to G12b.

The first control signals G1a to G4b are control signals for cyclically connecting and disconnecting the pair of the input terminals 3 and 4 and the pair of the first output terminals 6 and 7. The first control signals G1a to G4b are generated based on a comparison between the input voltage and the first target voltage in terms of the polarity and the instantaneous absolute value.

The second control signals G5a to G8b are control signals for cyclically connecting and disconnecting the pair of the input terminals 3 and 4 and the pair of the second output terminals 8 and 9. The second control signals G5a to G8b are generated based on a comparison between the input voltage and the second target voltage in terms of the polarity and the instantaneous absolute value.

The third control signals G9a to G12b are control signals for cyclically connecting and disconnecting the pair of the input terminals 3 and 4 and the pair of the third output terminals 10 and 33. The third control signals G9a to G12b are generated based on a comparison between the input voltage and the third target voltage in terms of the polarity and the instantaneous absolute value.

When the input terminal 4 is grounded with sufficiently low impedance, the control signal generating unit 24 obtains the voltage at the input terminal 3 to detect, as the input voltage, the voltage at the input terminal 3 relative to the ground voltage.

Figure 1B:
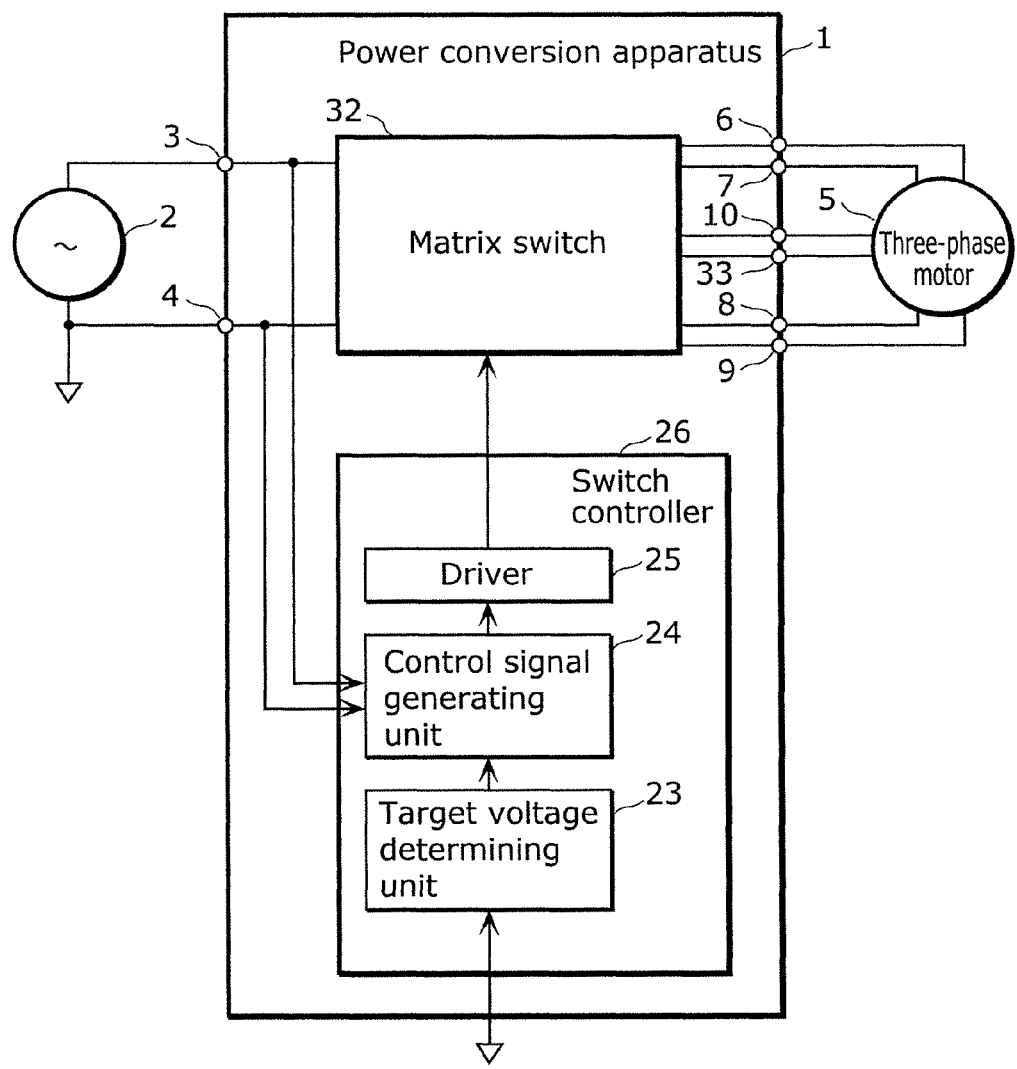
FIG. 1B is a block diagram illustrating another example of a motor system according to Embodiment 1.

Irrespective of whether the input terminal 4 is grounded or not, the control signal generating unit 24 may detect the voltage between the input terminals 3 and 4 to detect this voltage between the terminals as the input voltage, as illustrated in FIG. 1B.

The driver 25 supplies the generated first control signals G1a to G4b to the first bidirectional switches 11 to 14, the generated second control signals G5a to G8b to the second bidirectional switches 15 to 18, and the generated third control signals G9a to G12b to the third bidirectional switches 19 to 22.

The following describes a power conversion method performed by the power conversion apparatus 1 having the above configuration.

Figure 3D:
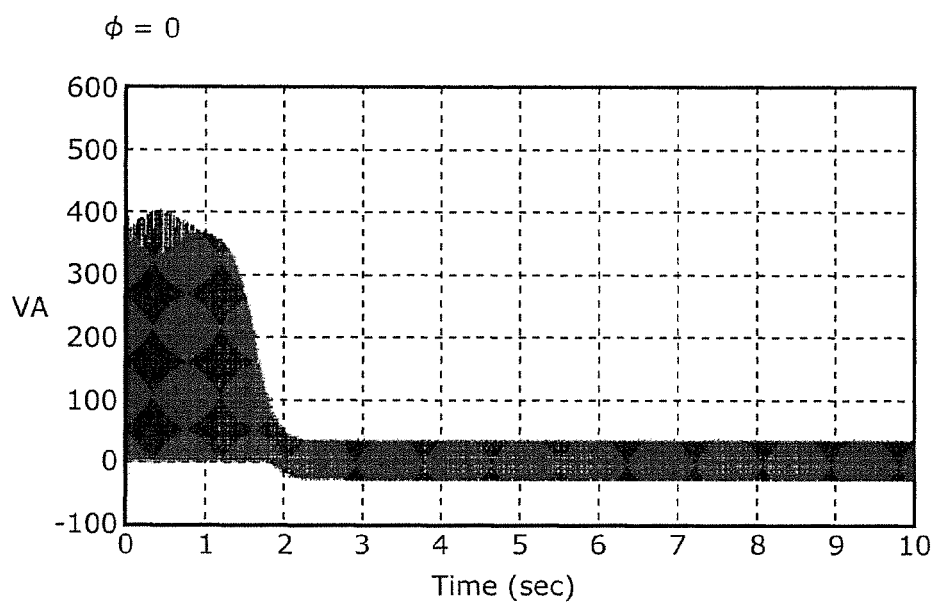
FIG. 3D illustrates apparent power of a single-phase AC power supply when a motor is actuated according to Embodiment 1.
Figure 3E:
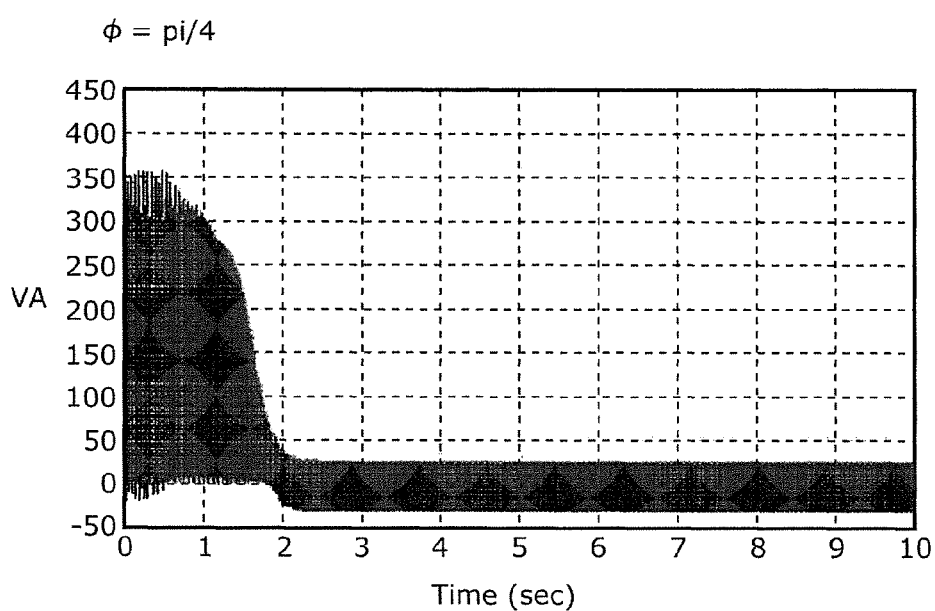
FIG. 3E illustrates apparent power of a single-phase AC power supply when a motor is actuated according to Embodiment 1.
Figure 3F:
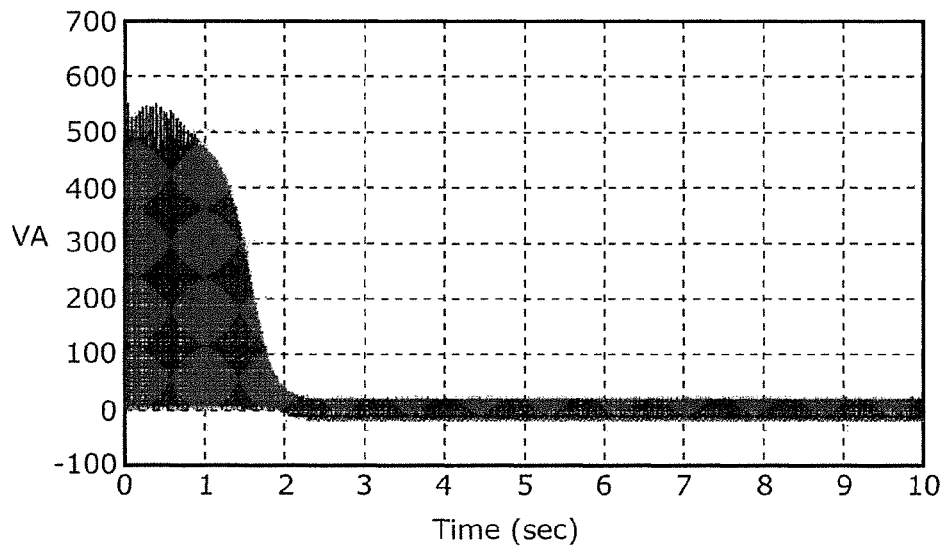
FIG. 3F illustrates apparent power of a single-phase AC power supply when a motor is actuated according to Embodiment 1.
Figure 3G:
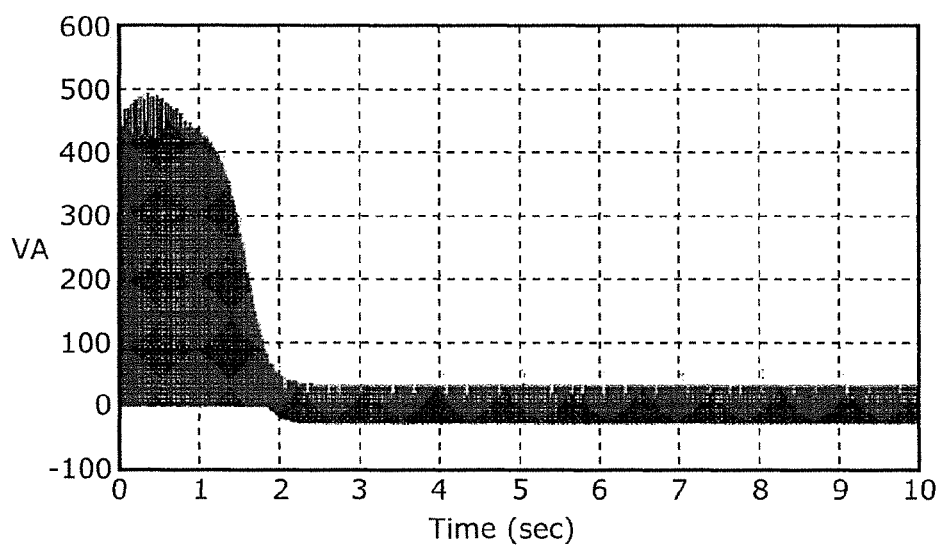
FIG. 3G illustrates apparent power of a single-phase AC power supply when a motor is actuated according to Embodiment 1.

Each of FIG. 3A to FIG. 3C is a graph illustrating an example of waveforms of main voltages used in the power conversion method. Referring to FIG. 3A to FIG. 3C, the fundamental idea of the power conversion method will be first described.

Each of FIG. 3A to FIG. 3C illustrates a typical example of waveforms of input voltages in and −in, a first target voltage ref1, a second target voltage ref2, a third target voltage ref3, a first-phase output voltage out1, a second-phase output voltage out2, and a third-phase output voltage out3.

Any one of the input voltages in and −in is a single-phase AC voltage applied to the input terminals 3 and 4 from the single-phase AC power supply 2. The input voltage in is a voltage at the input terminal 3 relative to the input terminal 4, and the input voltage −in is a voltage at the input terminal 4 relative to the input terminal 3.

As an example, the input voltage in is expressed as $(\sqrt{2})$ V sin $(\omega t)$ when a sinusoidal AC voltage having V as the effective value of the voltage is applied between the input terminals 3 and 4. Here, ω denotes angular frequency, and ω is 2πf when the frequency of the sinusoidal AC voltage is f. In addition, t denotes time. When using the Japanese commercial power supply for households as the input voltage, V is 100 [V] and f is 50 [Hz] or 60 [Hz].

Each of the first target voltage ref1, the second target voltage ref2, and the third target voltage ref3 is one of three AC voltages forming a three-phase AC voltage designated by the target voltage designating unit 23. The first target voltage ref1, the second target voltage ref2, and the third target voltage ref3 represent consecutive target values (that is, target values at respective points of time) of the first-phase output voltage out1, the second-phase output voltage out2, and the third-phase output voltage out 3, respectively.

For example, when driving the three-phase motor using the first-phase output voltage out1, the second-phase output voltage out2, and the third-phase output voltage out 3, AC voltages which are the same in frequency and different in phase are used as the first target voltage ref1, the second target voltage ref2, and the third target voltage ref3. The frequency, amplitude, and phase difference of the first target voltage ref1, the second target voltage ref2, and the third target voltage ref3 are appropriately determined for controlling the rotation speed and/or torque and according to the structure of the three-phase motor being driven.

As an example, the first target voltage ref1, the second target voltage ref2, and the third target voltage ref3 may be sinusoidal AC voltages having the same frequency as the frequency of the input voltage in, an amplitude $1/\sqrt{3}$ times smaller than the amplitude of the input voltage in, and phase differences of −45 degrees, +75 degrees, and −165 degrees relative to the input voltage in. In this case, the first target voltage ref1 is expressed as $\sqrt{(2/3)}$ V sin $(\omega t-\pi/4)$, the second target voltage ref2 is expressed as $\sqrt{(2/3)}$ V sin $(\omega t+5\pi/12)$, and the third target voltage ref3 is expressed as $\sqrt{(2/3)}$ V sin $(\omega t-11\pi/12)$.

It is to be noted that the first target voltage ref1, the second target voltage ref2, and the third target voltage ref3 may be given a phase difference of any value relative to the input voltage in as long as ref2 has a phase difference of +120 degrees relative to ref1 and ref3 has a phase difference of −120 degrees relative to ref1. Given that ref1 has a phase difference of ϕ relative to the input voltage in, the first target voltage ref1, the second target voltage ref2, and the third target voltage ref3 are expressed as $\sqrt{(2/3)}$ V sin $(\omega t+\phi)$, $\sqrt{(2/3)}$ V sin $(\omega t+2\pi/3+\phi)$, and $\sqrt{(2/3)}$ V sin $(\omega t-2\pi/3+\phi)$, respectively.

Each of FIG. 3D to FIG. 3G is a plot of apparent power VA of the single-phase AC power supply 2 when a motor is actuated, for different values of ϕ. As is clear from FIG. 3D to FIG. 3G, the apparent power when the motor is actuated is lowest in the case of $\phi=\pi/4$, which means that grid power demanded by the general households is lowest. In this case, the first target voltage ref1, the second target voltage ref2, and the third target voltage ref3 have phase differences of +45 degrees, +165 degrees, and −75 degrees relative to the input voltage in, respectively.

The power conversion apparatus 1 converts the input voltage in into the first-phase output voltage out1 based on the relationship between the input voltage in and the first target voltage ref1 in terms of the sign and the instantaneous absolute value.

As illustrated in FIG. 3A, during the time periods T2, T3, T6 and T7 in which the instantaneous absolute value of the input voltage in is greater than the instantaneous absolute value of the first target voltage ref1 (in other words, the absolute value of the input voltage is excessive), the power conversion apparatus 1 cyclically connects and disconnects the pair of the input terminals 3 and 4 and the pair of the first output terminals 6 and 7 via the first bidirectional switches 11 to 14 to regulate the average of the first-phase output voltage out1 in a short period of time (e.g., average for each cycle) to be the instantaneous value of the first target voltage ref1.

Such control may be performed through PWM control, for example. As the cycles of the PWM control, cycles sufficiently short compared to the cycles of the input voltage in, the first target voltage ref1, and the second target voltage ref2 are used (e.g., cycles of a PWM carrier signal having a frequency of 20 kHz).

The PWM control consecutively changes the connection period per cycle so that the duty cycle, i.e., a ratio of a connection period to the PWM cycle, equals a ratio of the instantaneous value of the first target voltage ref1 to the instantaneous value of the input voltage in. As a result, the average of the first-phase output voltage out1 per cycle is regulated to be the instantaneous value of the first target voltage ref1. The waveform of the first-phase output voltage out1 in FIG. 3A shows the average of the first-phase output voltage out1 per cycle.

It is to be noted that such regulation can be performed not only by the PWM control but also by other known control methods such as Pulse Density Modulation (PDM) control which consecutively changes the length of each cycle with the connection period being constant.

During the time periods T1, T4, T5 and T8 in which the instantaneous absolute value of the input voltage in is less than or equal to the instantaneous absolute value of the first target voltage ref1 (in other words, the absolute value of the input voltage is insufficient), the power conversion apparatus 1 constantly connects the pair of the input terminals 3 and 4 and the pair of the first output terminals 6 and 7 via the first bidirectional switches 11 to 14 to regulate the absolute value of the first-phase output voltage out1 to be the largest generable value.

However, during the time periods in which the absolute value of the input voltage is insufficient, the power conversion apparatus 1 may continuously disconnect the pair of the input terminals 3 and 4 and the pair of the first output terminals 6 and 7 to make the first-phase output voltage out1 zero (i.e., the voltage supply may be suspended). Such an embodiment will be described in detail later.

When connecting the pair of the input terminals 3 and 4 and the pair of the first output terminals 6 and 7, the power conversion apparatus 1 makes a straight connection during the time periods (T1, T2, T5, and T6) in which the input voltage in and the first target voltage ref1 have the same polarity, and makes a cross connection during the time periods (T3, T4, T7, and T8) in which the input voltage in and the first target voltage ref1 have different polarities.

In such a manner, the power conversion apparatus 1 converts the input voltage in into the first-phase output voltage out1.

Furthermore, the power conversion apparatus 1 converts the input voltage in into the second-phase output voltage out2 based on the relationship between the input voltage in and the second target voltage ref2 in terms of the sign and the instantaneous absolute value.

As illustrated in FIG. 3B, the relationship between the input voltage in and the first target voltage ref1 established in terms of the sign and the instantaneous absolute value in the time periods T1 to T8 illustrated in FIG. 3A is identically established between the input voltage in and the second target voltage ref2 in the time periods T1 to T8 illustrated in FIG. 3B. The power conversion apparatus 1 applies the same idea as described above to the input voltage in and the second target voltage ref2 to convert the input voltage in into the second-phase output voltage out2. As with the waveform of the first-phase output voltage out1, the waveform of the second-phase output voltage out2 in FIG. 3B is represented by the average per cycle.

Furthermore, the power conversion apparatus 1 converts the input voltage in into the third-phase output voltage out3 based on the relationship between the input voltage in and the third target voltage ref3 in terms of the sign and the instantaneous absolute value.

As illustrated in FIG. 3C, the relationship between the input voltage in and the first target voltage ref1 established in terms of the sign and the instantaneous absolute value in the time periods T1 to T8 illustrated in FIG. 3A is identically established between the input voltage in and the third target voltage ref3 in the time periods T1 to T8 illustrated in FIG. 3C. The power conversion apparatus 1 applies the same idea as described above to the input voltage in and the third target voltage ref3 to convert the input voltage in into the third-phase output voltage out3. As with the waveform of the first-phase output voltage out1, the waveform of the third-phase output voltage out3 in FIG. 3C is represented by the average per cycle.

Next, the following describes the processing performed by the switch controller 26 to execute such a power conversion method.

Figure 4:
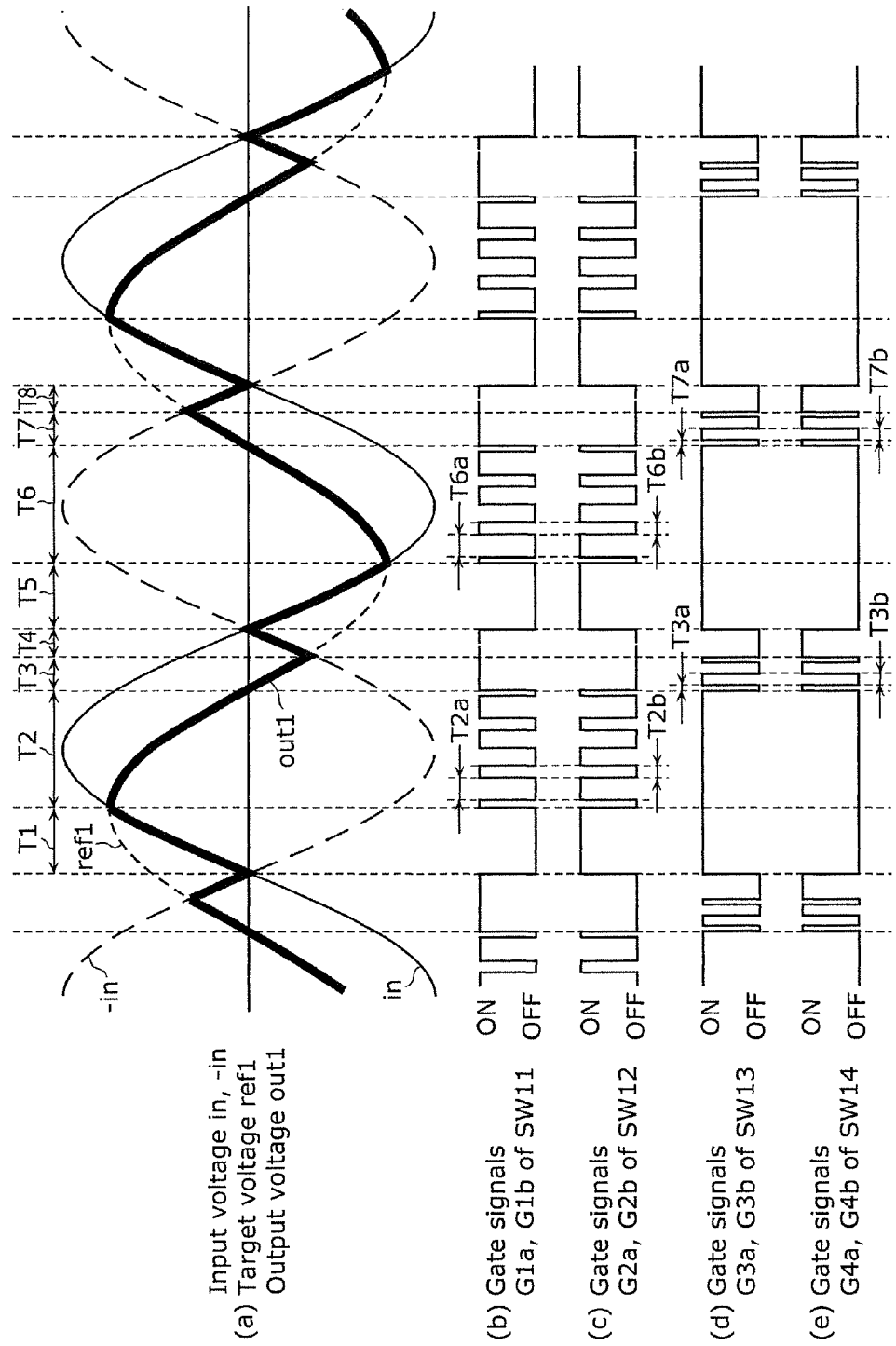
FIG. 4 is a timing chart illustrating an example of gate signals according to Embodiment 1.

FIG. 4 is a timing chart illustrating an example of the waveforms of the input voltages in and −in, the target voltage ref1 designated by the target voltage designating unit 23, the first control signals G1a to G4b generated by the control signal generating unit 24, and the output voltage out1. The waveform of the output voltage out1 is represented by the average of the output voltage out1 per cycle. The time periods T1 to T8 correspond to the time periods T1 to T8 in FIG. 3A, respectively.

In FIG. 4 and the following description, the first bidirectional switches 11 to 14 are denoted as SW11 to SW14, respectively, and the first control signals G1a to G4b are denoted as gate signals G1a to G4b of SW11 to SW14, respectively. The ON level of the gate signals G1a to G4b indicates a signal level for placing the unidirectional switches forming the SW11 to SW14 in the conducting state, whereas the OFF level of the gate signals G1a to G4b indicates a signal level for placing the unidirectional switches forming the SW11 to SW14 in the non-conducting state.

FIG. 5A to FIG. 5H are circuit diagrams each illustrating: the conduction states of SW11 to SW14 that are set according to the gate signals G1a to G4b illustrated in FIG. 4 in the time periods T1 to T8; and the current path of the first axis winding 51 determined accordingly. In FIG. 5A to FIG. 5H, the conducting state and the non-conducting state of each of the unidirectional switches forming SW11 to SW14 are denoted by a solid line and a dotted line, respectively, and the current path of the first axis winding 51 is denoted by a thick dashed arrow.

For simplicity, FIG. 4, FIG. 5A to FIG. 5H, and the following description focus on the first target voltage ref1, the gate signals G1a to G4b, and SW11 to SW14 which are for converting the input voltage in into the first-phase output voltage out1.

It is to be noted that the same holds true for: the second target voltage ref2, the second control signals G5a to G8b, and the bidirectional switches 15 to 18 which are for converting the input voltage in into the second-phase output voltage out2; and the third target voltage ref3, the third control signals G9a to G12b, and the bidirectional switches 19 to 22 which are for converting the input voltage in into the third-phase output voltage out3.

The target voltage designating unit 23 designates the first target voltage ref1 that is a voltage of one of the three phases of the three-phase AC voltage. For example, the target voltage designating unit 23 designates the first target voltage ref1 by actually generating the first target voltage ref1 using an oscillator or by showing the consecutive instantaneous values of the first target voltage ref1 as time-series data.

The control signal generating unit 24 consecutively (e.g., per PWM cycle) determines one of the time periods T1 to T8 as the current period based on a comparison between the instantaneous value of the input voltage in and the instantaneous value of the first target voltage ref1. The control signal generating unit 24 then generates the gate signals G1a to G4b for performing one of the continuous non-inverting voltage supply, the non-inverting voltage supply through the PWM control, the continuous inverting voltage supply, and the inverting voltage supply through the PWM control, according to the determined time period.

In the time periods T1 and T5, the gate signals G1a to G4b for the continuous non-inverting voltage supply are generated.

The control signal generating unit 24 determines the time period T1 as the current period based on 0<in≤ref1 (condition 1), and determines the time period T5 as the current period based on 0>in≥ref1 (condition 5).

Upon determination of the time period T1 or T5, the control signal generating unit 24 sets the gate signals G1a and G2b of SW12 and the gate signals G3a and G3b of SW13 to the ON level, and sets the gate signals G1a and G1b of SW11 and the gate signals G4a and G4b of SW14 to the OFF level.

Figure 5A:
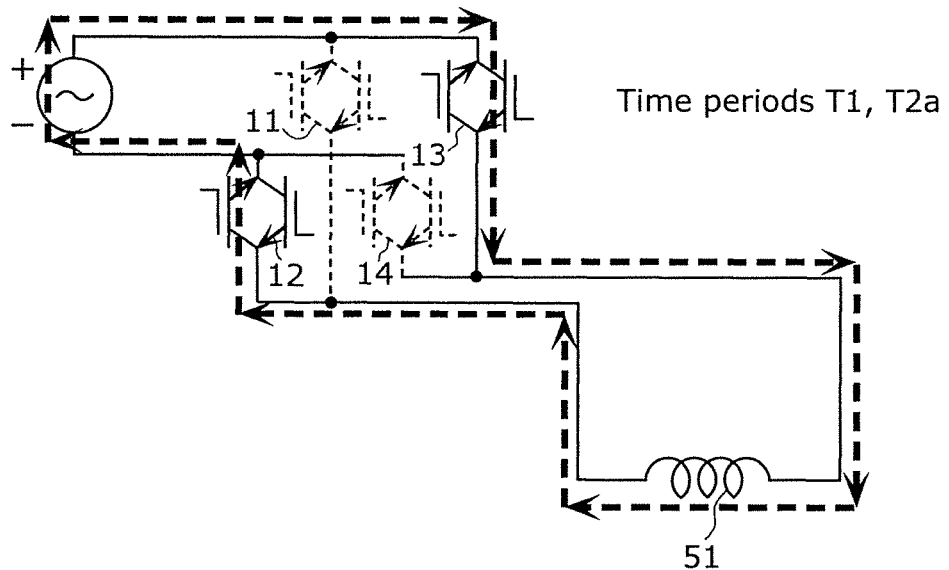
FIG. 5A is a circuit diagram illustrating an example of the states of switches and a current path according to Embodiment 1.
Figure 5B:
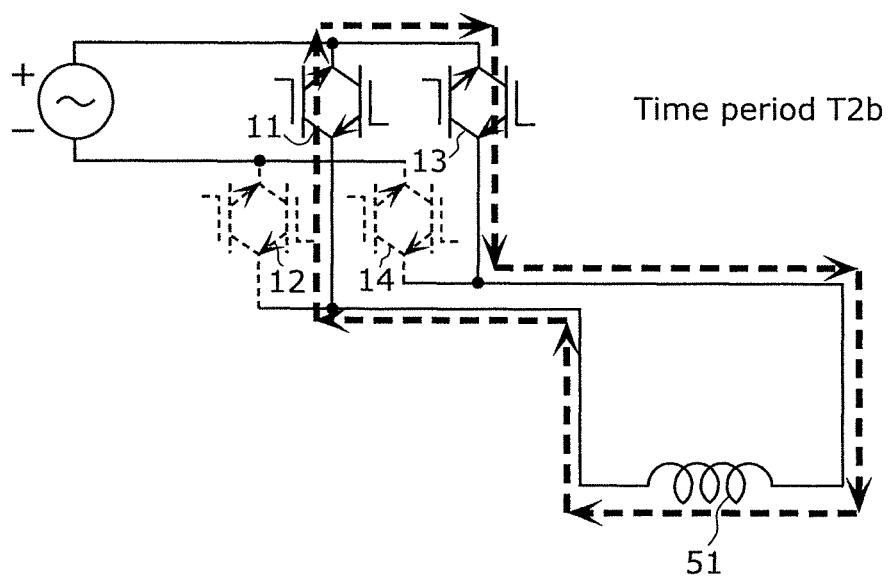
FIG. 5B is a circuit diagram illustrating an example of the states of switches and a current path according to Embodiment 1.
Figure 5C:
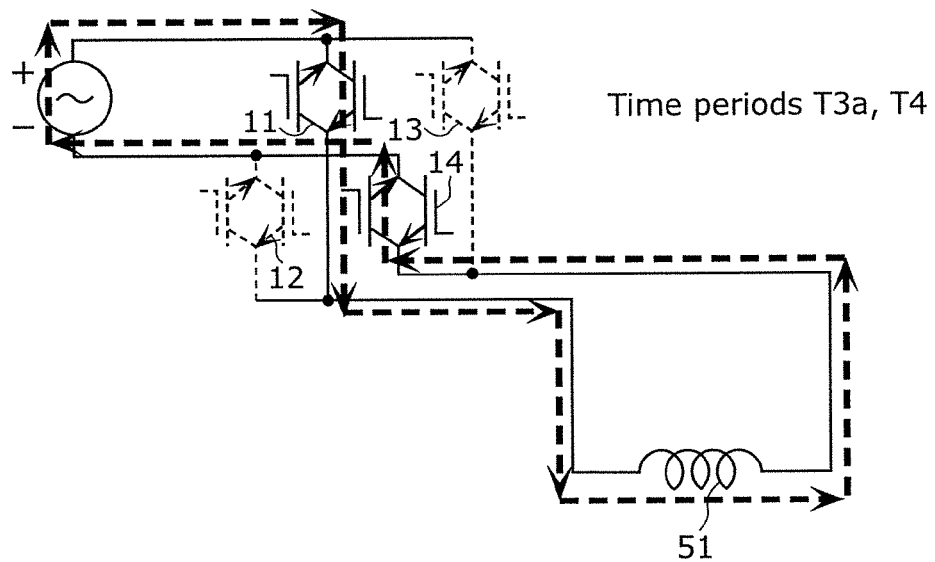
FIG. 5C is a circuit diagram illustrating an example of the states of switches and a current path according to Embodiment 1.
Figure 5D:
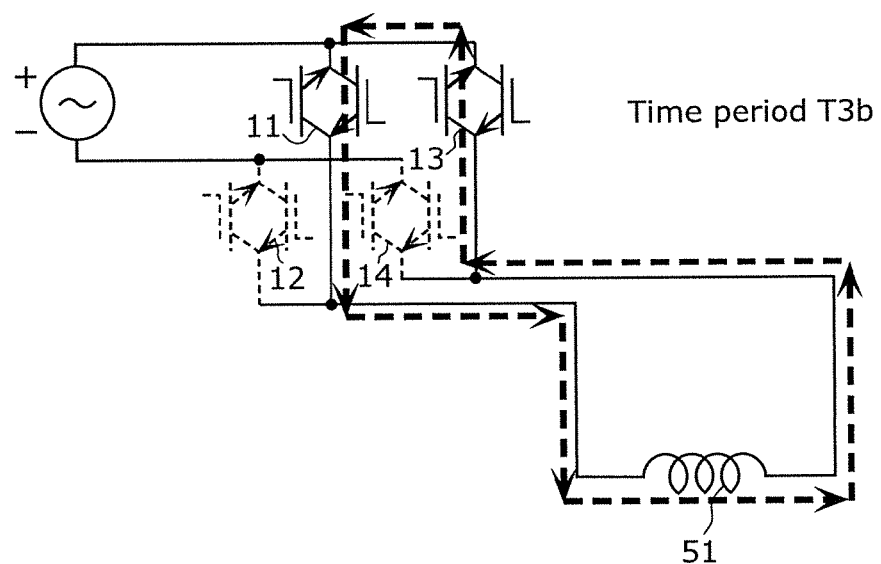
FIG. 5D is a circuit diagram illustrating an example of the states of switches and a current path according to Embodiment 1.
Figure 5E:
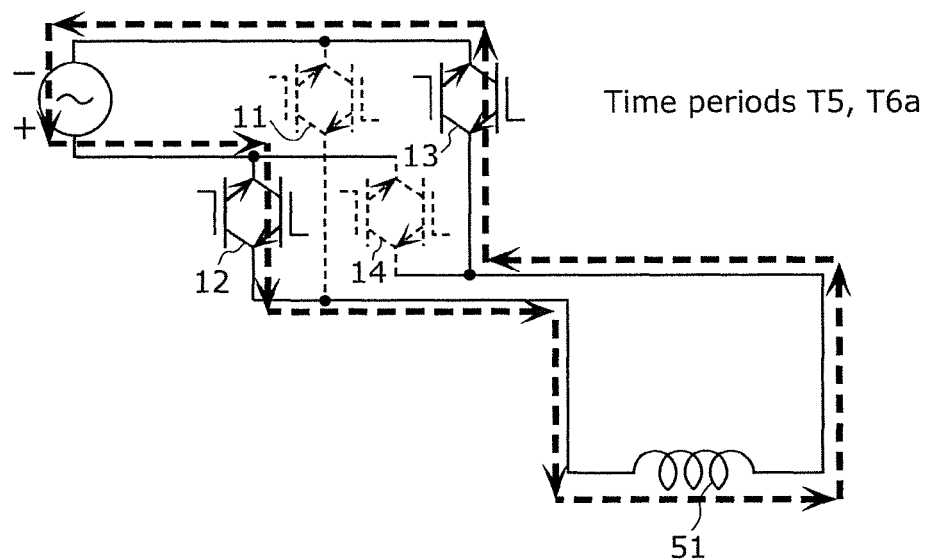
FIG. 5E is a circuit diagram illustrating an example of the states of switches and a current path according to Embodiment 1.

According to such gate signals G1a to G4b, in the time periods T1 and T5, the conduction states of SW11 to SW14 and the current path of the first axis winding 51 are set as illustrated in FIG. 5A and FIG. 5E for making a straight connection between the pair of the input terminals 3 and 4 and the pair of the first output terminals 6 and 7, to perform the continuous non-inverting voltage supply.

In the time periods T2 and T6, the first control signals G1a to G4b for the non-inverting voltage supply through the PWM control are generated.

The control signal generating unit 24 determines the time period T2 as the current period based on 0<ref1<in (condition 2), and determines the time period T6 as the current period based on 0>ref1>in (condition 6).

Upon determination of the time period T2 or T6, the control signal generating unit 24 sets the levels of the gate signals G1a to G4b in power feeding period T2a, T6a in the same manner as in the time period T1, T5. Each of the power feeding periods T2a and T6a mentioned here is a part of the PWM cycle.

The control signal generating unit 24 consecutively changes the lengths of the power feeding periods T2a and T6a so that the ratio of the power feeding period T2a, T6a to the PWM cycle equals the ratio of the instantaneous value of the first target voltage ref1 to the instantaneous value of the input voltage in. In the example illustrated in FIG. 4, the lengths of the power feeding periods T2a and T6a are gradually reduced, and become zero at the end of the time periods T2 and T6.

Furthermore, the control signal generating unit 24 sets the gate signals G1a and G1b of SW11 and the gate signals G3a and G3b of SW13 to the ON level, and sets the gate signals G1a and G2b of SW12 and the gate signals G4a and G4b of SW14 to the OFF level in regeneration periods T2b and T6b, each of which is the remaining part of the PWM cycle.

Figure 5F:
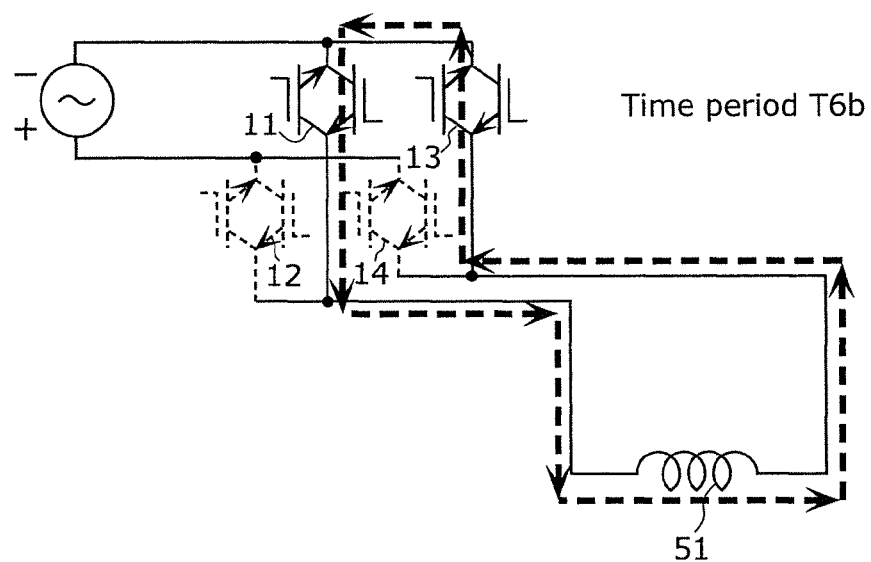
FIG. 5F is a circuit diagram illustrating an example of the states of switches and a current path according to Embodiment 1.

According to such gate signals G1a to G4b, in the time periods T2a and T6a, the conduction states of SW11 to SW14 and the current path of the first axis winding 51 are set as illustrated in FIG. 5A and FIG. 5E for making a straight connection between the pair of the input terminals 3 and 4 and the pair of the first output terminals 6 and 7, to perform the non-inverting voltage supply. Furthermore, in the time periods T2a and T6a, the conduction states of SW11 to SW14 and the current path of the first axis winding 51 are set as illustrated in FIG. 5B and FIG. 5F for short-circuiting the pair of the first output terminals 6 and 7, to perform power regeneration which allows circulation, within the matrix switch 32, of a regenerative current from the first axis winding 51. As a result, the non-inverting voltage supply through the PWM control (cyclical power feeding and regeneration) is performed in the time periods T2 and T6.

In the time periods T3 and T7, the gate signals G1a to G4b for the inverting voltage supply through the PWM control are generated.

The control signal generating unit 24 determines the time period T3 as the current period based on 0>ref1>−in (condition 3), and determines the time period T7 as the current period based on 0<ref1<−in (condition 7).

Upon determination of the time period T3 or T7, the control signal generating unit 24 sets the gate signals G1a and G1b of SW11 and the gate signals G4a and G4b of SW14 to the ON level and sets the gate signals G1a and G2b of SW12 and the gate signals G3a and G3b of SW13 to the OFF level in power feeding period T3a, T7a each of which is a part of the PWM cycle.

The control signal generating unit 24 consecutively changes the lengths of the power feeding periods T3a and T7a so that the ratio of the power feeding period T3a, T7a to the PWM cycle equals the ratio of the instantaneous value of the first target voltage ref1 to the instantaneous value of the input voltage in. In the example illustrated in FIG. 4, the lengths of the power feeding periods T3a and T7a are zero at the beginning of the time periods T3 and T7, and are gradually increased afterward.

Furthermore, in regeneration periods T3b and T7b, each of which is the remaining part of the PWM cycle, the control signal generating unit 24 sets the levels of the gate signals G1a to G4b in the same manner as in the time periods T2b and T6b, respectively.

Figure 5G:
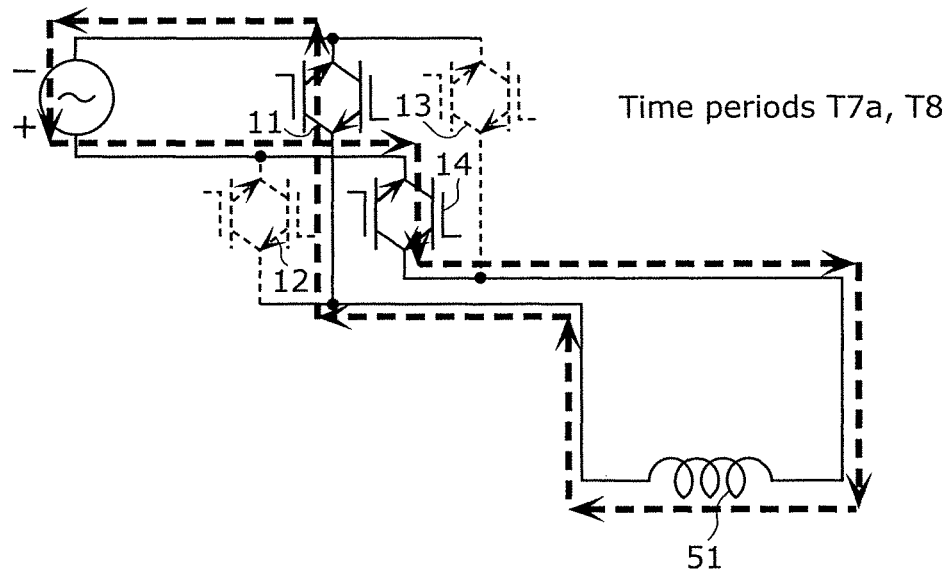
FIG. 5G is a circuit diagram illustrating an example of the states of switches and a current path according to Embodiment 1.
Figure 5H:
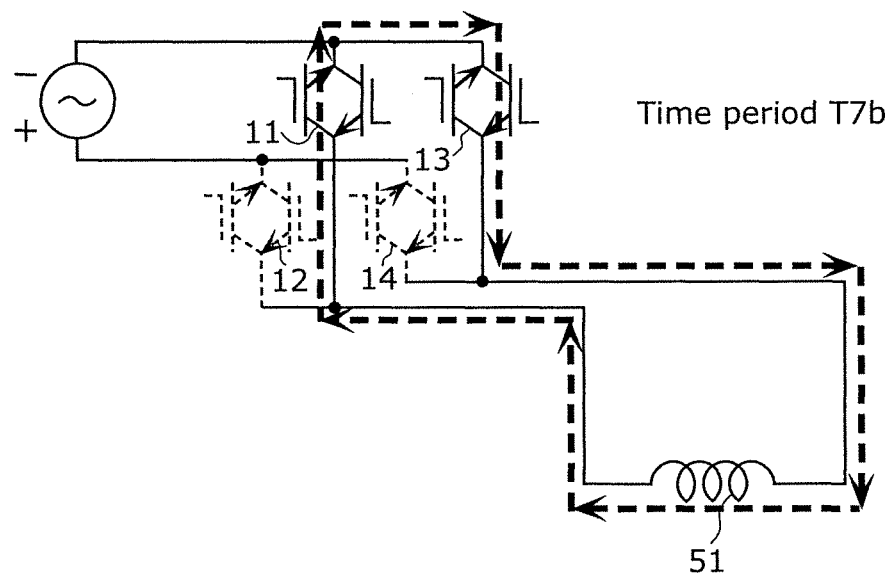
FIG. 5H is a circuit diagram illustrating an example of the states of switches and a current path according to Embodiment 1.

According to such gate signals G1a to G4b, in the time periods T3a and T7a, the conduction states of SW11 to SW14 and the current path of the first axis winding 51 are set as illustrated in FIG. 5C and FIG. 5G for making a cross connection between the pair of the input terminals 3 and 4 and the pair of the first output terminals 6 and 7, to perform the inverting voltage supply. Furthermore, in the time periods T3b and T7b, the conduction states of SW11 to SW14 and the current path of the first axis winding 51 are set as illustrated in FIG. 5D and FIG. 5H for short-circuiting the pair of the first output terminals 6 and 7, to perform power regeneration which allows circulation, within the matrix switch 32, of a regenerative current from the first axis winding 51. As a result, the inverting voltage supply through the PWM control (cyclical power feeding and regeneration) is performed in the time periods T3 and T7.

In the time periods T4 and T8, the gate signals G1a to G4b for the continuous inverting voltage supply are generated.

The control signal generating unit 24 determines the time period T4 as the current period based on 0>−in≥ref1 (condition 4), and determines the time period T8 as the current period based on 0<−in≤ref1 (condition 8).

Upon determination of the time period T4 or T8, the control signal generating unit 24 sets the levels of the gate signals G1a to G4b in the same manner as in the time period T3a, T7a.

According to such gate signals G1a to G4b, in the time periods T4 and T8, the conduction states of SW11 to SW14 and the current path of the first axis winding 51 are set as illustrated in FIG. 5C and FIG. 5G for making a cross connection between the pair of the input terminals 3 and 4 and the pair of the first output terminals 6 and 7, to perform the continuous inverting voltage supply.

Hereinbefore, the operations of converting the input voltage in into the first-phase output voltage out1 have been described above in detail. Such operations are also performed for the second phase and the third phase to convert the input voltage in into the second-phase output voltage out2 and the third-phase output voltage out3 according to the second target voltage ref2 and the third target voltage ref3, respectively.

Especially when the PWM control is performed for converting the input voltage in into the first-phase output voltage out1, the second-phase output voltage out2, and the third-phase output voltage out3, the control signal generating unit 24 may generate the gate signals G1a to G4b, G5a to G8b, and G9a to G12b to avoid overlap of a time period in which the pair of the input terminals and the pair of the first output terminals are connected, a time period in which the pair of the input terminals and the pair of the second output terminals are connected, and a time period in which the pair of the input terminals and the pair of the third output terminals are connected.

According to the power conversion apparatus 1 and the power conversion method described above, it is possible to convert the input voltage which is a single-phase AC voltage into a three-phase AC voltage with high efficiency using the matrix switch, without requiring a direct voltage in between.

The three-phase AC voltage obtained by the conversion by the power conversion apparatus 1 is used for, for example, driving the three-phase motor 5 in which the first axis winding 51, the second axis winding 52, and the third axis winding 53 are not electrically connected. Neither the three-phase motor 5 nor the power conversion apparatus 1 includes a capacitor that reduces the lifespan and reliability of the apparatus. Thus, combining the three-phase motor 5 and the power conversion apparatus 1 produces a long-life and highly reliable motor system which does not include a capacitor that reduces the lifespan and reliability of the apparatus.

In the case of driving a three-phase motor, such as the three-phase motor 203, within which the end points of the windings of the three axes are electrically connected, the single-phase to three-phase conversion by the power conversion apparatus 1 produces output voltages having a large amplitude compared to output voltages produced by a typical single-phase to three-phase conversion. That is to say, output voltages having a larger amplitude can be applied to the windings of the respective axes. Therefore, the following advantageous effects can also be obtained.

Figure 6A:
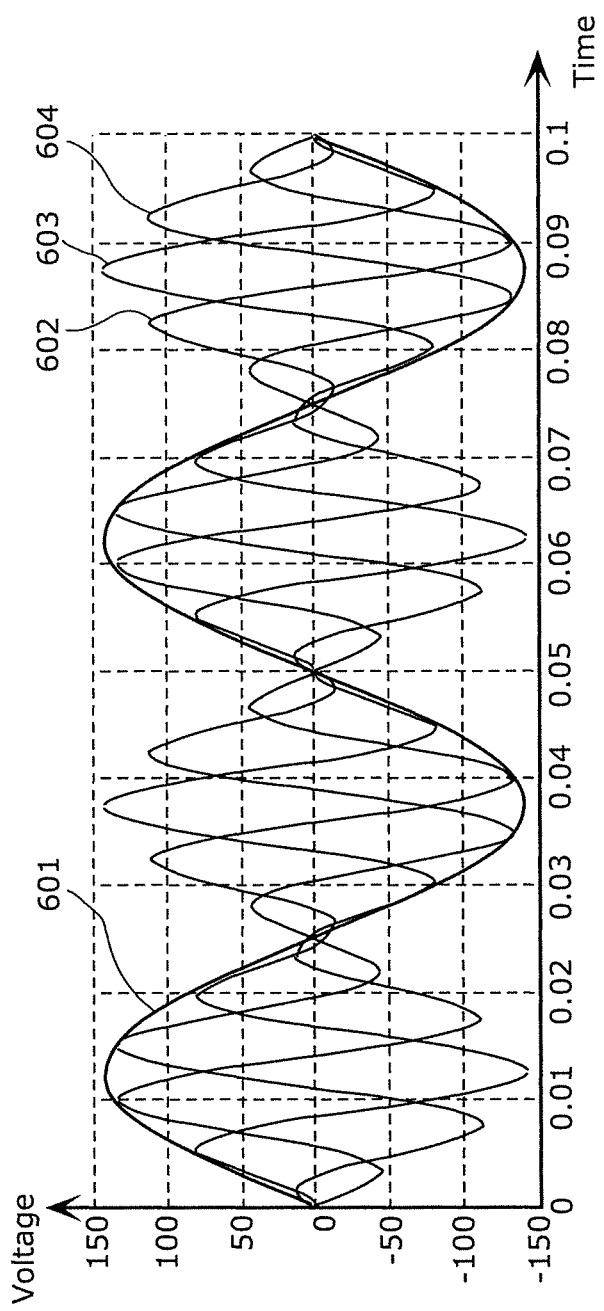
FIG. 6A is a graph illustrating an example of output voltages obtained by a single-phase to three-phase conversion performed by a typical matrix converter.
Figure 6B:
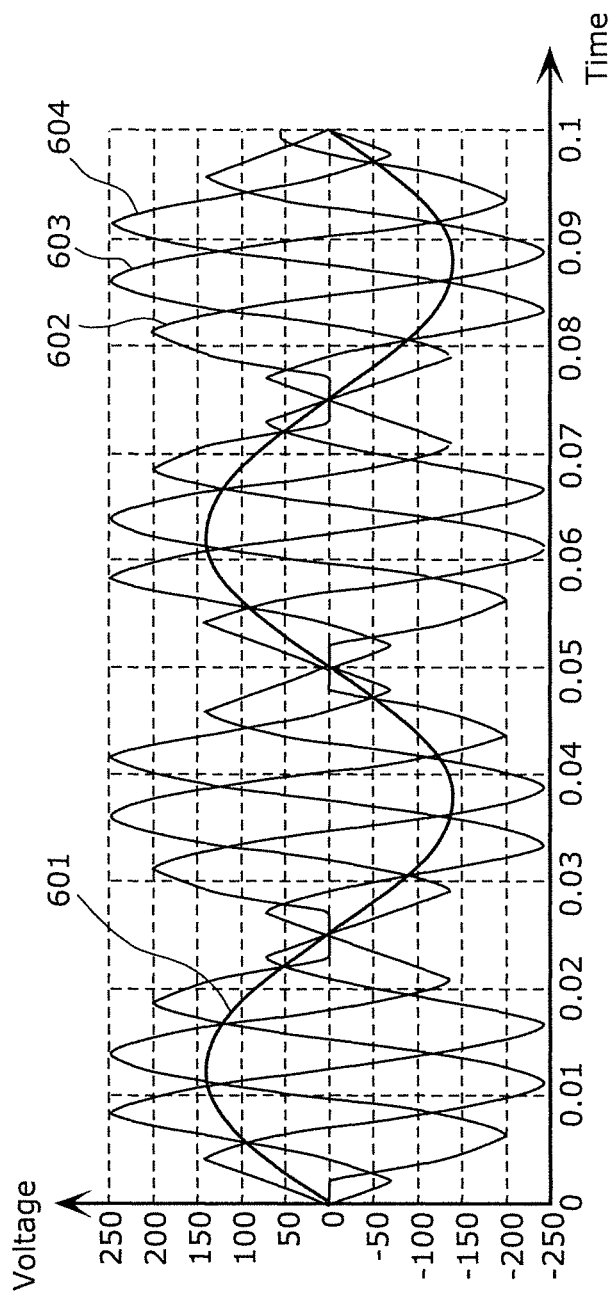
FIG. 6B is a graph illustrating an example of output voltages obtained by a single-phase to three-phase conversion performed by a power conversion apparatus according to Embodiment 1.

FIG. 6A is a graph illustrating an example of three-phase line voltages 602, 603, and 604 and an input voltage 601 in the case of driving, with output voltages obtained by a single-phase to three-phase conversion performed by a typical matrix converter, a three-phase motor within which the end points of the windings of the three axes are electrically connected. FIG. 6B is a graph illustrating an example of the three-phase line voltages 602, 603, and 604 and the input voltage 601 in the case of driving, with output voltages obtained by a single-phase to three-phase conversion performed by the power conversion apparatus 1, a three-phase motor within which the end points of the windings of the three axes are electrically connected. FIG. 6A and FIG. 6B illustrate line voltages obtained by converting input voltages having the same amplitude.

It was found that the amplitudes of the line voltages obtained by the power conversion apparatus 1 illustrated in FIG. 6B are approximately twice the amplitudes of the output voltages obtained by the single-phase to three-phase conversion performed by the typical matrix converter illustrated in FIG. 6A. This means that when driving a three-phase motor with the output voltages of the power conversion apparatus 1, a torque is generated which is approximately twice the torque generated when driving the same three-phase motor with the output voltages of the typical matrix converter.

Thus, if the torque and the volume of the motor (e.g., amount of windings) are in proportion to each other, the same torque as that generated when driving a three-phase motor using the typical matrix converter can be generated by driving, using the power conversion apparatus 1, a three-phase motor having a volume approximately ½ (approximately 50%) of that of the three-phase motor driven by the typical matrix converter.

Introducing a vector control function to the motor system combining the power conversion apparatus 1 and the three-phase motor 5 described above produces a motor system with higher controllability. The following describes such a motor system.

Figure 7:
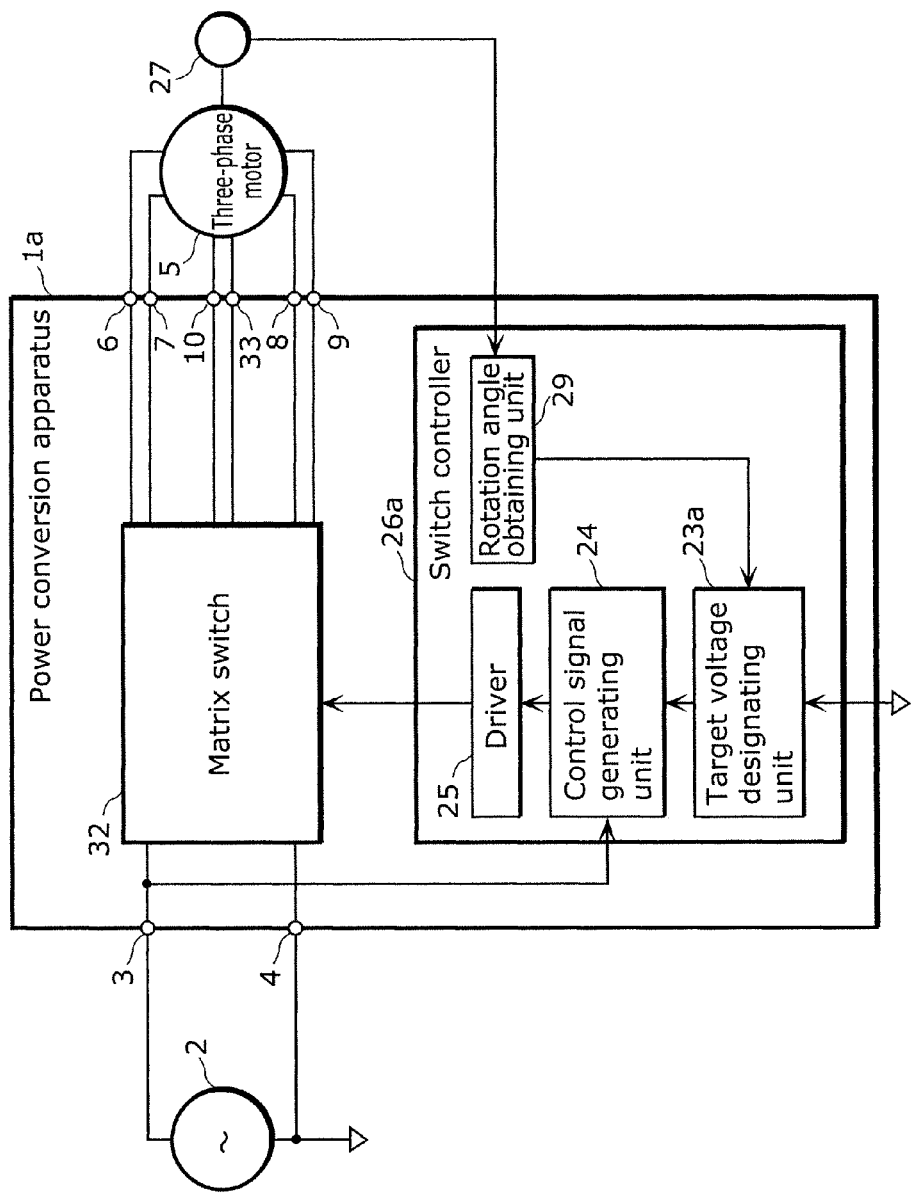
FIG. 7 is a functional block diagram illustrating another example of a motor system according to Embodiment 1.

FIG. 7 is a block diagram illustrating an example of a functional configuration of another motor system according to Embodiment 1.

In the motor system illustrated in FIG. 7, the three-phase motor 5 includes a rotation angle sensor 27 which outputs a rotation angle signal indicating consecutive rotation amounts of the rotor. A power conversion apparatus 1a is different from the above-described power conversion apparatus 1 in that the power conversion apparatus 1a includes, in a switch controller 26a, a rotation angle obtaining unit 29 and a target voltage designating unit 23a different from the target voltage designating unit 23.

The rotation angle obtaining unit 29 obtains the rotation angle signal output from the rotation angle sensor 27. The target voltage designating unit 23a performs vector control to change at least one of the amplitude, frequency, and phase of the first target voltage ref1, the second target voltage ref2, and the third target voltage ref3 based on a difference between a rotation speed of the rotor determined from the obtained rotation angle signal and a speed command value.

The vector control is specifically maintaining of the excitation current component of the winding current at a constant level, and regulation of the torque current component of the winding current.

The power conversion apparatus 1a having the above configuration can control the rotation speed of the rotor by reducing the fluctuations in the rotation speed caused by load fluctuations.

Figure 8:
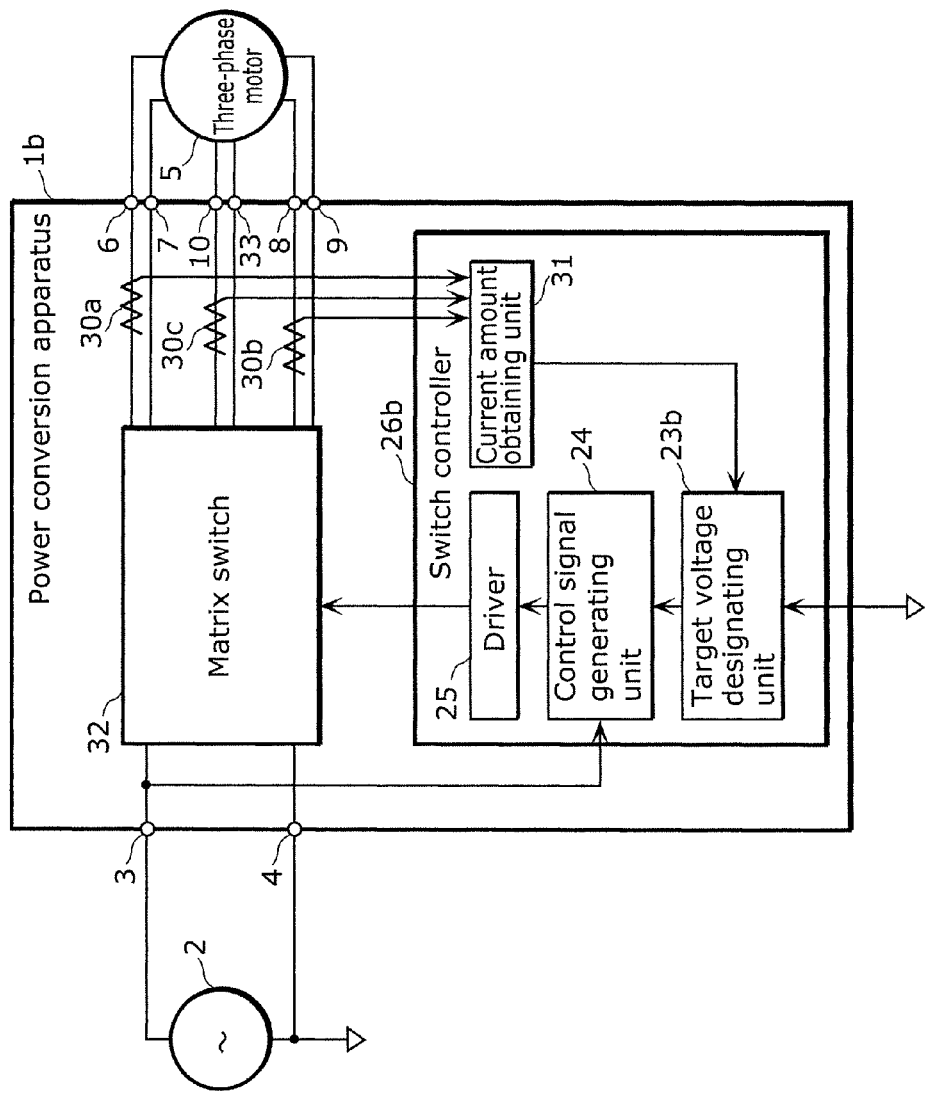
FIG. 8 is a functional block diagram illustrating another example of a motor system according to Embodiment 1.

FIG. 8 is a block diagram illustrating an example of a functional configuration of another motor system according to Embodiment 1.

The motor system illustrated in FIG. 8 includes a power conversion apparatus 1b which is different from the above-described power conversion apparatus 1 in that the power conversion apparatus 1b includes current sensors 30a, 30b, and 30c, and also includes, in a switch controller 26b, a current amount obtaining unit 31 and a target voltage designating unit 23b different from the target voltage designating unit 23.

The current sensor 30a is a sensor which outputs a current amount signal indicating consecutive current amounts flowing in the pair of the first output terminals 6 and 7. The current sensor 30b is a sensor which outputs a current amount signal indicating consecutive current amounts flowing in the pair of the second output terminals 8 and 9. The current sensor 30c is a sensor which outputs a current amount signal indicating consecutive current amounts flowing in the pair of the third output terminals 10 and 33. The current sensors 30a, 30b, and 30c may be shunt resistors, for example. The current amount obtaining unit 31 obtains the signals output from the current sensors 30a, 30b, and 30c.

The target voltage designating unit 23b performs speed sensorless vector control to estimate the rotation speed of the rotor using the obtained consecutive current amounts, and change at least one of the amplitude, frequency, and phase of the first target voltage ref1, the second target voltage ref2, and the third target voltage ref3 based on a difference between the estimated rotation speed and a speed command value.

With the speed sensorless vector control, the rotation speed of the rotor is estimated using a measured value of the winding current, and the torque is controlled using the estimated rotation speed. Since the rotation angle sensor likely to be subject to a constraint on its use environment is not used, the power conversion apparatus 1b is suitable for controlling a motor used in a severe environment (e.g., where large vibrations are present).

The power conversion apparatus 1b having the above configuration can control the rotation speed of the rotor by reducing the fluctuations in the rotation speed without using the rotation angle sensor.

The following describes that the same power conversion method as that described above can be applied even to a case where the amplitude, frequency, or phase of the first target voltage ref1, the second target voltage ref2, and the third target voltage ref3 is changed.

Figure 9:
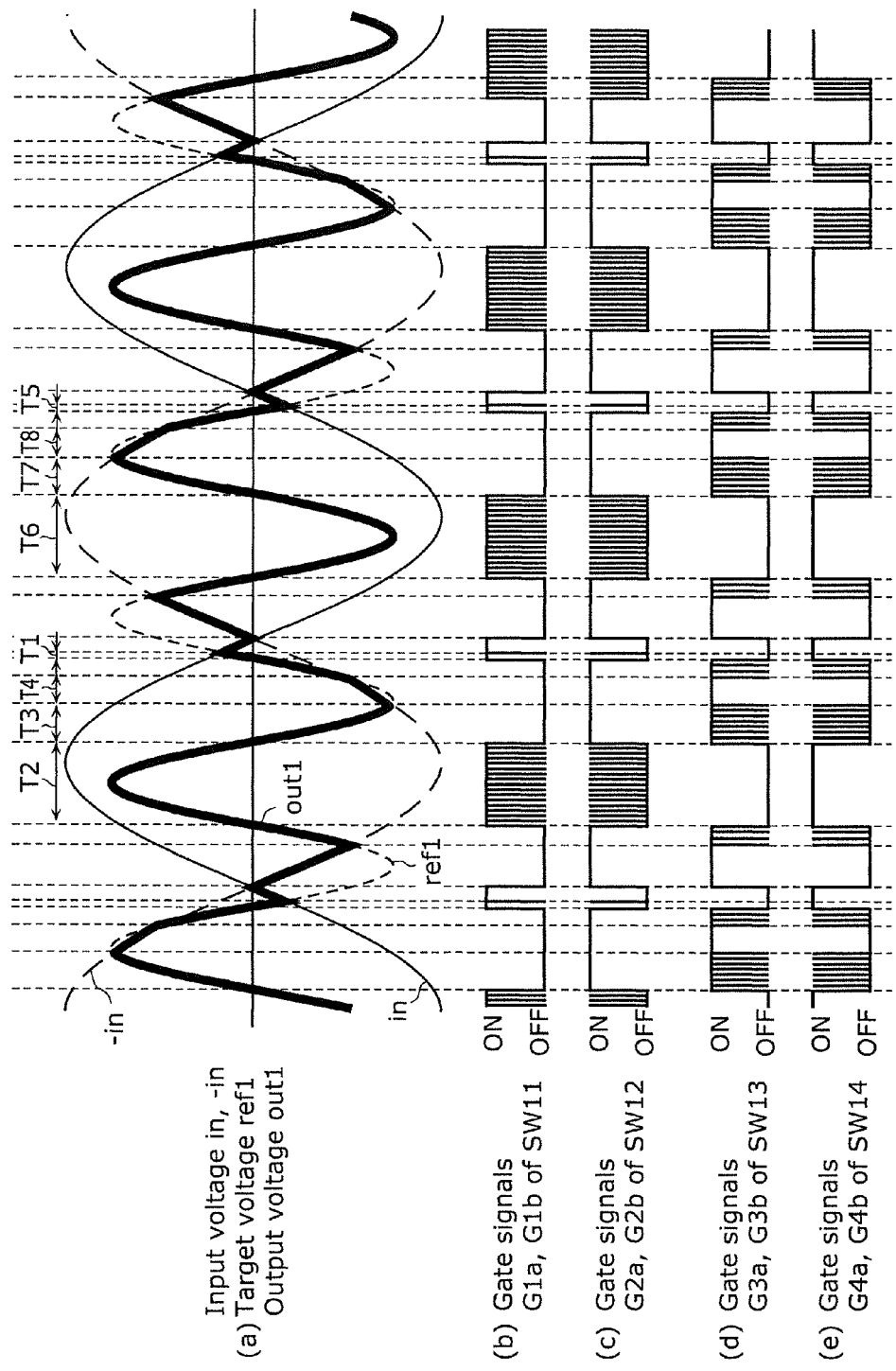
FIG. 9 is a timing chart illustrating another example of gate signals according to Embodiment 1.

FIG. 9 is a timing chart illustrating the waveform of each signal in the case where the above-described power conversion method is performed using a first target voltage ref1 having a frequency three times greater than that of the first target voltage ref1 illustrated in FIG. 4, as an example of the case of changing the frequency. FIG. 9 is illustrated in the same manner as FIG. 4.

FIG. 9 illustrates that even when the frequency of the first target voltage ref1 is changed from FIG. 4, it is still possible to determine the time periods T1 to T8 based on the same conditions as in FIG. 4 and generate the gate signals G1a to G4b according to the first target voltage ref1 having a higher frequency. This holds true for the case of changing the amplitude or phase of the first target voltage ref1.

Variations of Embodiment 1

In the above embodiment, the state of each of the bidirectional switches 11 to 14 is changed to either a bidirectional conducting state or a non-conducting state, using the gate signals having the same waveform for the two unidirectional switches forming the bidirectional switch. Thus, the levels of two gate signals are constantly changed at the same time for each bidirectional switch, thereby increasing the total number of times the levels of the gate signals are changed. Thus, the levels of two gate signals are constantly changed at the same time for each bidirectional switch, thereby increasing the total number of times the levels of the gate signals are changed. This results in relatively large power consumption for the switching operation (including the gate signal generation, the charge and discharge of the gate signal lines, and the charge and discharge of the gate capacitance of the unidirectional switches). Such an increase in the power consumption is noticeable especially in the non-inverting voltage supply performed through the PWM control and in the inverting voltage supply performed through the PWM control.

To overcome this, the power required for driving the gate signals can be reduced by fixing the level of the gate signal corresponding to one of the unidirectional switches included in one bidirectional switch. The following describes two variations for generating such gate signals.

In Variation 1, the gate signals G1a to G8b are generated to change between the conducting state and the non-conducting state of only one of the two unidirectional switches included in one bidirectional switch, to which the input voltage in is applied in the forward direction, and to constantly place, in the conducting state, the other of the two unidirectional switches to which the input voltage in is applied in the opposite direction.

Figure 10:
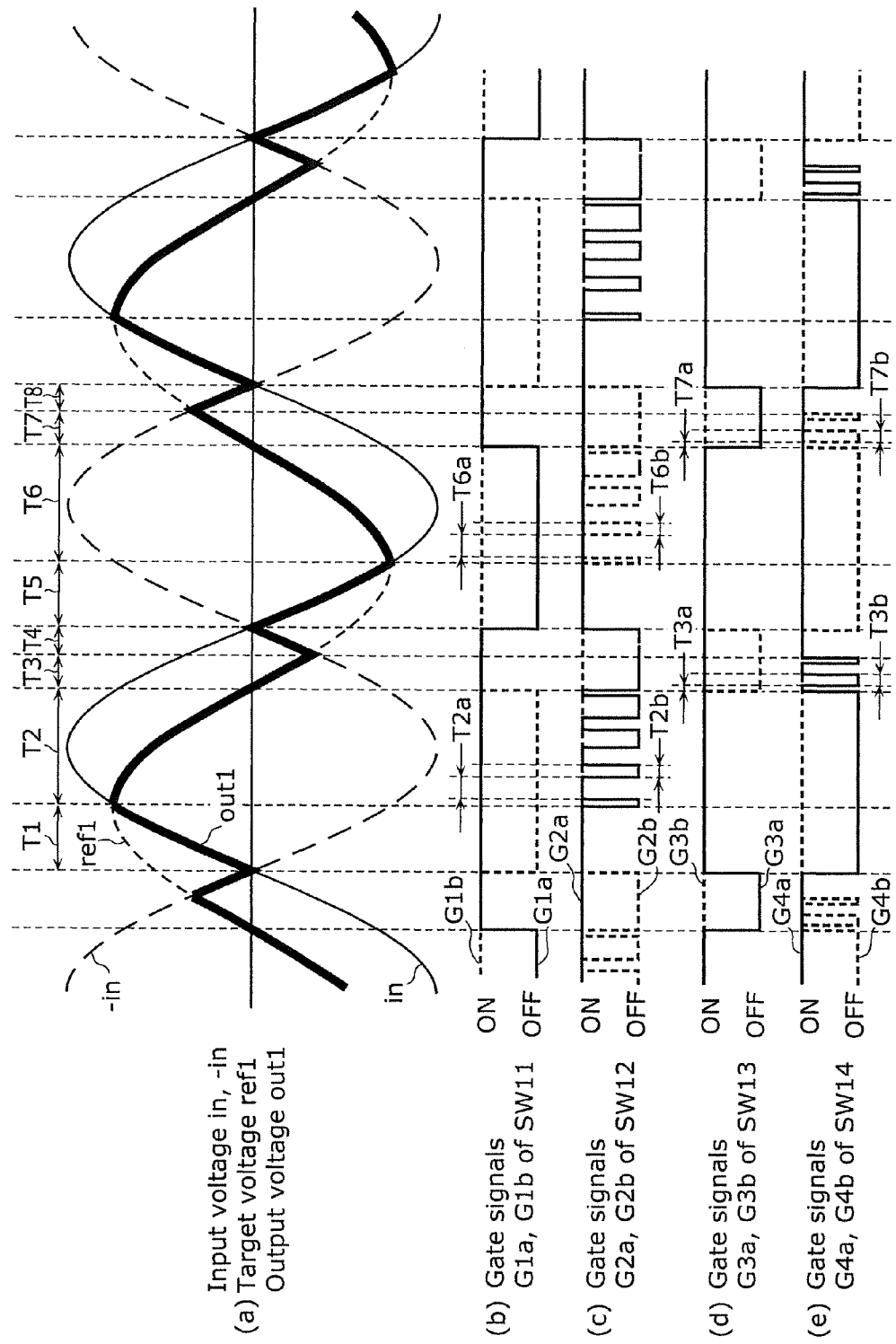
FIG. 10 is a timing chart illustrating an example of gate signals according to Variation 1 of Embodiment 1.

FIG. 10 is a timing chart illustrating an example of the waveforms of the gate signals G1a to G4b generated based on the above idea. FIG. 10 is illustrated in the same manner as FIG. 4, and the waveform of each gate signal is distinguishably shown for the corresponding unidirectional switch. Specifically, the waveform of each gate signal (having a reference sign with "a" at the end) of the unidirectional switch illustrated on the left (in the drawing) in the corresponding bidirectional switch is shown with a solid line, whereas the waveform of each gate signal (having a reference sign with "b" at the end) of the unidirectional switch illustrated on the right (in the drawing) in the corresponding bidirectional switch is shown with a dotted line.

FIG. 11A to FIG. 11H are circuit diagrams each illustrating: the conduction states of SW11 to SW14 that are set according to the gate signals G1a to G4b illustrated in FIG. 10 in the time periods T1 to T8; and the current path of the first axis winding 51 determined accordingly. FIG. 11A to FIG. 11H are illustrated in the same manner as FIG. 5A to FIG. 5H.

The gate signals G1a to G4b in FIG. 10 are different from the gate signals G1a to G4b in FIG. 4 in the following points:

Specifically, the gate signals G1a, G2b, G3a, and G4b are fixed at the ON level to constantly place, in the conducting state, the unidirectional switches to which the input voltage in is applied in the opposite direction in the time periods T1 to T4, namely, the left unidirectional switch of SW11, the right unidirectional switch of SW12, the left unidirectional switch of SW13, and the right unidirectional switch of SW14.

Furthermore, the gate signals G1b, G2a, G3b, and G4a are fixed at the ON level to constantly place, in the conducting state, the unidirectional switches to which the input voltage in is applied in the opposite direction in the time periods T5 to T8, namely, the right unidirectional switch of SW11, the left unidirectional switch of SW12, the right unidirectional switch of SW13, and the left unidirectional switch of SW14.

Moreover, the gate signals G1b, G3b, G1a, and G3a are fixed at the OFF level to constantly place, in the non-conducting state, the unidirectional switches which are in a direction opposite to the regenerative current from the first axis winding 51 in the time periods T2, T3, T6, and T7, namely, the right unidirectional switch of SW11 in the time period T2, the right unidirectional switch of SW13 in the time period T3, the left unidirectional switch of SW11 in the time period T6, and the left unidirectional switch of SW13 in the time period T7.

With the gate signals G1a to G4b in FIG. 10, the same switching operations as in the case of the gate signals G1a to G4b in FIG. 4 are performed as illustrated in FIG. 11A to FIG. 11H. The gate signals the levels of which change for the PWM control are only the gate signals G2a, G4a, G2b, G4b in the time periods T2, T3, T6, and T7. This significantly reduces the total number of times the levels of the gate signals are changed, and thus decreases the amount of power required for driving the gate signals.

In general, with a power conversion apparatus which drives an inductive load, after the polarity of the power supply voltage is inverted, the regenerative current from the load sometimes continues to flow in the same direction as the direction prior to the inversion of the polarity of the power supply voltage, especially when the inductance of the load is large, for example.

Figure 11A:
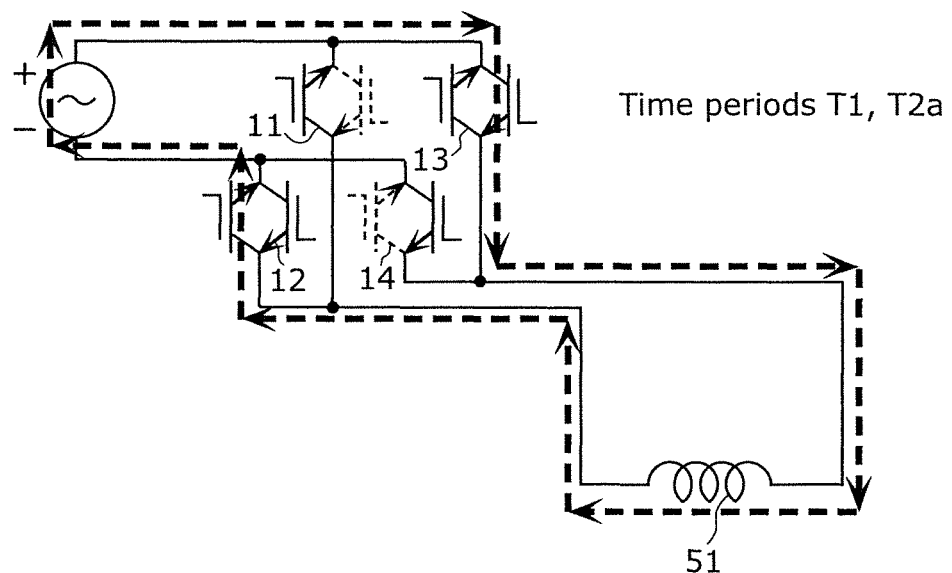
FIG. 11A is a circuit diagram illustrating an example of the states of switches and a current path according to Variation 1 of Embodiment 1.
Figure 11B:
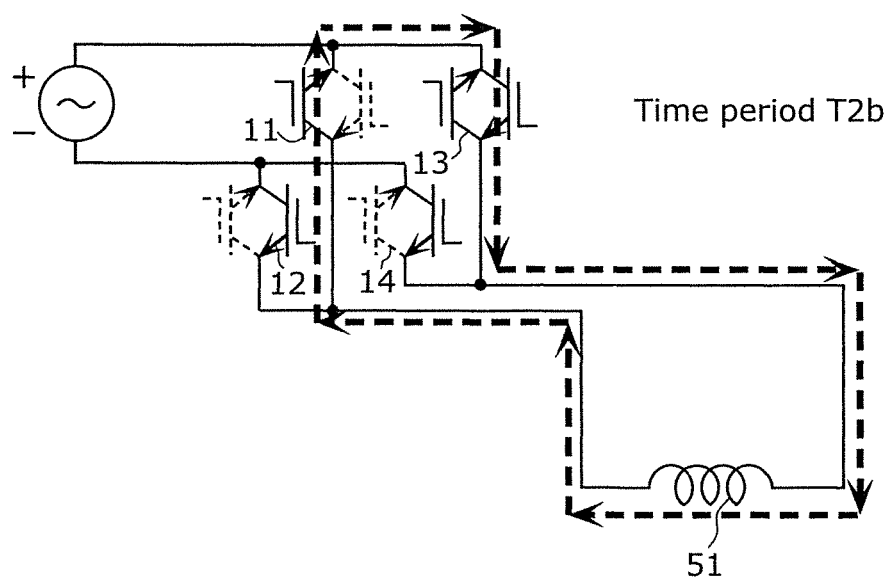
FIG. 11B is a circuit diagram illustrating an example of the states of switches and a current path according to Variation 1 of Embodiment 1.
Figure 11C:
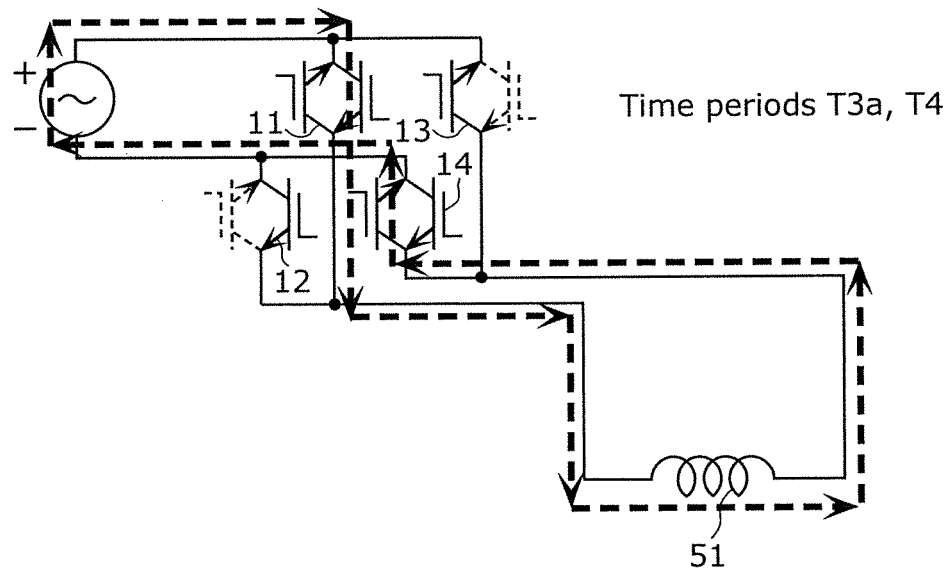
FIG. 11C is a circuit diagram illustrating an example of the states of switches and a current path according to Variation 1 of Embodiment 1.
Figure 11D:
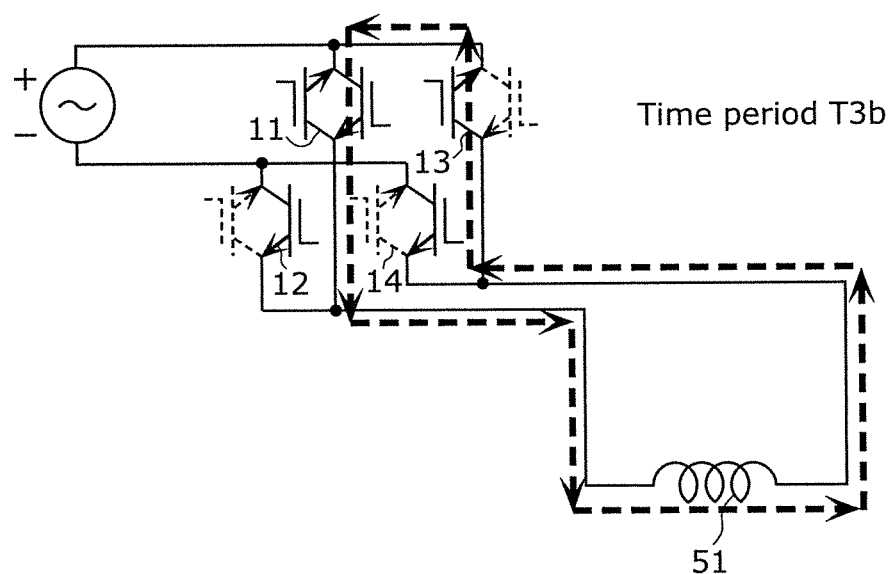
FIG. 11D is a circuit diagram illustrating an example of the states of switches and a current path according to Variation 1 of Embodiment 1.
Figure 11E:
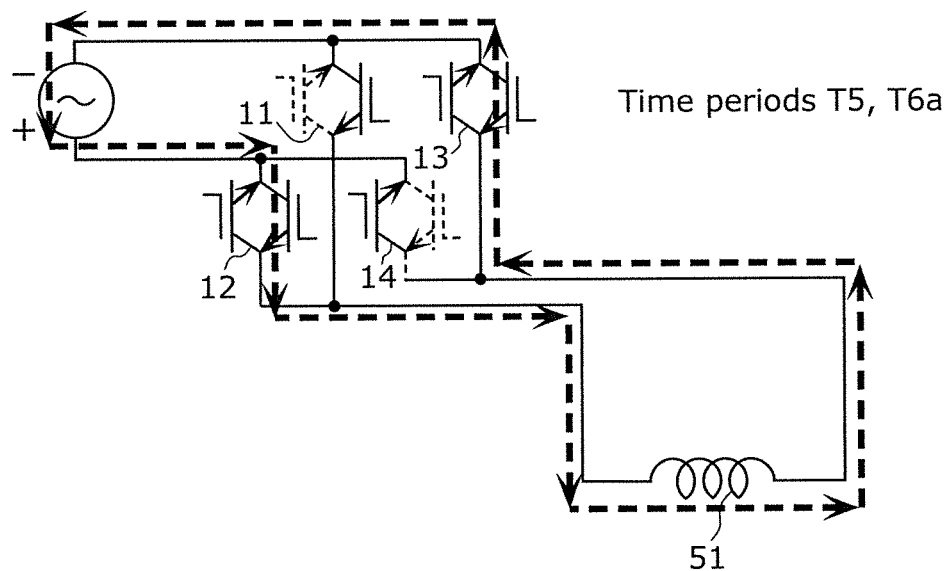
FIG. 11E is a circuit diagram illustrating an example of the states of switches and a current path according to Variation 1 of Embodiment 1.
Figure 11F:
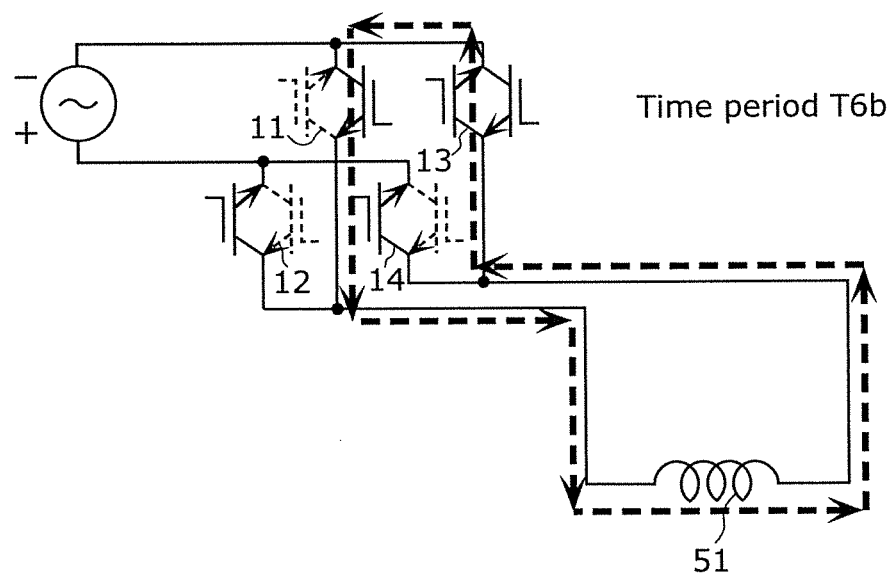
FIG. 11F is a circuit diagram illustrating an example of the states of switches and a current path according to Variation 1 of Embodiment 1.
Figure 11G:
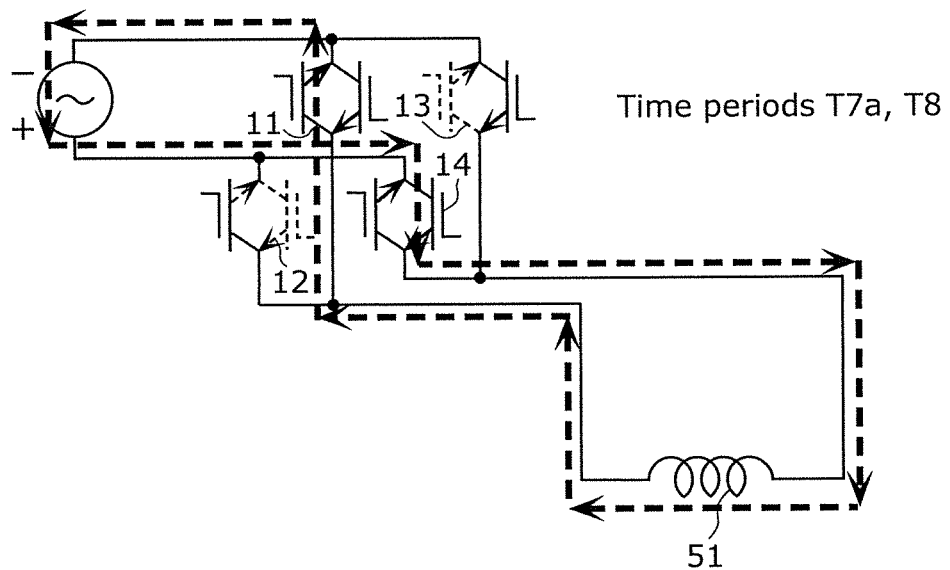
FIG. 11G is a circuit diagram illustrating an example of the states of switches and a current path according to Variation 1 of Embodiment 1.
Figure 11H:
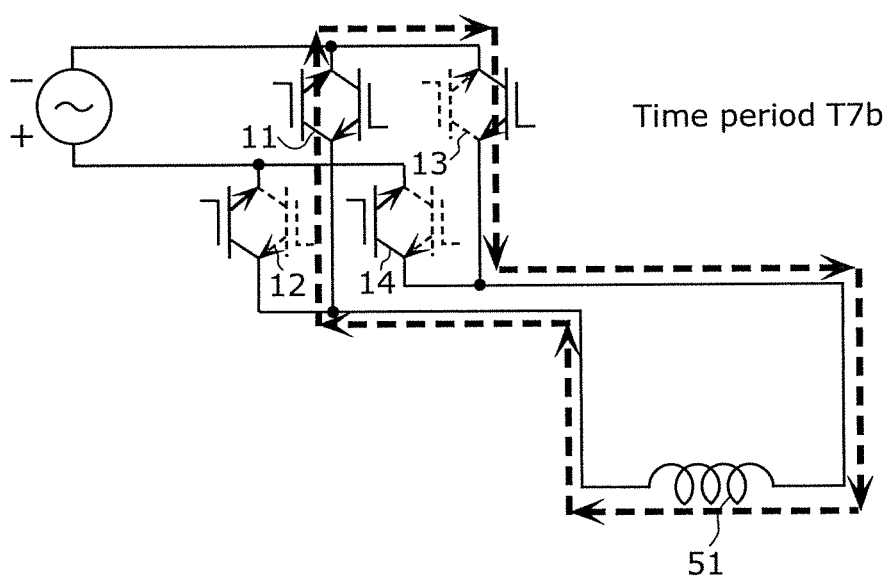
FIG. 11H is a circuit diagram illustrating an example of the states of switches and a current path according to Variation 1 of Embodiment 1.
Figure 13A:
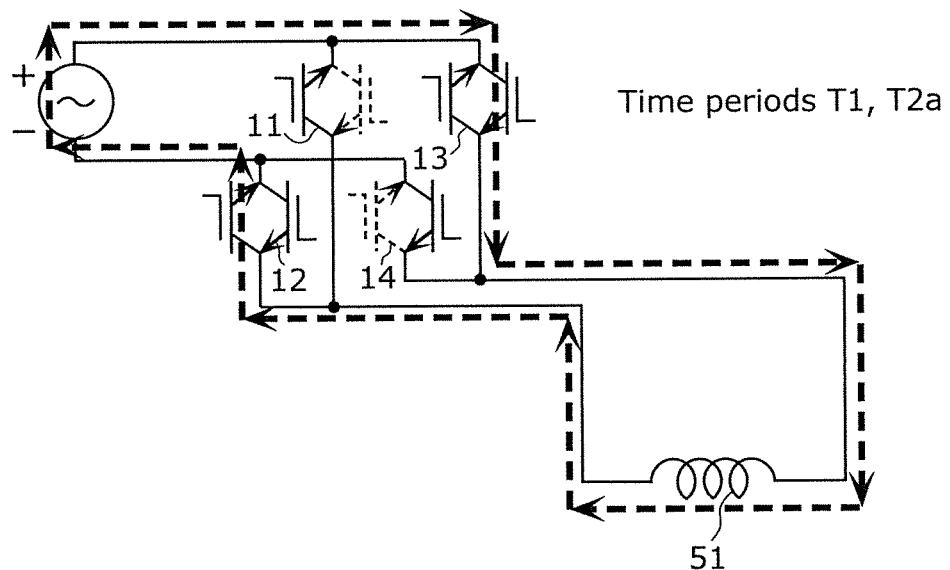
FIG. 13A is a circuit diagram illustrating an example of the states of switches and a current path according to Variation 2 of Embodiment 1.
Figure 13B:
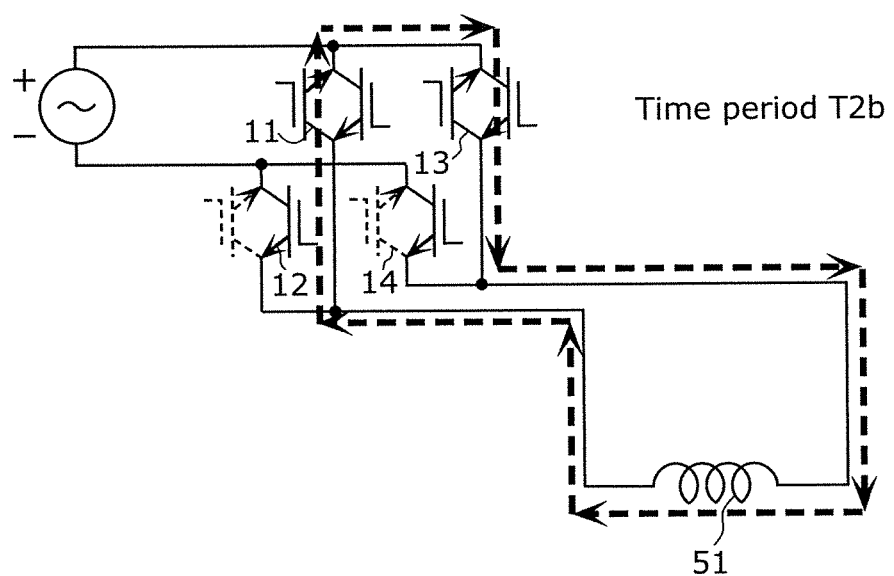
FIG. 13B is a circuit diagram illustrating an example of the states of switches and a current path according to Variation 2 of Embodiment 1.
Figure 13C:
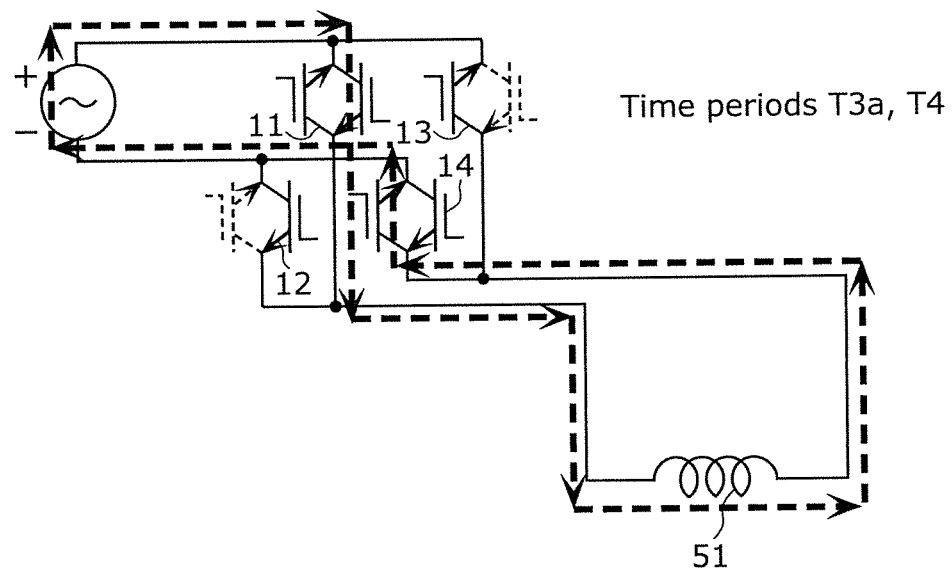
FIG. 13C is a circuit diagram illustrating an example of the states of switches and a current path according to Variation 2 of Embodiment 1.
Figure 13D:
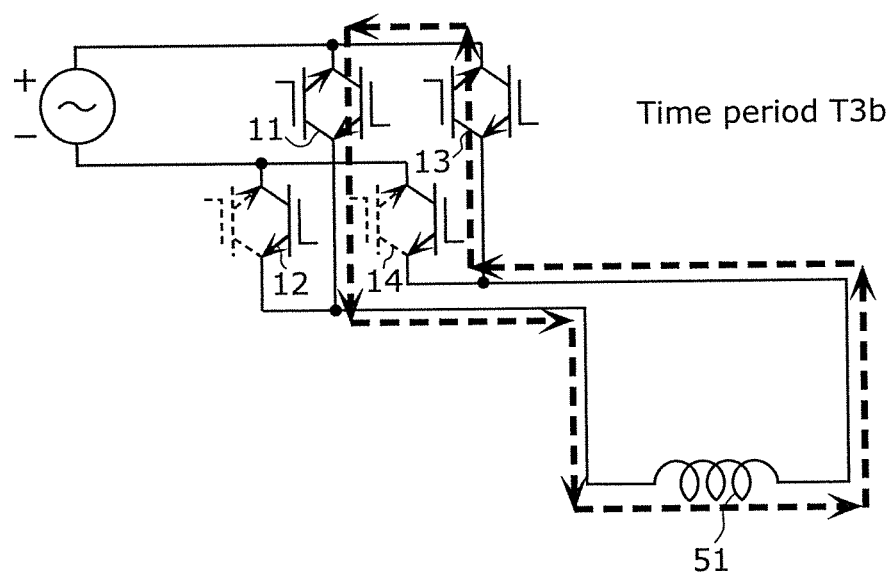
FIG. 13D is a circuit diagram illustrating an example of the states of switches and a current path according to Variation 2 of Embodiment 1.
Figure 13E:
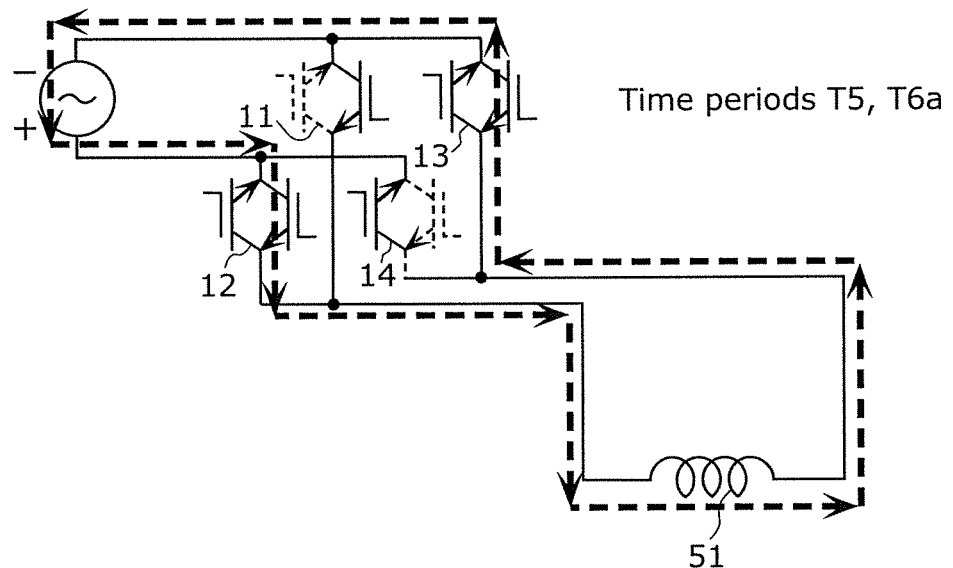
FIG. 13E is a circuit diagram illustrating an example of the states of switches and a current path according to Variation 2 of Embodiment 1.
Figure 13F:
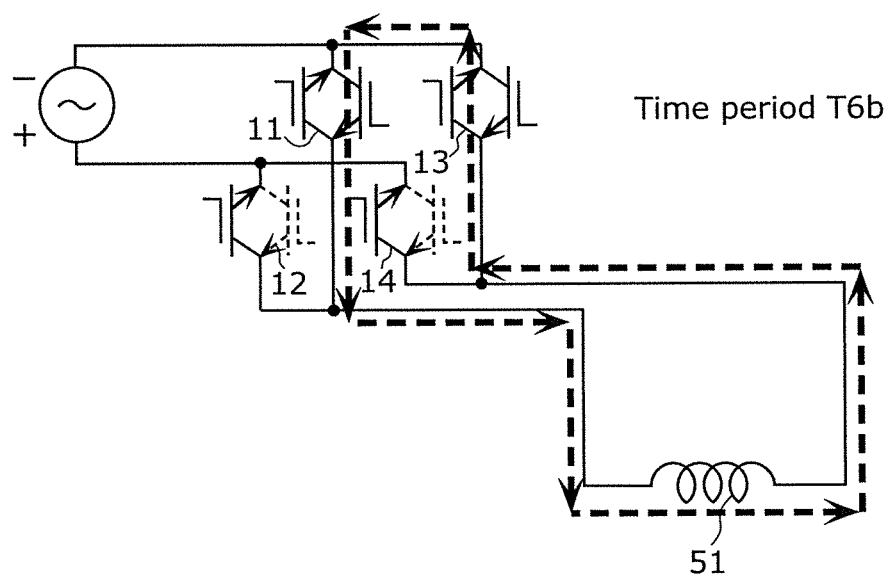
FIG. 13F is a circuit diagram illustrating an example of the states of switches and a current path according to Variation 2 of Embodiment 1.
Figure 13G:
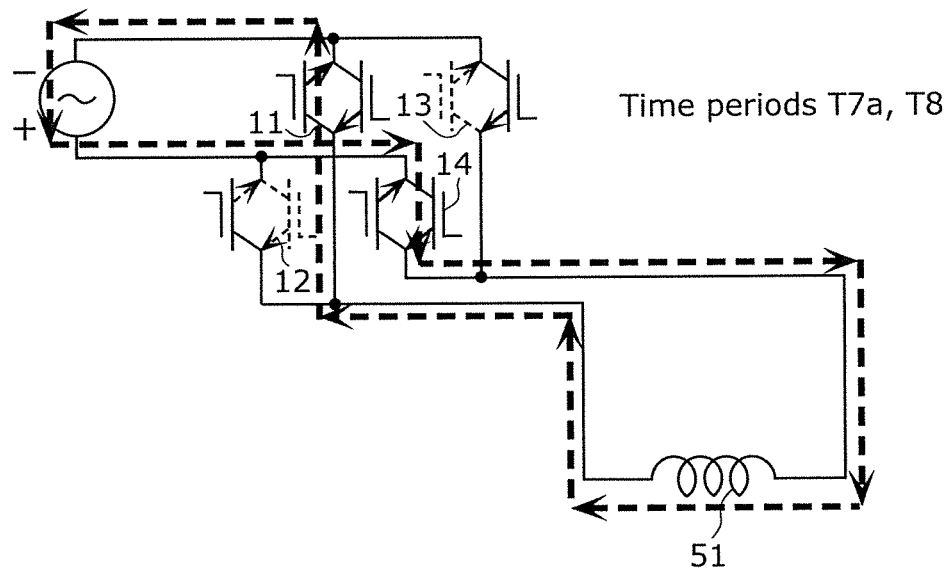
FIG. 13G is a circuit diagram illustrating an example of the states of switches and a current path according to Variation 2 of Embodiment 1.
Figure 13H:
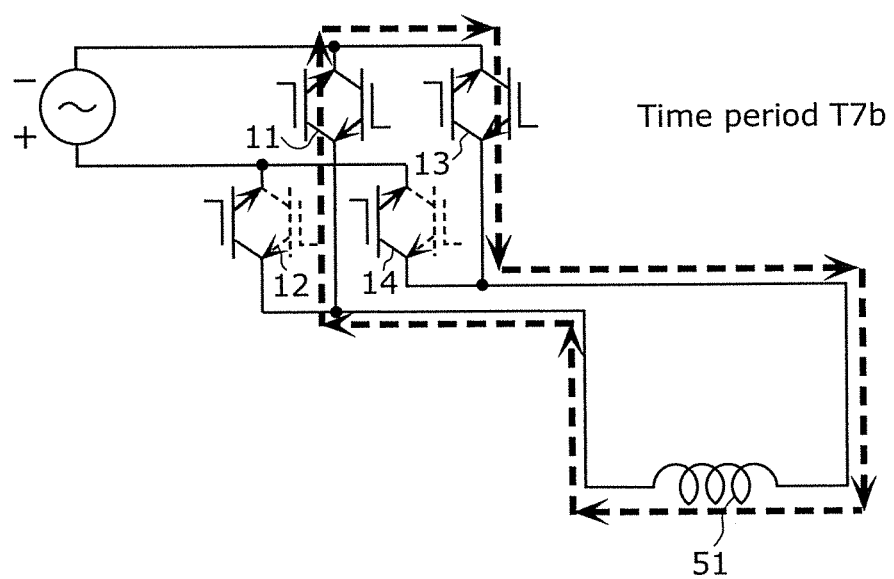
FIG. 13H is a circuit diagram illustrating an example of the states of switches and a current path according to Variation 2 of Embodiment 1.
Figure 17A:
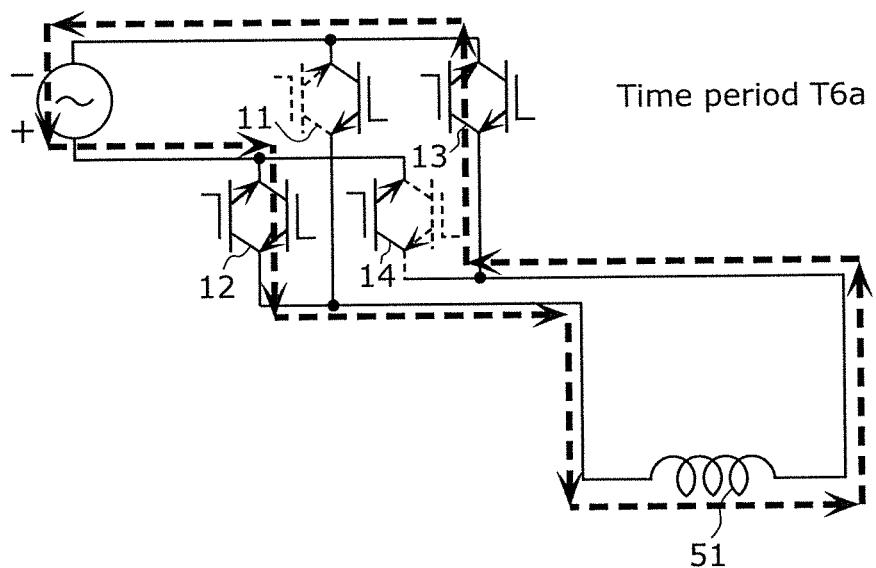
FIG. 17A is a circuit diagram illustrating an example of the states of switches and a current path according to Embodiment 2.
Figure 17B:
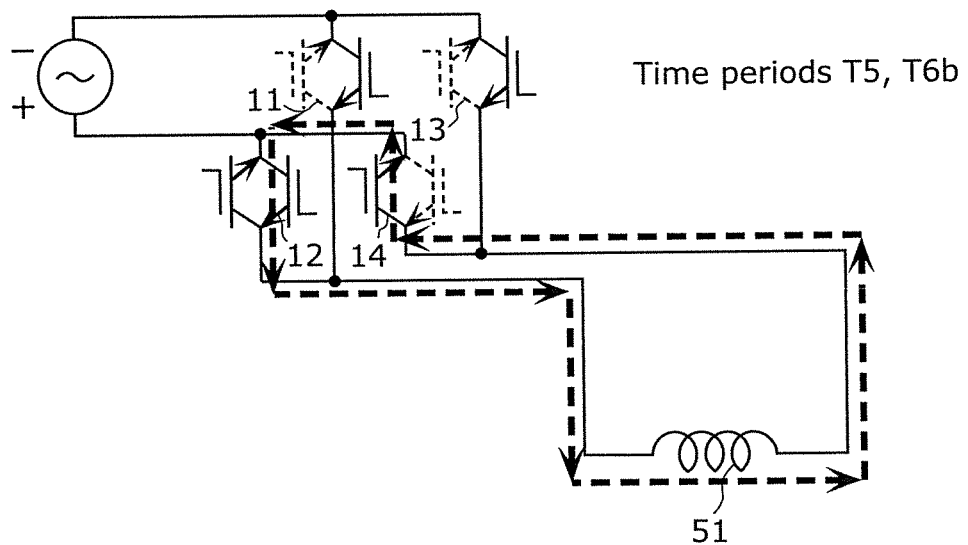
FIG. 17B is a circuit diagram illustrating an example of the states of switches and a current path according to Embodiment 2.
Figure 17C:
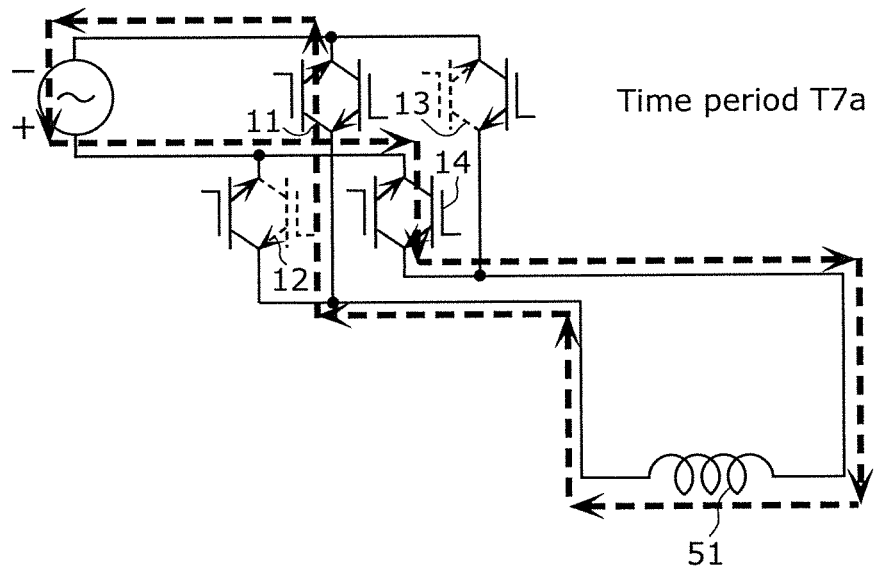
FIG. 17C is a circuit diagram illustrating an example of the states of switches and a current path according to Embodiment 2.
Figure 17D:
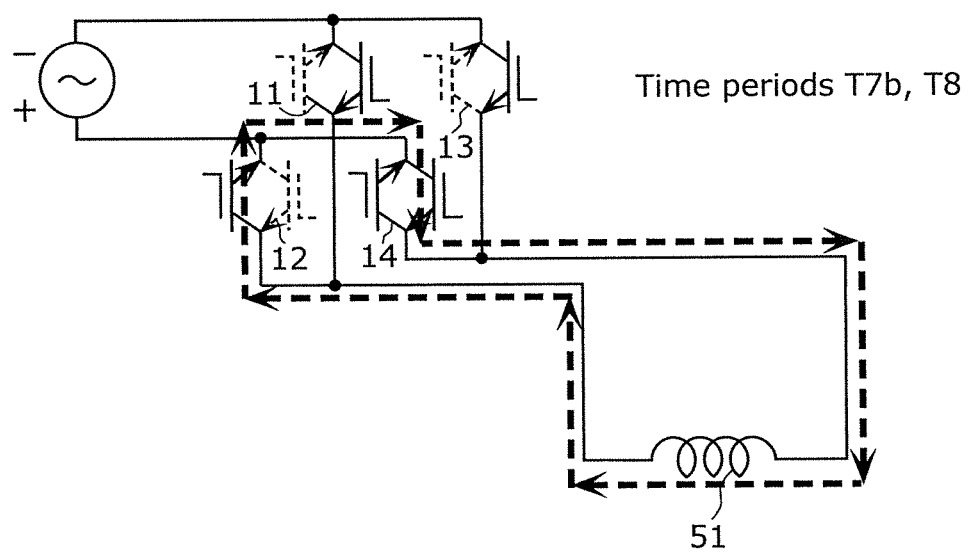
FIG. 17D is a circuit diagram illustrating an example of the states of switches and a current path according to Embodiment 2.

When this is considered in relation to the above-described motor system, it means that there are cases where the regenerative current from the first axis winding 51 illustrated in FIG. 11A and FIG. 11B flows in a direction opposite to the illustrated direction, for example. Such opposite flow occurs when a large magnetic energy accumulated in the preceding period is remaining in the first axis winding 51.

When the regenerative current from the first axis winding 51 flows in the direction opposite to the illustrated direction, the regenerative current from the first axis winding 51 circulates to the single-phase AC power supply 2 in the case of FIG. 11A, whereas in the case of FIG. 11B, there is no path along which the regenerative current can circulate, and thus an extremely large voltage is applied to SW11 and a large power loss occurs.

To solve such a problem, Variation 2 provides a path of the regenerative current from the load by placing plural bidirectional switches in the bidirectional conducting state.

FIG. 12 is a timing chart illustrating an example of the waveforms of the gate signals G1a to G4b generated based on the above idea. FIG. 12 is illustrated in the same manner as FIG. 10.

The gate signals G1a to G4b in FIG. 12 are different from the gate signals G1a to G4b in FIG. 10 in that the gate signals G1b, G3b, G1a, and G3a are set to the ON level in the time periods T2b, T3b, T6b, and T7b to form a path of the regenerative current from the first axis winding 51 via SW11 and SW13 placed in the bidirectional conducting state.

With the gate signals G1a to G4b in FIG. 12, the same switching operations as in the case of the gate signals G1a to G4b in FIG. 4 are performed for the winding current flowing in the illustrated direction, as illustrated in FIG. 13A to FIG. 13H. In addition, in the time periods T2b, T3b, T6b, and T7b, the path of the regenerative current from the first axis winding 51 is formed via SW11 and SW13 placed in the bidirectional conducting state, and thus it is possible to pass the regenerative current in the direction opposite to the illustrated direction.

This results in an increase in the total number of times the levels of the gate signals are changed because not only the levels of the gate signals G2a, G4a, G2b, and G4b but also the levels of the gate signals G1b, G3b, G1a, and G3a are changed in the PWM control. However, it becomes possible to allow the regenerative current from the first axis winding 51 to circulate within the matrix switch 32 irrespective of the direction of the regenerative current, and thus power regeneration can be appropriately performed.

Embodiment 2

Embodiment 2 describes some changes from Embodiment 1 described above.

First, the following describes a power conversion method for making the output voltage zero (suspending the voltage supply) during a time period in which the absolute value of the input voltage is insufficient.

FIG. 14 and FIG. 15 are timing charts each illustrating an example of the waveforms of the gate signals G1a to G4b generated by the control signal generating unit 24 for performing such a power conversion method. The gate signals G1a to G4b in FIG. 14 and FIG. 15 are partly different from the gate signals G1a to G4b in FIG. 10 and FIG. 12, respectively.

The gate signals G1a to G4b in FIG. 14 are different from the gate signals G1a to G4b in FIG. 10 only in that the gate signals G2a, G4a, G2b, and G4b are fixed at the OFF level in the time periods T1, T4, T5, and T8 in which the instantaneous absolute value of the input voltage in is less than or equal to the instantaneous absolute value of the first target voltage ref1. In other words, in the time periods T1, T4, T5, and T8, the gate signals G1a to G4b in FIG. 14 are set at the same levels as those in the time periods T2b, T3b, T6b, and T7b, respectively, each of which is a regeneration period of the PWM cycle. As a result, the voltage supply is suspended and the first-phase output voltage out1 becomes zero.

With the gate signals G1a to G4b in FIG. 14, in the time periods T1, T4, T5, and T8, the conduction states of SW11 to SW14 and the current path of the first axis winding 51 are set as illustrated in FIG. 11B, FIG. 11D, FIG. 11F, and FIG. 11H, respectively, and power regeneration is performed allowing the regenerative current from the first axis winding 51 to circulate within the matrix switch 32.

The gate signals G1a to G4b in FIG. 15 are different from the gate signals G1a to G4b in FIG. 12 only in that the gate signals G2a, G4a, G2b, and G4b are fixed at the OFF level and the gate signals G1b, G3b, G1a, and G3a are fixed at the ON level in the time periods T1, T4, T5, and T8 in which the instantaneous absolute value of the input voltage in is less than or equal to the instantaneous absolute value of the first target voltage ref1. In other words, in the time periods T1, T4, T5, and T8, the gate signals G1a to G4b in FIG. 15 are set at the same levels as those in the time periods T2b, T3b, T6b, and T7b, respectively, each of which is a regeneration period of the PWM cycle. As a result, the voltage supply is suspended and the first-phase output voltage outs becomes zero.

With the gate signals G1a to G4b in FIG. 15, in the time periods T1, T4, T5, and T8, the conduction states of SW11 to SW14 and the current path of the first axis winding 51 are set as illustrated in FIG. 13B, FIG. 13D, FIG. 13F, and FIG. 13H, respectively, and power regeneration is performed allowing the regenerative current from the first axis winding 51 to circulate within the matrix switch 32.

According to the power conversion method described above, the voltage supply is suspended by making the output voltage zero during the time period in which the absolute value of the input voltage is insufficient. Thus, the fluctuations of the input voltage can be reduced without placing an excessive load on the power supply (including the resistance of a wire, for example) that supplies the input voltage. Furthermore, since there is no longer a need to accurately estimate the time at which the input voltage becomes 0 V, misoperation is less likely to occur even when the circuit illustrated in FIG. 1A having few sensors is used instead of the circuit illustrated in FIG. 1B capable of accurately calculating the potential difference of the input voltage.

Next, the following describes a power conversion method for leveling out, among a plurality of bidirectional switches, the number of times switching is performed.

FIG. 16 is a timing chart illustrating an example of the waveforms of the gate signals G1a to G4b generated by the control signal generating unit 24 for performing such a power conversion method. The gate signals G1a to G4b in FIG. 16 are partly different from the gate signals G1a to G4b in FIG. 14.

The gate signals G1a to G4b in FIG. 16 are different from the gate signals G1a to G4b in FIG. 14 only in that in the time periods T5 and T6, the changing of the level of the gate signal G2a is stopped and the level of the gate signal G3a is changed instead, and in the time periods T7 and T8, the changing of the level of the gate signal G4b is stopped and the level of the gate signal G1a is changed instead.

FIG. 17A to FIG. 17D are circuit diagrams each illustrating: the conduction states of the bidirectional switches 11 to 14 that are set according to the first control signals G1a to G4b illustrated in FIG. 16 in the time periods T5 to T8; and the current path of the first axis winding 51 determined accordingly.

With the gate signals G1a to G4b in FIG. 16, the conduction states of SW11 to SW14 and the current path of the first axis winding 51 are set as illustrated in FIG. 17A, FIG. 17B, FIG. 17C, and FIG. 17D in the time period T6a, the time periods T5 and T6b, the time period T7a, and the time periods T7b and T8, respectively.

As a result, the non-inverting voltage supply through the PWM control (cyclical power feeding and regeneration) is performed through the switching operations of SW12 and SW13 which differ between the time periods T2 and T6, and the inverting voltage supply through the PWM control (cyclical power feeding and regeneration) is performed through the switching operations of SW14 and SW11 which differ between the time periods T3 and T7.

According to the power conversion method described above, leveling out the number of times of the switching operations of the bidirectional switches 11 to 14 leads to leveling out of the heat generated by the bidirectional switches 11 to 14. As a result, it is possible to reduce the disadvantages of decreased rated power and lower reliability caused by local overheating of the bidirectional switches 11 to 14.

The power conversion method for leveling out the number of times of the switching operations of the bidirectional switches 11 to 14 can be combined with the power conversion method for providing the path of the regenerative current from the load by placing plural bidirectional switches in the bidirectional conducting state.

Figure 18:
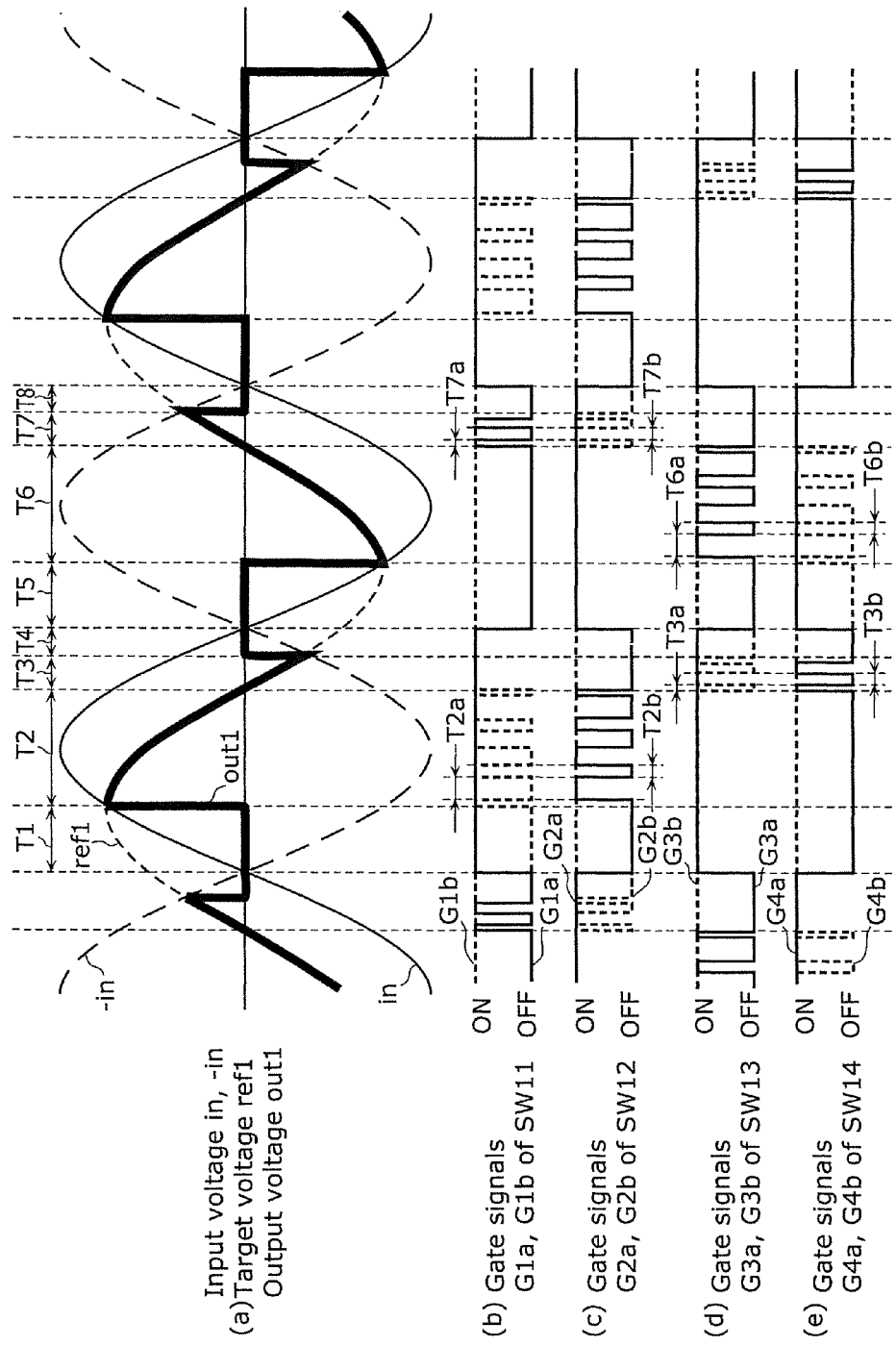
FIG. 18 is a timing chart illustrating another example of gate signals according to Embodiment 2.
Figure 19A:
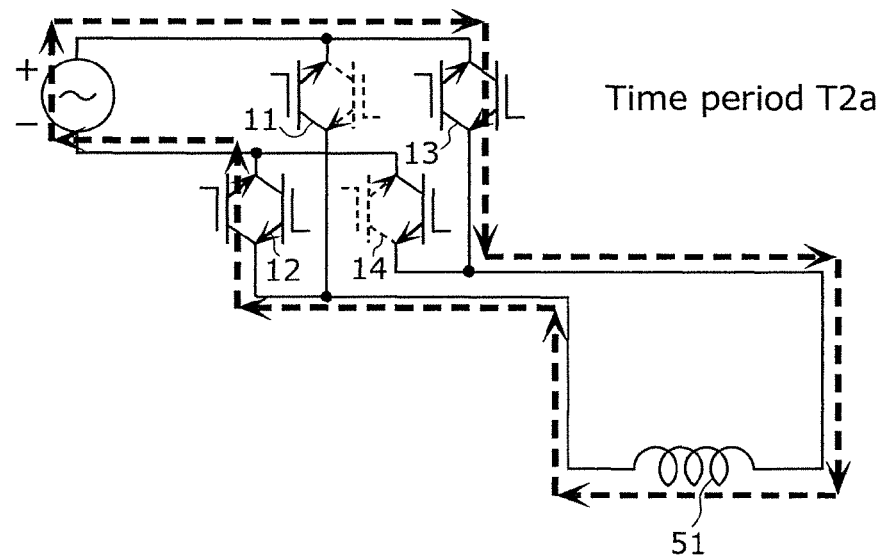
FIG. 19A is a circuit diagram illustrating an example of the states of switches and a current path according to Embodiment 2.
Figure 19B:
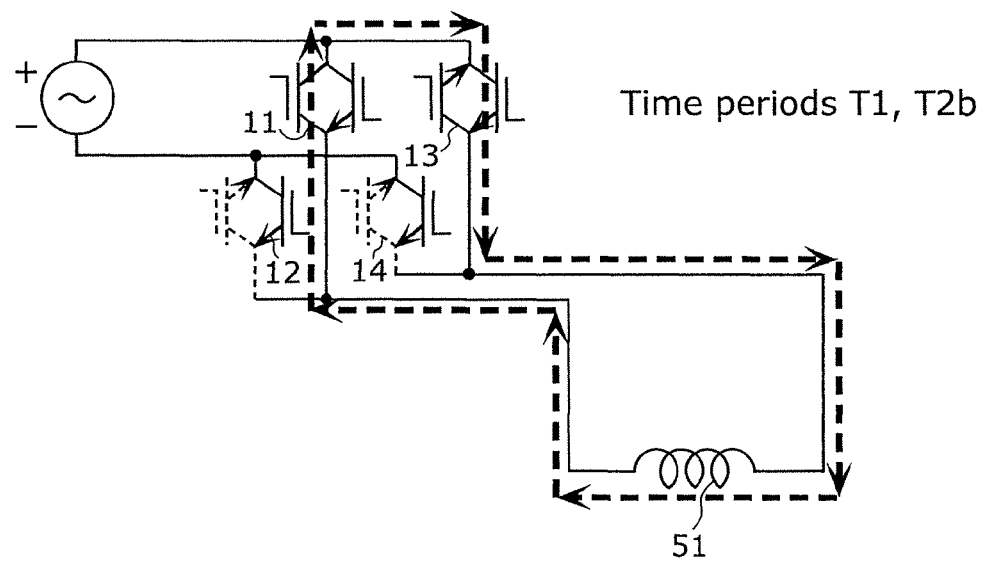
FIG. 19B is a circuit diagram illustrating an example of the states of switches and a current path according to Embodiment 2.
Figure 19C:
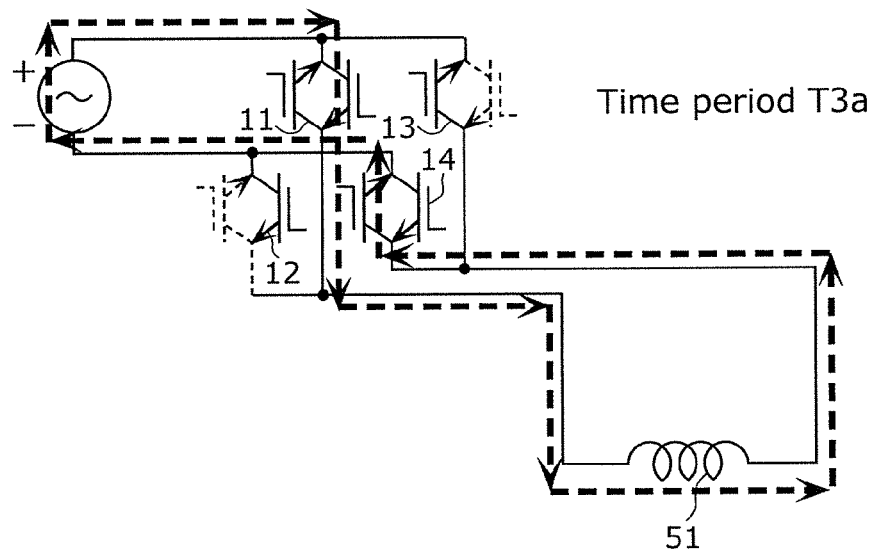
FIG. 19C is a circuit diagram illustrating an example of the states of switches and a current path according to Embodiment 2.
Figure 19D:
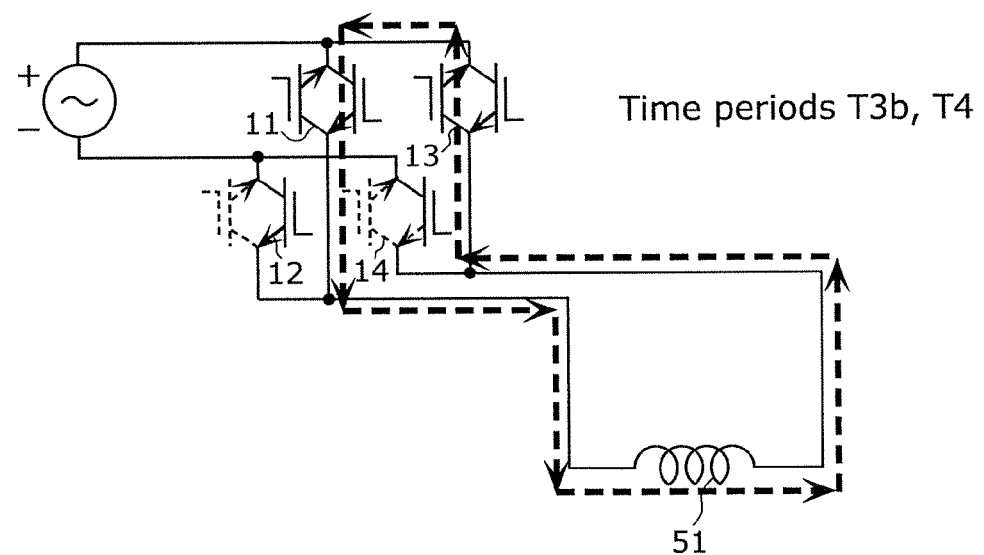
FIG. 19D is a circuit diagram illustrating an example of the states of switches and a current path according to Embodiment 2.
Figure 19E:
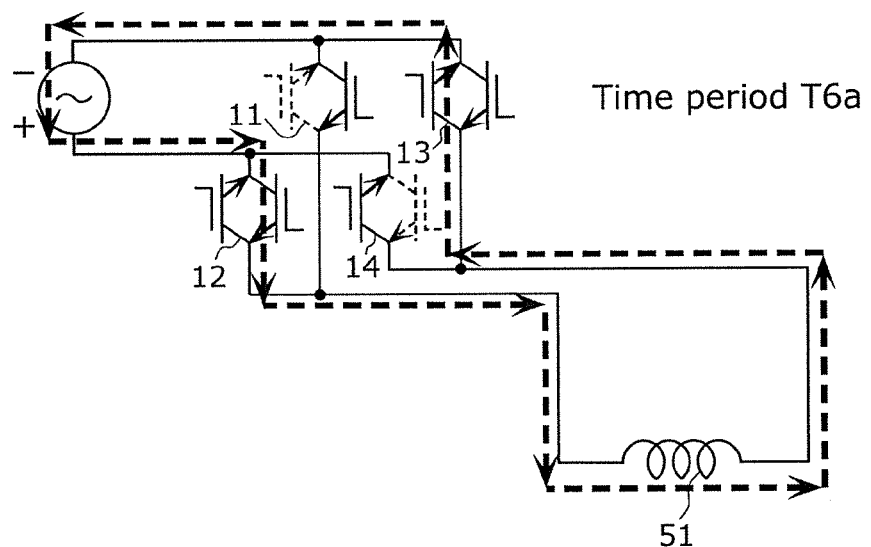
FIG. 19E is a circuit diagram illustrating an example of the states of switches and a current path according to Embodiment 2.
Figure 19F:
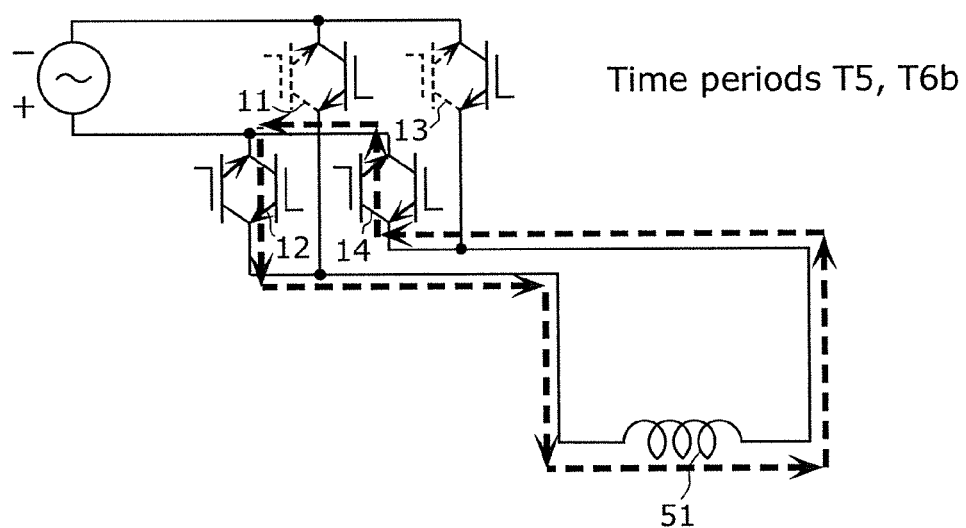
FIG. 19F is a circuit diagram illustrating an example of the states of switches and a current path according to Embodiment 2.
Figure 19G:
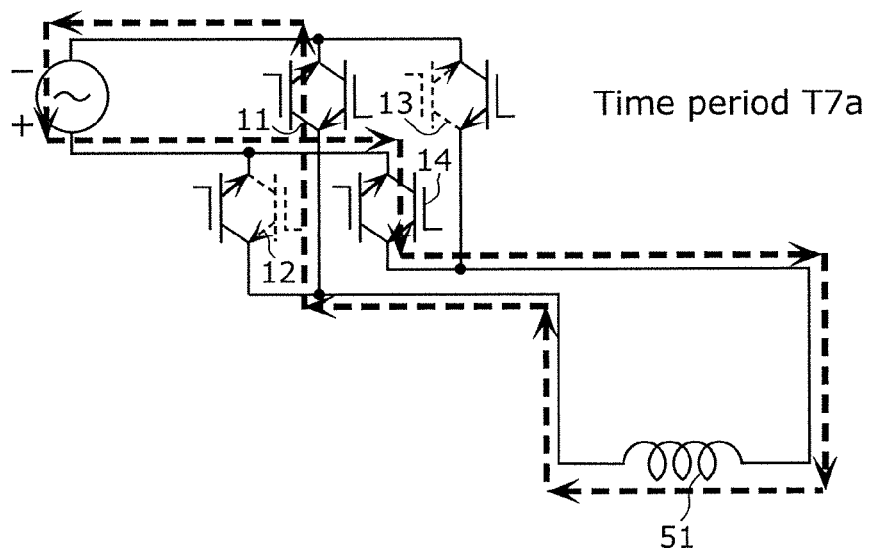
FIG. 19G is a circuit diagram illustrating an example of the states of switches and a current path according to Embodiment 2.
Figure 19H:
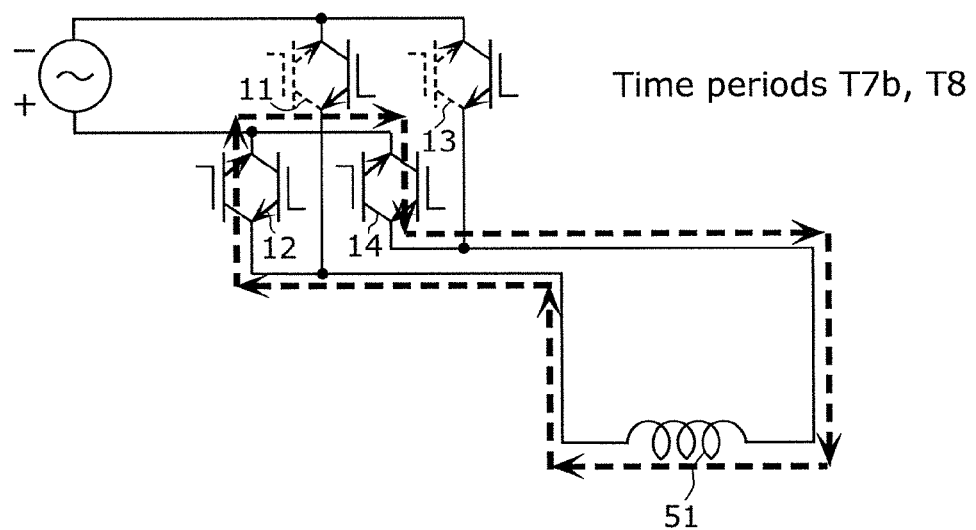
FIG. 19H is a circuit diagram illustrating an example of the states of switches and a current path according to Embodiment 2.
Figure 20:
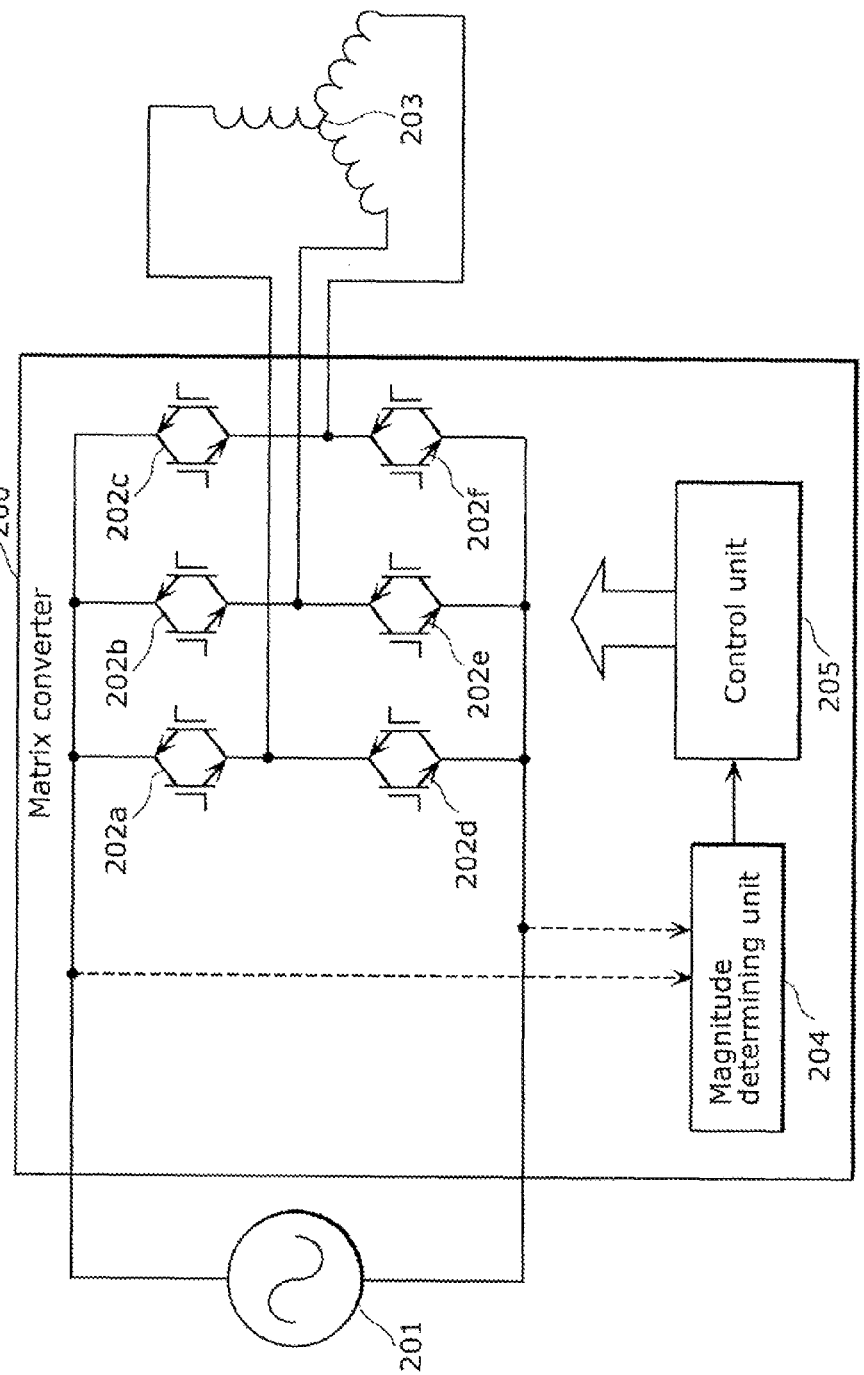
FIG. 20 is a circuit diagram of a conventional matrix converter.

FIG. 18 is a timing chart illustrating an example of the waveforms of the gate signals G1a to G4b generated by the control signal generating unit 24 for performing such a power conversion method. The gate signals G1a to G4b in FIG. 18 are partly different from the gate signals G1a to G4b in FIG. 16.

The gate signals G1a to G4b in FIG. 18 are different from the gate signals G1a to G4b in FIG. 16 in that in the time periods T2b and T3b, the gate signals G1b and G3b are set at the ON level to form a path of the regenerative current from the first axis winding 51 via SW11 and SW13 placed in the bidirectional conducting state, and in the time periods T6b and T7b, the gate signals G4b and G2b are set at the ON level to form a path of the regenerative current from the first axis winding 51 via SW12 and SW14 placed in the bidirectional conducting state.

With the gate signals G1a to G4b in FIG. 18, the same switching operations as in the case of the gate signals G1a to G4b in FIG. 4 can be performed as illustrated in FIG. 19A to FIG. 19H. In addition, in the time periods T2b and T3b, the path of the regenerative current from the first axis winding 51 is formed via SW11 and SW13 placed in the bidirectional conducting state, and in the time periods T6b and T7b, the path of the regenerative current from the first axis winding 51 is formed via SW12 and SW14 placed in the bidirectional conducting state.

As a result, it becomes possible to level out the number of times of the switching operations of the bidirectional switches 11 to 14 and to allow the regenerative current from the first axis winding 51 to circulate within the matrix switch 32 irrespective of the direction of the regenerative current.

Although only some exemplary embodiments of the power conversion apparatus according to the present invention have been described in detail above, those skilled in the art will readily appreciate that many modifications are possible in the exemplary embodiments, such as an embodiment conceived by combining the structural elements of two or more of the above-described embodiments, without materially departing from the novel teachings and advantages of the present invention. Accordingly, all such modifications are intended to be included within the scope of the present invention.

INDUSTRIAL APPLICABILITY

The present disclosure is applicable to a power conversion apparatus which converts a single-phase AC voltage into a three-phase AC voltage, and can be used especially for driving a three-phase motor.

REFERENCE SIGNS LIST 1, 1a, 1b Power conversion apparatus
2 Single-phase AC power supply
3, 4 Input terminal
5 Three-phase motor
6, 7 First output terminal
8, 9 Second output terminal
10, 33 Third output terminal
11, 12, 13, 14 First bidirectional switch
15, 16, 17, 18 Second bidirectional switch
19, 20, 21, 22 Third bidirectional switch
23, 23a, 23b Target voltage designating unit
24 Control signal generating unit
25 Driver
26, 26a, 26b Switch controller
27 Rotation angle sensor
29 Rotation angle obtaining unit
30a, 30b, 30c Current sensor
31 Current amount obtaining unit
32 Matrix switch
51 First axis winding
52 Second axis winding
53 Third axis winding
54 Rotor
56, 57 First power receiving terminal
58, 59 Second power receiving terminal
60, 61 Third power receiving terminal
200 Matrix converter
201 Single-phase AC power supply
202a, 202b, 202c, 202d, 202e, 202f Bidirectional switch
203 Three-phase motor
204 Magnitude determining unit 205 Control unit
M1, M2, M3, M4 IGBT
M5 GaN HFET
D1, D2 Diode
G1a, G1b, G2a, G2b, G3a, G3b, G4a, G4b First control signal (Gate signal)
G5a, G5b, G6a, G6b, G7a, G7b, G8a, G8b Second control signal (Gate signal)
G9a, G9b, G10a, G10b, G11a, G11b, G12a, G12b Third control signal (Gate signal)
601 Input voltage
602 Line voltage (between first axis voltage and second axis voltage)
603 Line voltage (between second axis voltage and third axis voltage)
604 Line voltage (between third axis voltage and first axis voltage)

The invention claimed is:

1. A power conversion apparatus which converts an input voltage which is a single-phase AC voltage into output voltages forming a three-phase AC voltage, the power conversion apparatus comprising:
a pair of input terminals to which the input voltage is applied;
a pair of first output terminals which output a first one of the output voltages as a first-phase output voltage;
a pair of second output terminals which output a second one of the output voltages as a second-phase output voltage;
a pair of third output terminals which output a third one of the output voltages as a third-phase output voltage;
four first bidirectional switches each corresponding to a different combination of one of the paired input terminals and one of the paired first output terminals to switch connection and disconnection between the corresponding input terminal and first output terminal according to a corresponding one of first control signals;
four second bidirectional switches each corresponding to a different combination of one of the paired input terminals and one of the paired second output terminals to switch connection and disconnection between the corresponding input terminal and second output terminal according to a corresponding one of second control signals;
four third bidirectional switches each corresponding to a different combination of one of the paired input terminals and one of the paired third output terminals to switch connection and disconnection between the corresponding input terminal and third output terminal according to a corresponding one of third control signals;
a target voltage designating unit configured to designate (i) a first target voltage representing, using a first one of AC voltages forming a three-phase AC voltage, consecutive target values of the first-phase output voltage, (ii) a second target voltage representing, using a second one of the AC voltages forming the three-phase AC voltage, consecutive target values of the second-phase output voltage, and (iii) a third target voltage representing, using a third one of the AC voltages forming the three-phase AC voltage, consecutive target values of the third-phase output voltage;
a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage, and (iii) generate the third control signals to cyclically connect and disconnect the pair of the input terminals and the pair of the third output terminals via the third bidirectional switches at a duty cycle corresponding to a ratio of an instantaneous absolute value of the third target voltage to the instantaneous absolute value of the input voltage during a time period in which the instantaneous absolute value of the input voltage is greater than the instantaneous absolute value of the third target voltage; and
a driver which supplies the generated first control signals to the first bidirectional switches, the generated second control signals to the second bidirectional switches, and the generated third control signals to the third bidirectional switches.

2. The power conversion apparatus according to claim 1, wherein the input voltage is a sinusoidal AC voltage, and the target voltage designating unit is configured to designate the first target voltage, the second target voltage, and the third target voltage using AC voltages forming a three-phase sinusoidal AC voltage which have: an amplitude $1/\sqrt{3}$ times smaller than an amplitude of the input voltage; a frequency identical to a frequency of the input voltage; and phase differences of +45 degrees, −75 degrees, and +165 degrees relative to the input voltage.

3. The power conversion apparatus according to claim 1, wherein the control signal generating unit is configured to (i) generate the first control signals to (a) make a straight connection between the pair of the input terminals and the pair of the first output terminals during a time period in which the input voltage and the first target voltage have a same polarity and (b) make a cross connection between the pair of the input terminals and the pair of the first output terminals during a time period in which the input voltage and the first target voltage have different polarities, (ii) generate the second control signals to (a) make a straight connection between the pair of the input terminals and the pair of the second output terminals during a time period in which the input voltage and the second target voltage have a same polarity and (b) make a cross connection between the pair of the input terminals and the pair of the second output terminals during a time period in which the input voltage and the second target voltage have different polarities, and (iii) generate the third control signals to (a) make a straight connection between the pair of the input terminals and the pair of the third output terminals during a time period in which the input voltage and the third target voltage have a same polarity and (b) make a cross connection between the pair of the input terminals and the pair of the third output terminals during a time period in which the input voltage and the third target voltage have different polarities.

4. The power conversion apparatus according to claim 1, wherein the control signal generating unit is configured to (i) generate the first control signals to constantly connect the pair of the input terminals and the pair of the first output terminals during a time period in which the instantaneous absolute value of the input voltage is less than or equal to the instantaneous absolute value of the first target voltage, (ii) generate the second control signals to constantly connect the pair of the input terminals and the pair of the second output terminals during a time period in which the instantaneous absolute value of the input voltage is less than or equal to the instantaneous absolute value of the second target voltage, and (iii) generate the third control signals to constantly connect the pair of the input terminals and the pair of the third output terminals during a time period in which the instantaneous absolute value of the input voltage is less than or equal to the instantaneous absolute value of the third target voltage.

5. The power conversion apparatus according to claim 1, wherein the control signal generating unit is configured to (i) generate the first control signals to constantly disconnect the pair of the input terminals and the pair of the first output terminals during a time period in which the instantaneous absolute value of the input voltage is less than or equal to the instantaneous absolute value of the first target voltage, (ii) generate the second control signals to constantly disconnect the pair of the input terminals and the pair of the second output terminals during a time period in which the instantaneous absolute value of the input voltage is less than or equal to the instantaneous absolute value of the second target voltage, and (iii) generate the third control signals to constantly disconnect the pair of the input terminals and the pair of the third output terminals during a time period in which the instantaneous absolute value of the input voltage is less than or equal to the instantaneous absolute value of the third target voltage.

6. The power conversion apparatus according to claim 1, wherein the control signal generating unit is configured to (i) generate the first control signals to short-circuit the pair of the first output terminals when the pair of the input terminals and the pair of the first output terminals are disconnected, (ii) generate the second control signals to short-circuit the pair of the second output terminals when the pair of the input terminals and the pair of the second output terminals are disconnected, and (iii) generate the third control signals to short-circuit the pair of the third output terminals when the pair of the input terminals and the pair of the third output terminals are disconnected.

7. The power conversion apparatus according to claim 6, wherein each of the first bidirectional switches, each of the second bidirectional switches, and each of the third bidirectional switches includes two unidirectional switches connected in inverse parallel, each of the unidirectional switches changing between a forward-directional conducting state and a non-conducting state according to either a corresponding one of the first control signals, a corresponding one of the second control signals, or a corresponding one of the third control signals and not conducting in an opposite direction, and the control signal generating unit is configured to (i) generate, for short-circuiting the pair of the first output terminals, the first control signals to place, in the conducting state, all the unidirectional switches included in plural ones of the first bidirectional switches which are used for short-circuiting the pair of the first output terminals, (ii) generate, for short-circuiting the pair of the second output terminals, the second control signals to place, in the conducting state, all the unidirectional switches included in plural ones of the second bidirectional switches which are used for short-circuiting the pair of the second output terminals, and (iii) generate, for short-circuiting the pair of the third output terminals, the third control signals to place, in the conducting state, all the unidirectional switches included in plural ones of the third bidirectional switches which are used for short-circuiting the pair of the third output terminals.

8. The power conversion apparatus according to claim 1, wherein each of the first bidirectional switches, each of the second bidirectional switches, and each of the third bidirectional switches includes two unidirectional switches connected in inverse parallel, each of the unidirectional switches changing between a forward-directional conducting state and a non-conducting state according to either a corresponding one of the first control signals, a corresponding one of the second control signals, or a corresponding one of the third control signals and not conducting in an opposite direction, and the control signal generating unit is configured to generate the first control signals, the second control signals, and the third control signals to (i) change between the conducting state and the non-conducting state of one of the two unidirectional switches to which the input voltage is applied in a forward direction and (ii) constantly place, in the conducting state, the other of the two unidirectional switches to which the input voltage is applied in the opposite direction.

9. The power conversion apparatus according to claim 1, wherein the control signal generating unit is configured to (i) generate the first control signals to place, in a conducting state, plural ones of the first bidirectional switches which are determined depending on a polarity of the input voltage, when the pair of the input terminals and the pair of the first output terminals are connected, (ii) generate the second control signals to place, in a conducting state, plural ones of the second bidirectional switches which are determined depending on the polarity of the input voltage, when the pair of the input terminals and the pair of the second output terminals are connected, and (iii) generate the third control signals to place, in a conducting state, plural ones of the third bidirectional switches which are determined depending on the polarity of the input voltage, when the pair of the input terminals and the pair of the third output terminals are connected.

10. The power conversion apparatus according to claim 1, wherein the control signal generating unit is configured to generate the first control signals, the second control signals, and the third control signals to avoid overlap of a time period in which the pair of the input terminals and the pair of the first output terminals are connected, a time period in which the pair of the input terminals and the pair of the second output terminals are connected, and a time period in which the pair of the input terminals and the pair of the third output terminals are connected.

11. A motor system comprising:
the power conversion apparatus according to claim 1;
a three-phase motor including: a first axis winding; a second axis winding; a third axis winding; a rotor; a pair of first power receiving terminals connected to the first axis winding; a pair of second power receiving terminals connected to the second axis winding; and a pair of third power receiving terminals connected to the third axis winding, the first axis winding, the second axis winding, and the third axis winding being not electrically connected within the three-phase motor;
first feed lines connecting the pair of the first output terminals of the power conversion apparatus and the pair of the first power receiving terminals of the three-phase motor; and
second feed lines connecting the pair of the second output terminals of the power conversion apparatus and the pair of the second power receiving terminals of the three-phase motor; and
third feed lines connecting the pair of the third output terminals of the power conversion apparatus and the pair of the third power receiving terminals of the three-phase motor.

12. The motor system according to claim 11,
wherein the three-phase motor includes a rotation angle sensor which outputs a rotation angle signal indicating consecutive rotation amounts of the rotor,
the power conversion apparatus further includes a rotation angle obtaining unit configured to obtain the rotation angle signal, and
the target voltage designating unit is configured to perform vector control to change at least one of amplitude, frequency, and phase of the first target voltage, the second target voltage, and the third target voltage based on a difference between a rotation speed of the rotor determined from the obtained rotation angle signal and a speed command value.

13. The motor system according to claim 11,
wherein the power conversion apparatus further includes:
a current sensor which outputs current amount signals each indicating consecutive current amounts flowing in either the pair of the first output terminals, the pair of the second output terminals, or the pair of the third output terminals; and a current amount obtaining unit configured to obtain the current amount signals, and
the target voltage designating unit is configured to perform speed sensorless vector control to estimate a rotation speed of the rotor using the obtained consecutive current amounts, and change at least one of amplitude, frequency, and phase of the first target voltage, the second target voltage, and the third target voltage based on a difference between the estimated rotation speed and a speed command value.

14. A power conversion method for converting an input voltage which is a single-phase AC voltage into output voltages forming a three-phase AC voltage, the power conversion method comprising:
receiving the input voltage at a pair of input terminals;
designating (i) a first target voltage representing, using a first one of AC voltages forming a three-phase AC voltage, consecutive target values of a first-phase output voltage that is a first one of the output voltages, (ii) a second target voltage representing, using a second one of the AC voltages forming the three-phase AC voltage, consecutive target values of a second-phase output voltage that is a second one of the output voltages, and (iii) a third target voltage representing, using a third one of the AC voltages forming the three-phase AC voltage, consecutive target values of a third-phase output voltage that is a third one of the output voltages;
cyclically connecting and disconnecting the pair of the input terminals and a pair of first output terminals via first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage;
cyclically connecting and disconnecting the pair of the input terminals and a pair of second output terminals via second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and
cyclically connecting and disconnecting the pair of the input terminals and a pair of third output terminals via third bidirectional switches at a duty cycle corresponding to a ratio of an instantaneous absolute value of the third target voltage to the instantaneous absolute value of the input voltage during a time period in which the instantaneous absolute value of the input voltage is greater than the instantaneous absolute value of the third target voltage.

* * * * *